(12) United States Patent
Soffer

(10) Patent No.: US 8,158,883 B2
(45) Date of Patent: Apr. 17, 2012

(54) WALL MOUNTED SYSTEM WITH INSERTABLE COMPUTING APPARATUS

(75) Inventor: Aviv Soffer, Geva Carmel (IL)

(73) Assignee: Chip PC Israel Ltd., Tirat Ha'Carmel (IL)

( * ) Notice: Subject to any disclaimer, the term of this patent is extended or adjusted under 35 U.S.C. 154(b) by 0 days.

(21) Appl. No.: 12/715,219

(22) Filed: Mar. 1, 2010

(65) Prior Publication Data

US 2010/0157524 A1    Jun. 24, 2010

Related U.S. Application Data

(63) Continuation of application No. 11/147,079, filed on Jun. 6, 2005, now abandoned.

(60) Provisional application No. 60/654,559, filed on Feb. 18, 2005.

(51) Int. Cl.
   *H02G 3/08* (2006.01)
(52) U.S. Cl. ............ 174/50; 174/480; 174/520; 174/59; 439/535; 361/679.01
(58) Field of Classification Search .......... 174/480, 174/481, 50, 53, 57, 58, 484, 59, 520; 220/3.2–3.9, 220/4.02; 439/535, 536, 539, 76.1, 538, 439/63; 361/683, 724, 600, 601, 679.02, 361/679.01
See application file for complete search history.

(56) References Cited

U.S. PATENT DOCUMENTS

| | | | | |
|---|---|---|---|---|
| 2,433,917 A | * | 1/1948 | McCartney | 174/50 |
| 5,645,449 A | * | 7/1997 | Sabo | 439/536 |
| 6,144,561 A | * | 11/2000 | Cannella et al. | 361/796 |
| 6,435,727 B1 | * | 8/2002 | Fingler et al. | 439/536 |
| 6,444,906 B1 | * | 9/2002 | Lewis | 174/53 |
| 6,793,524 B2 | * | 9/2004 | Clark et al. | 439/536 |
| 6,979,205 B2 | * | 12/2005 | Hoopes et al. | 439/76.1 |
| 7,057,105 B2 | * | 6/2006 | Gottardo et al. | 174/50 |
| 7,205,488 B2 | * | 4/2007 | Riner | 174/50 |
| 7,241,170 B1 | * | 7/2007 | Lindner et al. | 439/536 |

* cited by examiner

*Primary Examiner* — Angel R Estrada
(74) *Attorney, Agent, or Firm* — William H. Dippert; Eckert Seamans Cherin & Mellott, LLC

(57) ABSTRACT

The present invention is directed to provide a computing system comprises plurality of apparatii mounted on the wall or floor adjacent to or embedded inside the LAN jack or a main power outlet. The apparatii are connected at the back side through Ethernet cable, optical fiber or main lines to the building LAN and connected at the front side through cables or wirelessly to display, keyboard, mouse or other peripheral devices. In a typical embodiment of the present invention power to the computing apparatus is supplied through the LAN cable. Another embodiment of the present invention utilizes a wall or floor mounted housing part comprising of an integrated LAN connector. This common housing enables easy installation of the said computing apparatus module and plurality of other compatible devices that may be plugged into that same housing.

17 Claims, 34 Drawing Sheets

WALL MOUNTED SYSTEM WITH INSERTABLE COMPUTING APPARATUS

CROSS REFERENCE TO RELATED APPLICATIONS

This application is a continuation of co-pending, commonly assigned, U.S. patent application Ser. No. 11/147,079, filed Jun. 6, 2005, which is based upon and claims the benefit of the filing date of commonly assigned U.S. Provisional Patent Application Ser. No. 60/654,559, filed Feb. 18, 2005, both of which are incorporated herein in their entirety.

This present invention claims the benefit of earlier U.S. provisional patent application Ser. No. 60/654,559 filed on 18 of February by Soffer Aviv.

FIELD OF THE INVENTION

The present invention is related generally to system of modular wall or floor-mounted computing apparatuses that among other functions replaces standard desktop PCs and enables computer user to access and use local and remote applications. More specifically, this invention relates to a thin-client type computing apparatus built inside or in conjunction with a LAN or mains jack and connected to the building LAN system infrastructure or the existing power lines network at one side and to the user interaction and peripheral devices on the other side.

BACKGROUND OF THE INVENTION

Desktop personal computers (PC) are essential working tools for many professionals today. Desktop PCs brought not only access to information and increased productivity, but also many inherent problems. These problems include: high costs, low-reliability issues, poor information and physical security, high power consumption and production of heat, noise, electromagnetic radiation, wasted space and poor central management. For these reasons and others, many organizations are seeking economical alternatives for desktop PCs.

In recent years, thin-client computing devices became a popular alternative for desktop PCs.

As thin-clients are built around the concept of remote processing and remote management, very little local maintenance and interaction is needed to operate such devices. Thin-clients to some extent are capable of running local applications just like PCs.

Typical existing thin-clients are built as a desktop appliance connected to the wall infrastructure with a power cord and with a Local Area Network (LAN) cable and connected to the various desktop peripherals such as display, keyboard and mouse by additional cabling. Thin-clients are connected via LAN or through Wide Area Network (WAN) to remote servers where applications are run and data is stored. This type of thin-client appliance takes desktop space and depends on connection of various cables. Installation of This type of thin-client appliance is complex, time consuming and cumbersome due to the necessity to connect all the cables. Often, the device also needs to be physically secured to the desk with additional physical securing cable and lock to prevent tempering and theft.

Today there are some simple functions that designed to fit inside a LAN or mains jack such as network switches and wireless Access Points Another option known in the art is the integration of the thin-client inside the display device. While this option saves the video cable connection and also reduces desktop space, it suffers from the inherent maintenance problems of coupling the two functions together. This type of integration tends to complicate maintenance and to increase the solution price. It may be advantageous to separate these two functions for operational flexibility, ease of maintenance and proper asset management.

Yet another option known in the art is the integration of the thin-client function inside the keyboard enclosure. This setup saves one cable—the keyboard connection. This solution is undesirable since keyboards are susceptible to mechanical failures and fluid damages, therefore maintenance problems using this combination are unavoidable.

Still another option known in the art is the integration of computer/thin-client inside a touch pad or a mouse. This method is undesirable due to technical and operational problems including heavy weigh and high temperature that interfere with the mouse function and the need to connect many cables.

Thus, there exists a need for a computing device which overcomes these problems and provides organizations and installation sites with a simple thin-client computing device that has minimum connected wiring and takes minimum desktop space. A computing device that can be easily deployed over existing or new network infrastructure, a device that requires minimal and simple installation.

Generally, computing devices are constructed as one "mother board" to which essential or optional boards or components are plugged using connectors or cables.

U.S. Pat. No. 6,710,704 (Fisher, et al. Mar. 23, 2004) titled "Power transfer apparatus for concurrently transmitting data and power over data wires" discloses a power supply current, sufficient to power a remote network device which is transmitted concurrently with a network data signal over a transmission line.

U.S. Pat. No. 6,547,602 (Price, et al. Apr. 15, 2003) titled "Modular plug receptacles defined by multiple electronic components" discloses an integrated modular plug receptacle package wherein one or more modular plug receptacles, or jacks, are defined by bringing two or more PC cards into operable communication, such as within the card slot cavity of a portable computer. In addition to PC cards, various electronic device components may have formed on a surface thereof modular jack portions enabling them to be operably connected to a similarly equipped component, thereby also defining a modular connector.

U.S. Pat. No. 5,971,813 (Kunz, et al. Oct. 26, 1999) titled "RJ-45 modular connector with microwave-transmission-line integrated signal conditioning for high speed networks" discloses a modular connector comprises an insulating housing that accepts an RJ-45 style jack from its front, and a molded insert from the opposite said molded insert includes a signal conditioning circuit that provides a proper electrical coupling between a physical interface device or encoder/decoder and an unshielded twisted pair cable to a high speed computer network.

U.S. Pat. No. 5,918,039 (Buswell, et al. Jun. 29, 1999) titled "Method and apparatus for display of windowing application programs on a terminal" discloses a video display terminal capable of operating with a graphical user interface such as Windows, providing functionality to permit use of popular applications programs resident on a server, without requiring more than application data to be transmitted from the server, and keyboard and mouse information to be transmitted from the terminal to the server. In addition, a method for updating terminal operating characteristics over a communications link from a host is disclosed.

Other general background information may be found in the following patents:

U.S. Pat. No. 6,885,674 (Hunt, et al. Apr. 26, 2005), Communications system for providing broadband communications using a medium voltage cable of a power system U.S. Pat. No. 6,888,790 (Kilani May 3, 2005), Frame synchronization technique for OFDM based modulation scheme U.S. Pat. No. 6,373,377 (Sacca, et al. Apr. 16, 2002), Power supply with digital data coupling for power-line networking U.S. Pat. No. 6,074,086 (Yonge, III Jun. 13, 2000), Synchronization of OFDM signals with improved windowing U.S. Pat. No. 6,040,759 (Sanderson Mar. 21, 2000), Communication system for providing broadband data services using a high-voltage cable of a power system Operation of thin-client concept is described in IBM Document "Implementing Windows Terminal Server and Citrix MetaFrame on IBM xSeries Servers" dated April 2003.

Additional information can be found in:

"A Comparison of Thin-Client Computing Architectures," Network Computing Laboratory, Columbia University, Dated November 2000.

A description of important industry relevant standards can be found in the following References:

IEEE 802.3af Power over Ethernet standard

IEEE High Power Over Ethernet proposed standard draft

HomePlug 1.0 Industry Standard

IEEE 802.3u Fast Ethernet standard

ANSI NEMA-WD6-2002 wiring devices—dimensional specifications

ANSI/TIA/EIA-568 Commercial Building Telecommunications Cabling Standard

ANSI/TIA/EIA-569 Commercial Building Telecommunications Pathways and Spaces

3Com® IntelliJack™ Switch NJ225 product brochure

Technical Paper—3Com® NJ205 IntelliJack™ Switch Management Feature: Location Mapping

SUMMARY OF THE INVENTION

There exists a need for a computing device for providing organizations and installation sites with a simple thin-client computing device that has minimum connected wiring and takes minimum or no desktop space. A computing device that can be easily deployed over existing or new network infrastructure; a device that requires minimal and simple installation.

The present invention is directed to provide a computing system comprises plurality of apparatii mounted on the wall or floor adjacent to or embedded inside the LAN jack or a main power outlet. Said apparatii are connected at the back side through Ethernet cable, optical fiber or main lines to the building LAN and connected at the front side through cables or wirelessly to display, keyboard, mouse or other peripheral devices. In a typical embodiment of the present invention power to the computing apparatus is supplied through the LAN cable. Another embodiment of the present invention utilizes a wall or floor mounted housing part comprising of an integrated LAN connector. This common housing enables easy installation of the said computing apparatus module and plurality of other compatible devices that may be plugged into that same housing.

The present invention is related generally to wall or floor-mounted computing apparatus that replaces standard desktop PCs and enables computer user to access and use local and remote applications. More specifically, this invention relates to a thin-client type computing apparatus built inside or in conjunction with a LAN or mains jack and connected to the building LAN system infrastructure or power lines network at one side and to the user interaction and peripheral devices on the other side.

In an embodiment of the present invention, a wall or floor mounted LAN hub insert is provided comprising: a box adapted to fit inside or be mechanically attached to a network or mains jack that comprises a mating electrical connector provided on said box adapted to mate with a connector in said jack providing LAN interface for said LAN hub insert; a LAN switch connected to the mating connector; and a plurality of LAN connectors connected to the LAN switch.

In an embodiment of the invention, a wall or floor mounted computing apparatus is provided comprising: a box built to fit inside or be mechanically attached to a network or mains jack comprising: a processor adapted to process required programs; Non-Volatile memory means adapted to permanently store programs and data to be processed by said processor; volatile memory means adapted to temporarily store data required by said processor; at least two video display controllers adapted to generate a visible video image on connected video display means from data directed from said processor, said non-volatile memory or said volatile memory; network interface means for connecting the apparatus to external data network through fiber optic based means adapted to receive and transmit data to and from the apparatus; a mating connector provided on said box and adapted to mate with a connector in said jack providing LAN interface for said computing apparatus; means for interfacing with plurality of external peripheral devices provided to said box so as to allow a user to interact with the apparatus through data exchange in various forms with the said peripheral devices such as keyboard and mouse or any other connected device. In the preferred embodiment at least one of said two video display controllers adapted to generate a visible video image may be connected to a video display means using DVI connector.

In an embodiment of the invention, a wall or floor mounted LAN jack insert is provided comprising: a box adapted to fit inside or be mechanically attached to a network or mains jack comprising: a mating connected for connecting to wall LAN system; a LAN jack provided on front panel capable of communicating data received from said mating connector.

In an embodiment of the invention, a layered headless computing apparatus is provided comprising: a thermally conductive box containing at least three substantially parallel printed circuit boards wherein: a first Printed Circuit Board layer containing at least a processor, memory controller, volatile memory, non-volatile memory, and an interconnect component to interface it with the second layer; a second Printed Circuit Board layer connected to first and third layers and containing at least I/O controller, LAN transceiver, power supplies, and interconnect means to third layer; and a third layer Printed Circuit Board layer connected to second layer and containing substantially front panel LAN jack.

In an embodiment of the invention, a modular data system is provided comprising: a server connected to a LAN switch; a LAN switch connected to said server and to plurality of housing for insertable computing device; plurality of insertable device inserted into said plurality of housings, wherein said plurality of insertable devices are selected from a group comprising: blank panel modular insert, computing apparatus insert, headless computing apparatus insert, LAN jack insert, LAN hub insert and Wireless LAN Access Point insert.

In yet another embodiment of the invention, a Wireless LAN Access Point insert is provided comprising: a box adapted to fit inside or be mechanically attached to a network or mains jack comprising: a mating connected for connecting to wall LAN system; a LAN controller exchanging data with said mating connector;

a radio section for modulating said data as RF radiation; and antenna for transmitting said RF radiation.

Further features and advantages of the invention will be apparent from the drawings and the description contained herein.

BRIEF DESCRIPTION OF THE DRAWINGS

An exemplary embodiment of the invention is described in the following section with respect to the drawings. The same reference numbers are used to designate the same or related features on different drawings. The drawings are generally not drawn to scale.

In order that the manner in which the above recited and other advantages and features of the invention are obtained, a more particular description of the invention briefly described above will be rendered by reference to specific embodiments thereof, which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF EXEMPLARY EMBODIMENT

The following detailed description is of the best presently contemplated modes of carrying out the present invention. This description is not to be taken in a limiting sense, but is made merely for the purpose of illustrating the general principles in accordance with the present invention. The scope of the present invention is best defined by the appended claims. Further reference will now be made to the drawings, wherein exemplary embodiments of the present claimed invention are illustrated.

Figure 1:
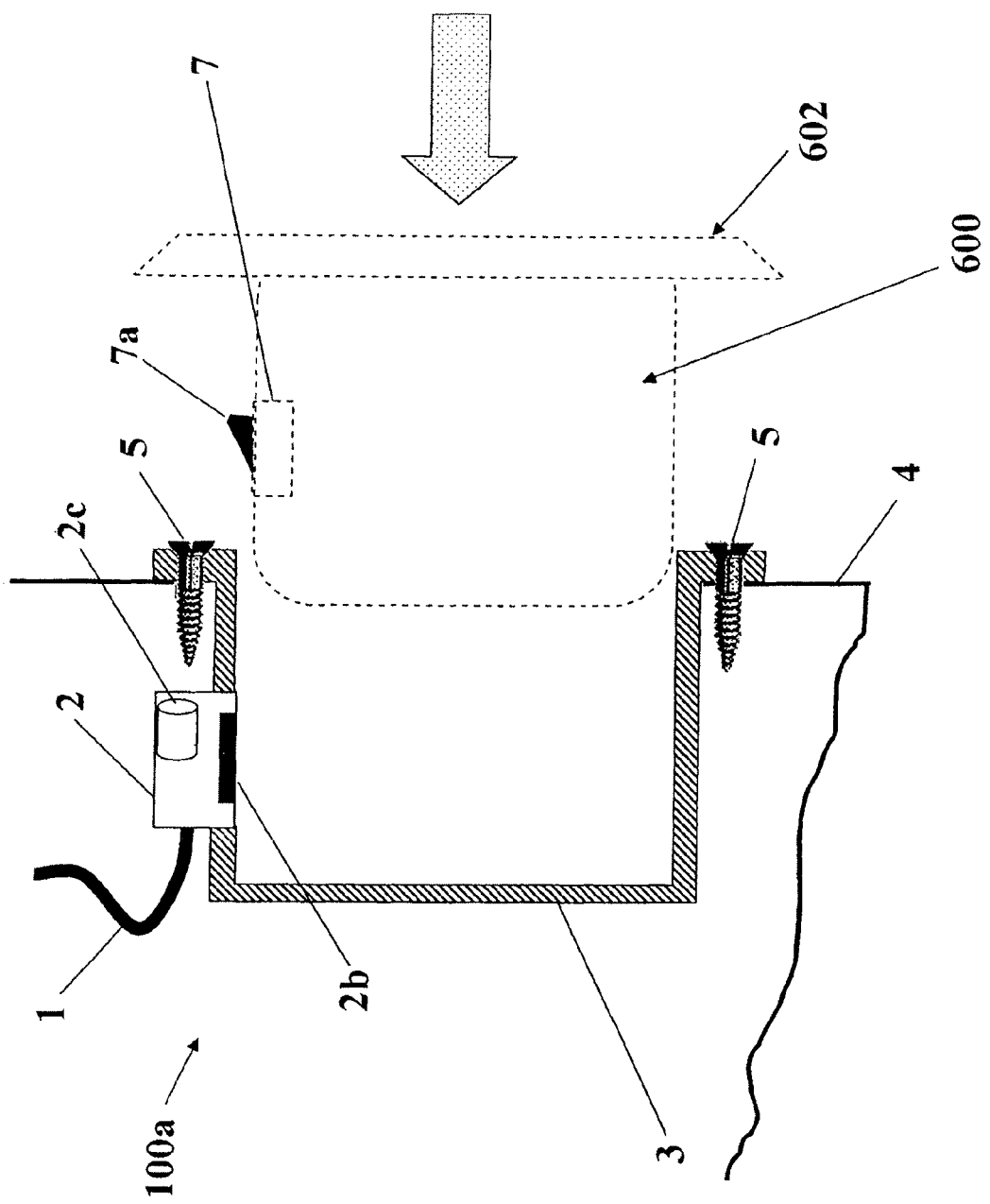
FIG. 1 illustrates a cross sectional view of an embodiment of the present invention showing the wall or floor mounted insert-housing installation having network interface based on Ethernet LAN.

Reference is first made to FIG. 1 illustrates a cross sectional view of the typical embodiment of the present invention showing the wall or floor mounted insert-housing 100a having network interface based on Ethernet LAN.

Wall or floor-mounted insert-housing 100a fit in a standard LAN jack hole (cutout) in the wall or in a floor-mounted box. Insert housing 100a is typically made of thin sheet metal or perforated plastic frame to secure the inset mechanically and to conduct heat efficiently.

Insert housing 100a may be retrofitted into a cutout made for a standard LAN connection point. This housing comprises a box 3, preferably made of metal for efficient heat dissipation. Box 3 is secured to the wall 4 by mounting screws 5 or similar friction based fasteners. Box 3 may be mounted to a wall or floor plane. Alternatively, box 3 may be mounted to or in furniture or in a decorative box mounted to any other flat object. At one side preferably at the top or bottom of box 3 is at least one housing connector block 2.

Optionally, box 3 provides an EMI shielding against FR radiation emitted from or entering into the said box. Optionally, block 2 comprises EMI shielding and RF filters against FR radiation emitted from or entering into the said box.

Ethernet cable 1 provides LAN connectivity to the device. In this embodiment the power for the device may be extracted from the LAN signals using Power Over Ethernet Powered Device circuitry or can be supplied by external wall mounted DC power supply. The LAN cable usually connected to a network switch or hub at the other (far) side as will be shown in FIG. 4. The said Ethernet cable 1 is typically crimped or soldered to the connector block 2 as will be shown in details in FIG. 20

Housing Connector block 2 may optionally include a location memory chip 2c. Additionally, housing connector 2 may also contain means for protecting equipment from high voltage transients such as lightning, and may provide isolation, shielding and grounding. Housing Connector block 2 further containing some form of mating surfaces or contacts 2b to form a low resistance electrical conductance with the insert housing contacts 7a of Mating connector in modular insert 7. Said mating connector 7 may come in several configurations to mate with several configurations of housing connector block 2.

Optional location memory chip 2c may be a programmable device such as Electrically Programmable Read Only memory (EPROM) device or a preset read only device. Alternatively, a set of jumpers or miniature switches may be used.

Location memory chip 2c may be used by the remote application servers or remote management servers (shown in FIG. 4) to create a "Location map" and to associate each insertable device with the insert-housing location it was inserted into. Additionally, the inserted device may access information in location memory chip 2c in order to adopt its function to its current location. Such functionality may be useful in a dynamic environment where users may change their location frequently; equipment attached may be changed and moved etc. In this case there may be a high value for associating the user with the device and the device with the actual (physical) location using the Location mapping described above. This may enable:

a. Location of the actual device in case of a device or network failure that may require physical or logical troubleshooting.
b. Help in initial installation of various devices in the said jack.
c. Definition of connected network resources based on the device location—this may be useful for printers, scanners and other network peripherals. The exact position of the installed computing device may automatically assign the closest or most comfortable printer location or scanner.
d. Easier audition by easily locating the organization deployed assets.
e. The capability to limit access to high security materials not only to specific users but also to specific rooms/building location.

Similar results can be achieved by properly dividing the organization network into sub-networks and manage ports in managed LAN switches Though this type of management is less flexible and less reliable compared to the method of using location map of the current invention which may operate independently of any network configurations or resources.

Interchangeable modular insert 600 is configured to fit inside the box 3. Optional decorative frame 602 may be installed if space permitting. Typically for smaller installation space the decorative frame 602 would not be installed. Plurality of variations of modular insert 600 may fit into the said box 3. Few variations will be shown in the following figures. For example, modular insert 600 may be a computing apparatus such as thin-client type computing apparatus. Modular insert 600 shown in FIG. 1 comprises a mating connector 7 in its back that mates with the housing connector 2 to exchange all necessary signals to and from the modular insert 600.

The installation and operation processes can be explained using the relevant drawings. In the preferred embodiment, a standard floor or wall-mounted LAN jack can be either converted to the preferred embodiment configuration or pre-built while the building is being built to enable quick installation of a computing apparatus. The LAN cabling 1 is typically Category 5 or higher twisted pairs shielded type. The hole (cutout) in the wall or floor surface 4 is typically drilled in compliance with NEMA-WD6 standard cutout or other relevant standard. The LAN cable 1 is usually stripped crimped and pressed into a terminal block that is part of the housing connector block 2. Another option to achieve electrical connection between the LAN cabling and the installed housing connector, especially useful if the jack is already installed, is to connect a short jumper cable between the existing RJ-45 LAN jack and the connector block of housing connector block 2 thus avoiding the need for manually stripping and crimping processes. This method may be particularly useful in the case that an existing LAN system is being retrofitted from conventional LAN jacks to the LAN jacks of the present invention.

The housing connector is then secured to the housing box 3 to enable electrical connection with the inserted module 600 through its mating connector 7 and its spring contacts 7. The assembled housing 100a is than inserted into the LAN jack cutout and secured to the wall or floor surface 4 by screws 5 or any other type of friction fasteners.

Though this cupper LAN based installation method would be relevant to large majority of the organizations, still there may be a need to provide similar solution in cases that the whole LAN or segments of it are based on optical fibers.

Figure 2:
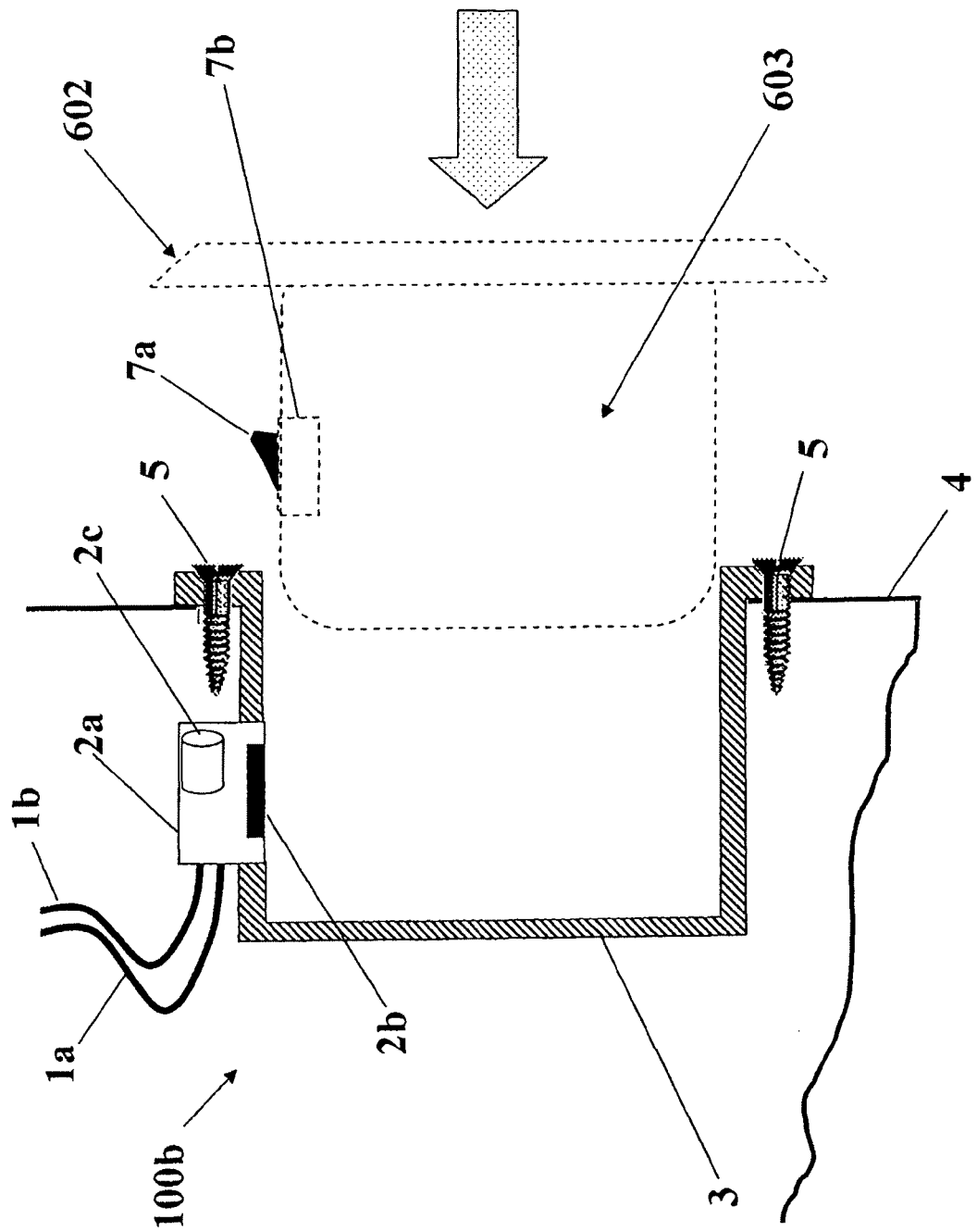
FIG. 2 illustrates a cross sectional view of an embodiment of the present invention showing wall or floor mounted insert-housing installation having network interface based on optical fibers.

Therefore another similar embodiment of the present invention shown in FIG. 2 which shows a insert-housing 100b specifically for optical fibers 1a instead of cupper wiring based LAN presented above.

Figure 1A:
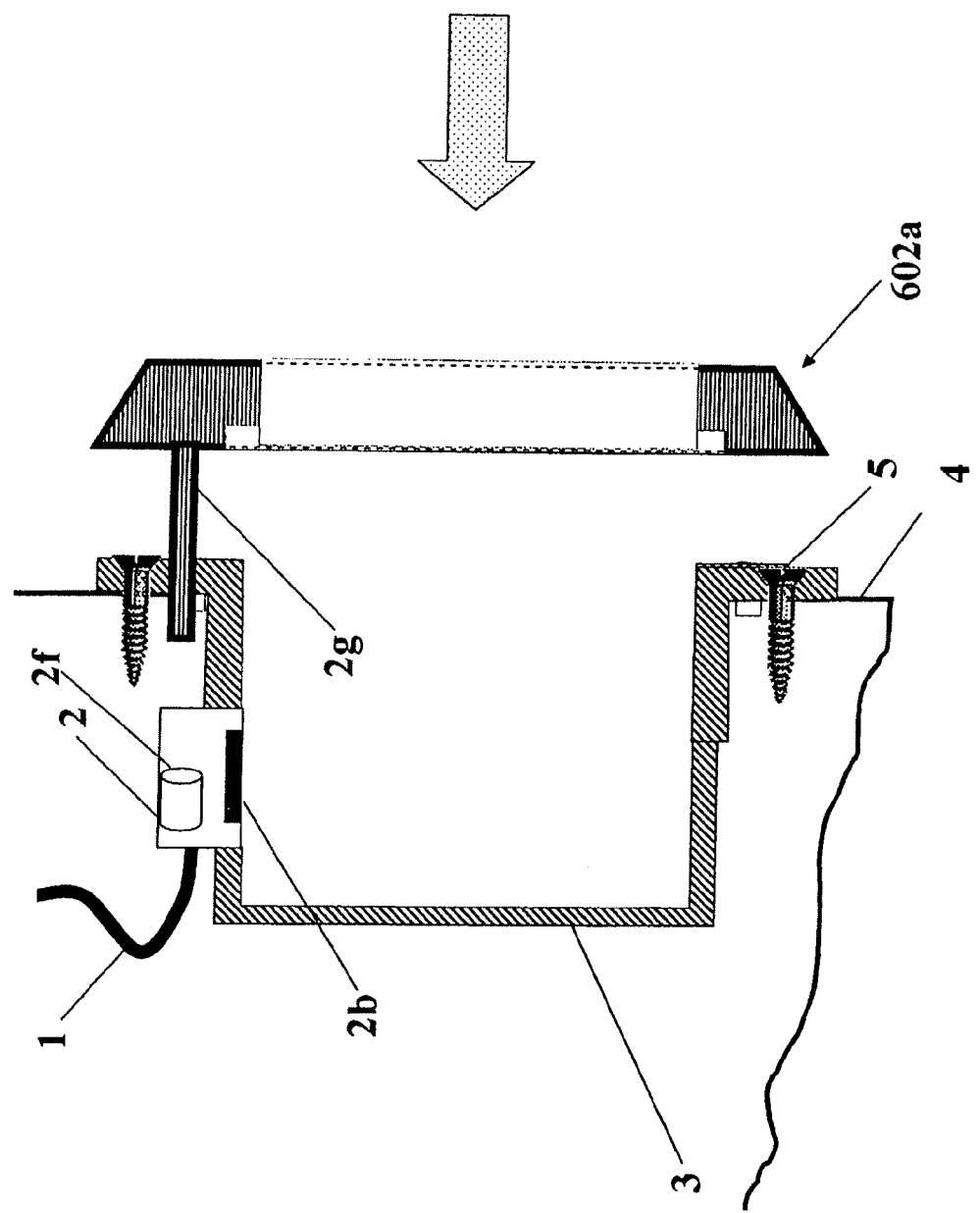
FIG. 1a. illustrates a cross sectional view of another embodiment of the present invention showing the wall or floor mounted insert-housing installation heat conducting decorative frame and tempering detector option.

FIG. 1a. illustrates a cross sectional view of another embodiment of the present invention showing the wall or floor mounted insert-housing installation heat conducting decorative frame and tempering detector option.

In the exemplary embodiment, heat conducting decorative frame 602a is optionally comprises of heat conductive material such as metal of sufficient thickness, preferably aluminum or copper. The decorative frame is preferably in thermal contact with the housing, the insertable device or both and assist in dissipation of heat generated by computing insert.

In the exemplary embodiment, decorative frame 602a is optionally comprises of key 2g capable of interacting with housing 3 so as to signal the proper installation or removal of said frame. For example, security detector 2f may sense the insertion of key 2g. For example, removal of key 2g may cause electrical resistance to load the network cable 1. The current in said cable may be sensed for example by power over Ethernet power supply and set an alarm.

In some embodiment of the invention, decorative frame is locked by physical locking device to the housing preventing removal of said frame without special tool. Preferably, in this embodiment, said frame is configured to hold the insert in place and prevent its removal without removing the frame first.

FIG. 2 illustrates a cross sectional view of an embodiment of the present invention showing wall or floor mounted insert-housing installation having network interface based on optical fibers. This figure shows a wall or floor mounted installation of insert-housing 100b and modular insert apparatus 603 similar to the ones shown in FIG. 1 but adopted to be connected to a fiber optic network.

Wall or floor-mounted insert-housing 100b fits in a standard hole in the wall or floor mounted box. Insert-housing 100b comprises a box 3, which holds housing connector 2b and enable insertion of modular insert 603. Decorative frame 602 may be installed for esthetic reasons if space permits.

Fiber optic cable 1a provides data connectivity to the device. The fiber optic cable usually connected to a network switch or hub with optical ports at the other (far) end. Optical fiber cable may comprise of a single fiber operating in duplex or two fibers, single or multi mode type. Housing optical coupler 2a at the back of box 3 contains one or more optical couplers to enable good optical interface between the optical transceiver 7b on modular insert 603 and fiber optic cable 1a. Housing optical coupler 2a may also include location memory chip 2c. Housing connector block 2a typically also contains some electrical contacts 2b to mate with the insert housing contacts 7a to supply optional power and location memory 2c connectivity.

Mating fiber optic transceiver 7b attached to the side of modular insert 603 mates with the housing optical coupler 2a to deliver all necessary signals to and from the modular insert 603.

Preferably, a power cable 1b supplies power to the insert-housing 100b. Preferably, a power cable 1b is connected to housing connector 2a. Alternatively, power to the modular insert 603 is provided externally, optionally via a connector on the modular insert.

Optionally housing optical coupler 2a includes fiber optic transceiver for optical to electrical conversion, thus enabling the use of eclectically interfaced interchangeable modular insert 600 instead of optically interfaced interchangeable modular insert 603.

In this figure screws 5 which are used for anchoring box 3 to the wall are shown.

Figure 3:
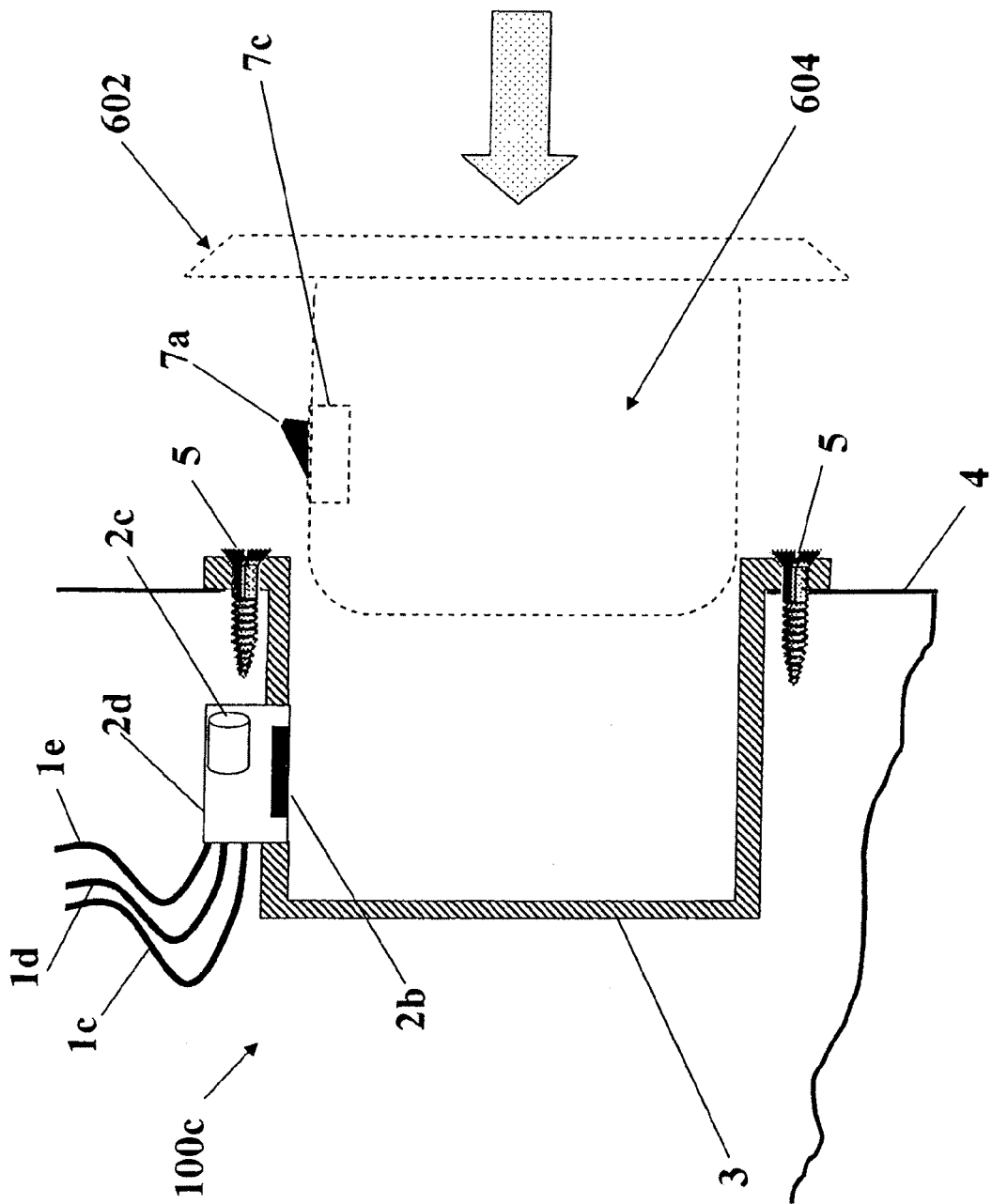
FIG. 3 illustrates a cross sectional view of an embodiment of the present invention showing wall or floor mounted insert-housing installation having network interface based on Ethernet over power lines.

FIG. 3 illustrates another cross sectional view of an embodiment of the present invention showing wall or floor mounted insert-housing installation having network interface based on network over power lines. This figure shows a wall or floor mounted installation of main power insert-housing 100c and main power modular insert apparatus 604 similar to the ones shown in FIGS. 1 and 2 but adopted to be connected to the mains power outlet.

Wall or floor-mounted insert-housing 100c fits in a standard hole in the wall or floor mounted box. Insert-housing 100c comprises a box 3, which holds housing connector 2b and enables insertion of modular insert 604. Decorative frame 602 may be installed for esthetic reasons if space permits.

Mains electrical wires connected to the building electrical infrastructure are crimped or otherwise connected to the main power housing connector 2d which mates with main power mating connector 7c. Electrical wires typically consist of: Live line 1c, Neutral line 1d and Ground line 1e. Voltage at this area will reach 110 or 230 Volts and is dangerous for the users. Therefore proper shielding, insulation and safety measures need to be taken in this area to protect the high voltage AC lines.

Figure 4:
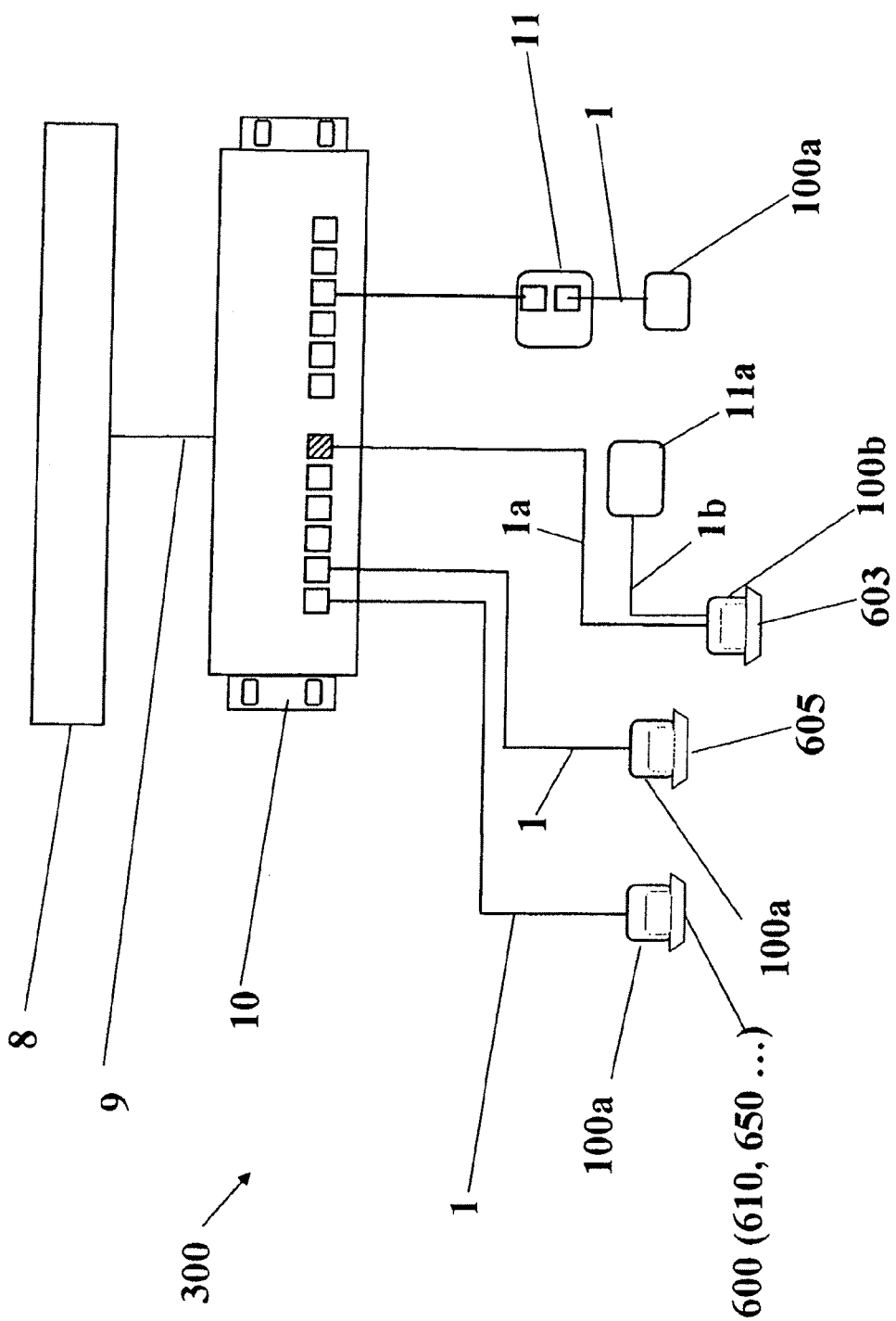
FIG. 4 illustrate high-level system diagram with one or more remote servers, multiple network switches or hubs and multiple connected LAN jack installed computer apparatuses of the present invention. This represents a typical implementation of the current invention for business and enterprise systems.

FIG. 4 illustrates a high-level system diagram with one or more remote servers, multiple network switches or hubs and multiple connected LAN jack installed computer apparatuses.

System 300 comprises at least one server 8 which may be located on-site over Local Area Network (LAN) or at a remote location over Wide Area Network (WAN). In the case that the system implemented is using thin-client inserts the server 8 may be an application server, presentation server, legacy host or a web server. If multiple servers 8 are being used, a load balancing function may be added before the servers 8 to route new connections based on various real time and static parameters such as current server load and capacity of each individual server. Application server not only executes programs for the thin clients, but it also can provide the thin clients with access to all the resources available on the networks attached to the application server. The application server 8 delivers data to the thin clients including, but not limited to, graphics, encoded audio, and video which are decoded and displayed by the thin clients. The thin clients may deliver data including, but not limited to, keyboard and control signals, pointer, and encoded audio and video data to the application server 8.

Network connection 9 connecting the said server 8 with at least one network switch or hub 10. Network switch or hub 10 is connected to multiple wall or floor mounted insert housings 100a via Ethernet cable 1. Network switch or hub may have an integrated power over Ethernet end-span circuitry or fitted with external Power Over Ethernet mid-span power injector device/s 11 attached to it downstream. Alternatively or additionally, all or parts of the insert housings 100a may be replaces with optically interfaced insert housings 100b connected to Network switch or hub 10 with optical fiber cables 1a and optionally also to power cable 1b connected to power supply 11a or getting its power from hub 10.

Typically, the LAN cables are routed through the floors, walls and ceilings of the installation site to a centralized location where a network switches or hubs installed.

An insert 600 is inserted into at least in one of the housings 100a (100b). Inserts may be chosen from a list of available inserts such as computing devises 610, 650, etc. Preferably housing which are not in use are covered by blank cover 605.

Figure 4A:
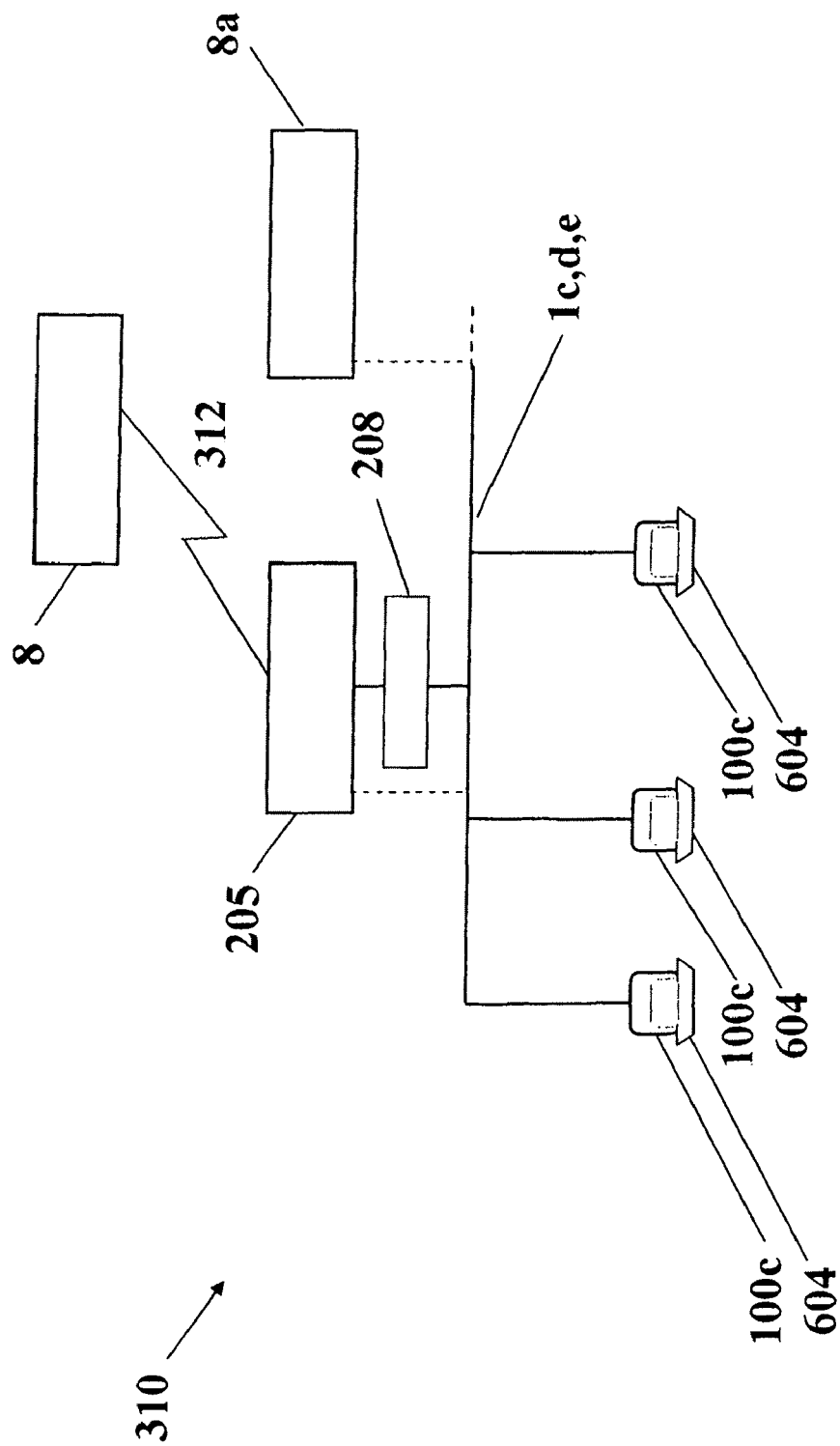
FIG. 4a illustrate high-level system diagram with one or more Residential gateway/server/broadband router or PCs, connected over standard power lines to multiple mains jack installed computer apparatuses of the present invention. This system represents a typical example of implementation of the current invention for home and Small Office/Home Office (SOHO) use.

It should be noted that plurality of standard LAN jacks may be connected to the same network infrastructure without interfering with its operation. In a typical installation few or all of the installed or existing LAN are replaced with insert housings 100a or 100b FIG. 4a illustrates another high-level system 310 diagram with broadband router, one or more local or remote servers, and multiple connected mains jack installed computer apparatuses.

System 310 comprises of a broadband modem/router/firewall/residential gateway/set top box 205 that connects the system sites to the internet 312, at least one remote server 8 or local server 8a that may be a standard PC or a dedicated appliance. The server 8/8a may be an application server, multimedia streaming server, presentation server, legacy host or a web server or any other type of server. Application server not only executes programs for the thin clients, but it also can provide the thin clients with access to all the resources available on the networks attached to the application server.

The broadband modem/router/firewall/residential gateway/set top box 205 connected to the site electrical system directly if equipped with network over power lines interface or through an external network over power lines interface box 208. This enables multiple of insert housings 100c typically replacing existing wall or floor mounted power jacks while connected trough household main power line 1c,d,e depicted here as one line cable.

An insert 604 is inserted into at least in one of the housings 100c. Inserts may be chosen from a list of available inserts such as computing devises 720, etc. For safety, housing which are not in use are covered by blank cover. It should be noted that plurality of standard main power outlets may be connected to the same power infrastructure without interfering with its operation. In fact, in a typical installation only few of the installed or existing power outlets are replaced with insert housings 100c This system illustrated here is a typical example of implementation of the current invention for home and SOHO use as it allows a simple network implementation using elements of the present invention without the need to install a special network cabling.

It should be understood that a mixed system comprising combination of elements of systems 300 and 310 may be constructed having plurality of housing boxes selected from 100a, 100b and 100c.

Figure 5:
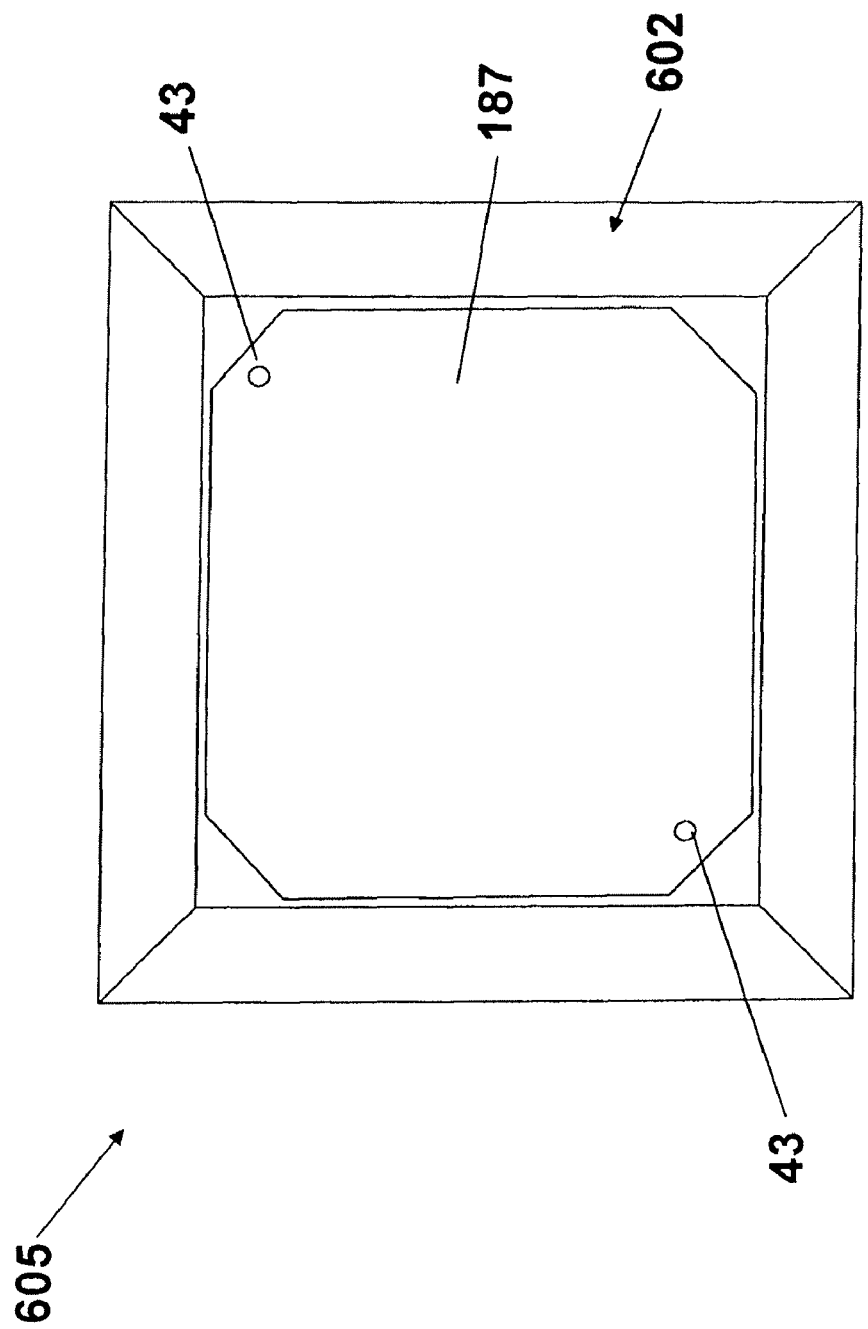
FIG. 5 illustrates a front view of a blank panel modular insert that may be used to cover unused installed jacks of the present invention.

FIG. 5 illustrates a front view of a blank panel modular insert 605. This panel may be used to cover unused installed jacks for decoration and protection.

Blank panel modular insert 605 comprises a blank front panel 187 with optional access holes 43 for insert lock-unlock special removal tool. Decorative frame 602 may be installed if installation space permits.

Optionally, all modular inserts types are built so they could be easily inserted into box 3, preferably by simply pushing them into place without the need of tools. However, once in place, modular inserts preferably cannot be removed without the use of special removal tool. In an embodiment of the invention, the removal tool is a key-like device that is inserted into holes in the front panel of the modular insert in order to free it from box 3.

Alternatively, blank panel modular insert 605 may be removed without using special removal tool. Optionally the blank panel modular insert 605 further contains an electronic circuitry intended to signal remote management system in case that the panel is removed. This may be done by closing an electronic circuit with a detection and load resistor that affects the Power Over Ethernet signature of that network. Removal of panel 605 will trigger the connected Power Over Ethernet switch to detect a disconnect event and to signal a remote management system of this event. This feature is specifically useful to protect access to unused network ports from unauthorized physical access.

The need to use special tool to remove the blank insert before being able to connect to the network connector give some protection against unauthorized use of the network.

Figure 5A:
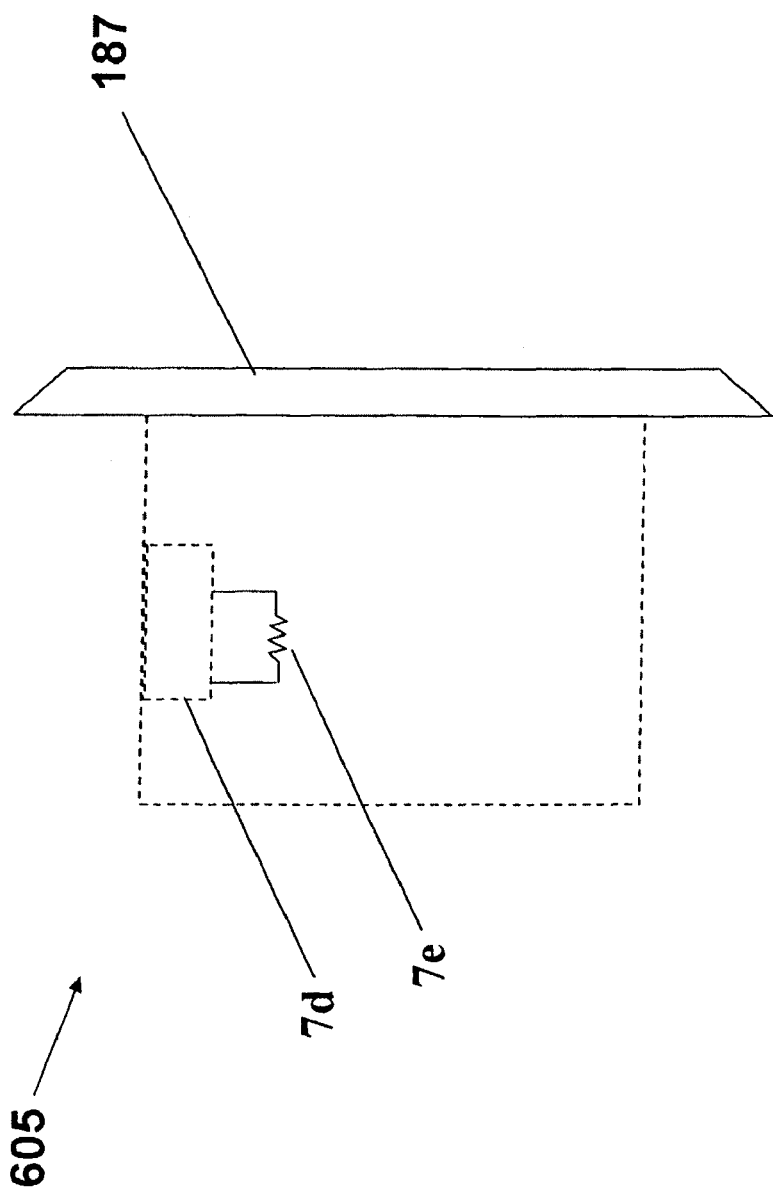
FIG. 5a illustrates a side view of blank panel modular insert that may be used to cover unused installed jacks of the present invention.

FIG. 5a illustrates a side view of the blank panel modular insert 605. This panel may be used to cover unused installed jacks for decoration and protection.

Optionally Blank panel modular insert 605 comprises a security mating connector 7d. In some embodiment, security mating connector 7d comprise a passive security device 7e such as a resistor, which is sensed by switch 10 or mid-span power injector 11 signaling the existence of blank insert covering the unused box 3. Removal of Blank panel modular insert 605 causes disconnection of optional security mating connector 7d, which can be sensed by the system and issue an alert warning of possible attempt of network abuse.

Additionally or alternatively, security mating connector 7d may comprise or connected to a passive or active electrical circuit configured to supply the system with authentication signal indicating its proper engagement within box 3.

It should be clear to a person skilled in the art that blank panel 605 and connector 7d may be configured to interface with systems 100a, 100b and 100c to provide the proper signaling. Blank cover 605 provides physical protection from dust and foreign elements and protection against unauthorized intrusion into the data system by insertion of unauthorized devices.

Generally, house main power systems are not intended to provide high data security and security elements may be omitted in a blank cover used with housing box 100c. Instead, a blank cover insert fitted with a simple power outlet providing electrical connections to lines 1c, 1d, and optionally 1e may be used.

Figure 6:
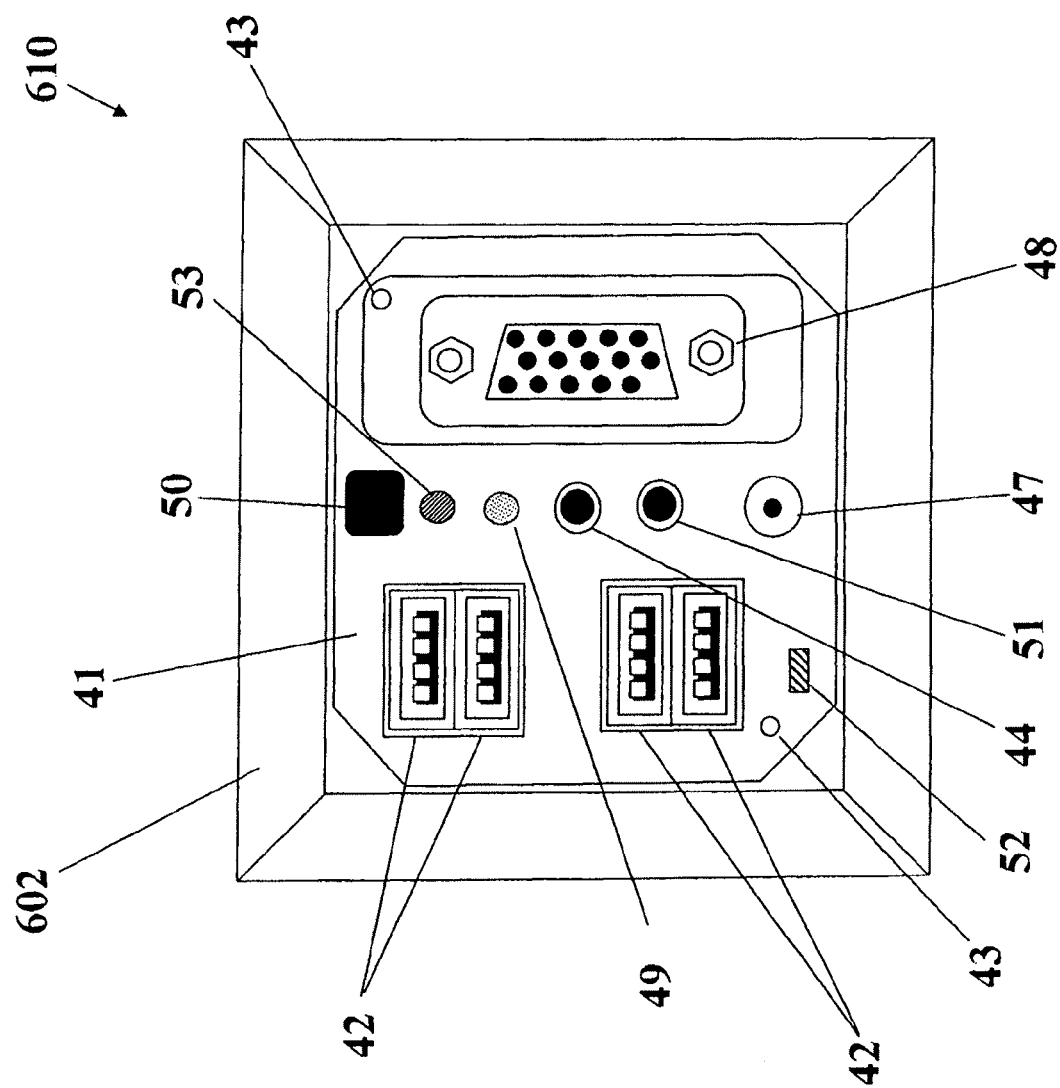
FIG. 6 illustrates typical computing apparatus according to an embodiment of the present invention.

FIG. 6 illustrates a typical computing apparatus insert module 610 according to an embodiment of the present invention.

Computing apparatus insert module 610 has a mating connector 7 in the form of 7 7b or 7c depending on its interface type and is configured to fit in box 3 of insert-housing 100a, 100b or 100c such that its mating connector is engaged with corresponding housing connector block 2 2a or 2d respectively.

Connector 2 (2a, 2d) provides power for operation of the various circuitry inside computing apparatus insert 610 as well as network services to the remote server or servers 8. Box 3 is preferably made of high heat-conductive material to assist dissipation of heat produced by the operation of the computing apparatus insert 610.

Computing apparatus insert module 610 comprises a front panel 41 with optional access holes 43 for special removal tool. An optional decorative frame 602 may be installed around the panel 41 if space permit.

Insert module 610 is built so it could be easily inserted into box 3, preferably by simply pushing it into place without the need for tools. However, once in place, modular insert 610 preferably locks and cannot be removed without the use of special removal tool. In an embodiment of the invention, the removal tool is a key-like device that is inserted into one or more holes in the front panel 41 of the modular insert in order to free it from box 3.

In the exemplary embodiment depicted in FIG. 6, insert module 610 is a thin-client apparatus connected to a server 8 through its mating connector and comprises at least few interface connections on its front panel 41.

In the exemplary embodiment, four Universal Serial (USB) ports 42 enable connection of insert module 610 to plurality of external USB peripherals such as keyboard, mouse, printer etc. Optional Audio Out connector 44 enables connecting external speakers or headphones. Optional Audio In connector 51 enables connecting an external microphone or other audio signal sources to the apparatus. Analog video out connector 48 enables connection of standard computer monitor. Optional Infra Red Data Association (IrDA) Transceiver 50 enables the computing apparatus interfacing wirelessly with mobile phones, Personal Digital Assistants (PDA) laptop computers etc. Optional Reset switch 49 enables manual reset of the apparatus. Optional Power and self test indicator 53 indicates device power in green light and self test failure in red light. Additional indicator light 52 may be fitted on the panel 41 to indicate LAN activity and Link status.

Optional Auxiliary power jack 47 may be installed on the panel 41 to enable direct power feeding from a wall-mounted DC power supply.

It should be noted that the exemplary configuration of FIG. 6 describes a typical embodiment of a thin-client computing apparatus insert module. For example, number of USB ports may vary. Alternatively, keyboard and mouse may be connected using other keyboard and mouse connectors such as PS/2 type instead of USB connector. For example; IrDA Transceiver may be omitted, Audio In or Audio Out or both audio connectors or reset switch may be omitted and other connectors may be added. Analog monitor connection may be replaced with other standard visual signal connections such as DVI, RGB, video connection, S-video connection etc. In addition an active or passive extension cable may be connected to enable comfortable location of connected peripherals at longer distance from the said apparatus. LVDS circuitry in the said computing apparatus insert or in the cable may be used to enable further extension of the video output to remote monitor.

Further more an internal or external user authentication peripheral such as smart card reader, biometric device may be fitted.

Figure 6A:
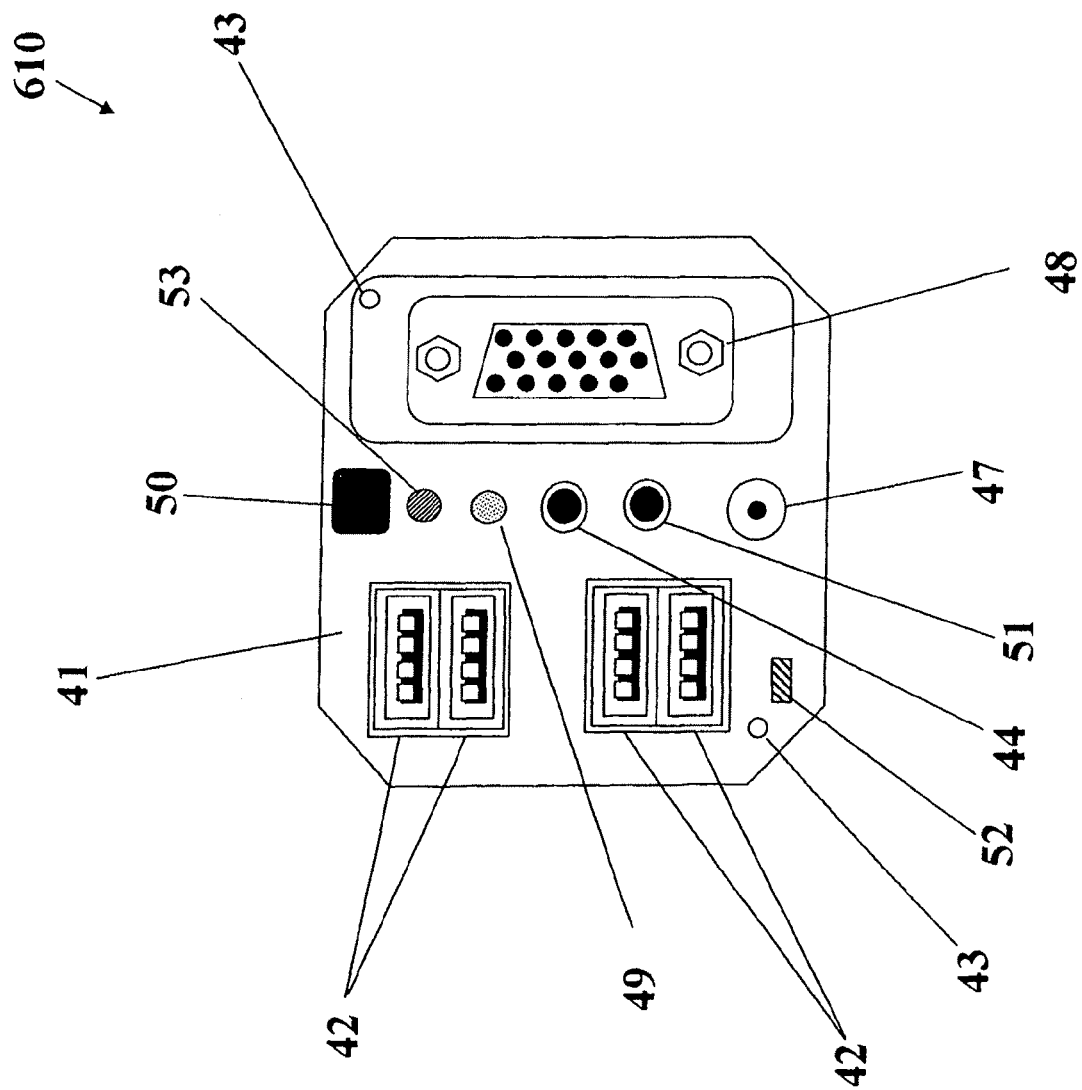
FIG. 6a illustrates the same computing apparatus as in FIG. 6 but without the decorative frame attached to its front panel.

FIG. 6a illustrates the same computing apparatus 610 of FIG. 6 but with the decorative frame 602 not assembled. This type of installation is typical for a space limited applications such as in floor-mounted box or in furniture.

Figure 7:
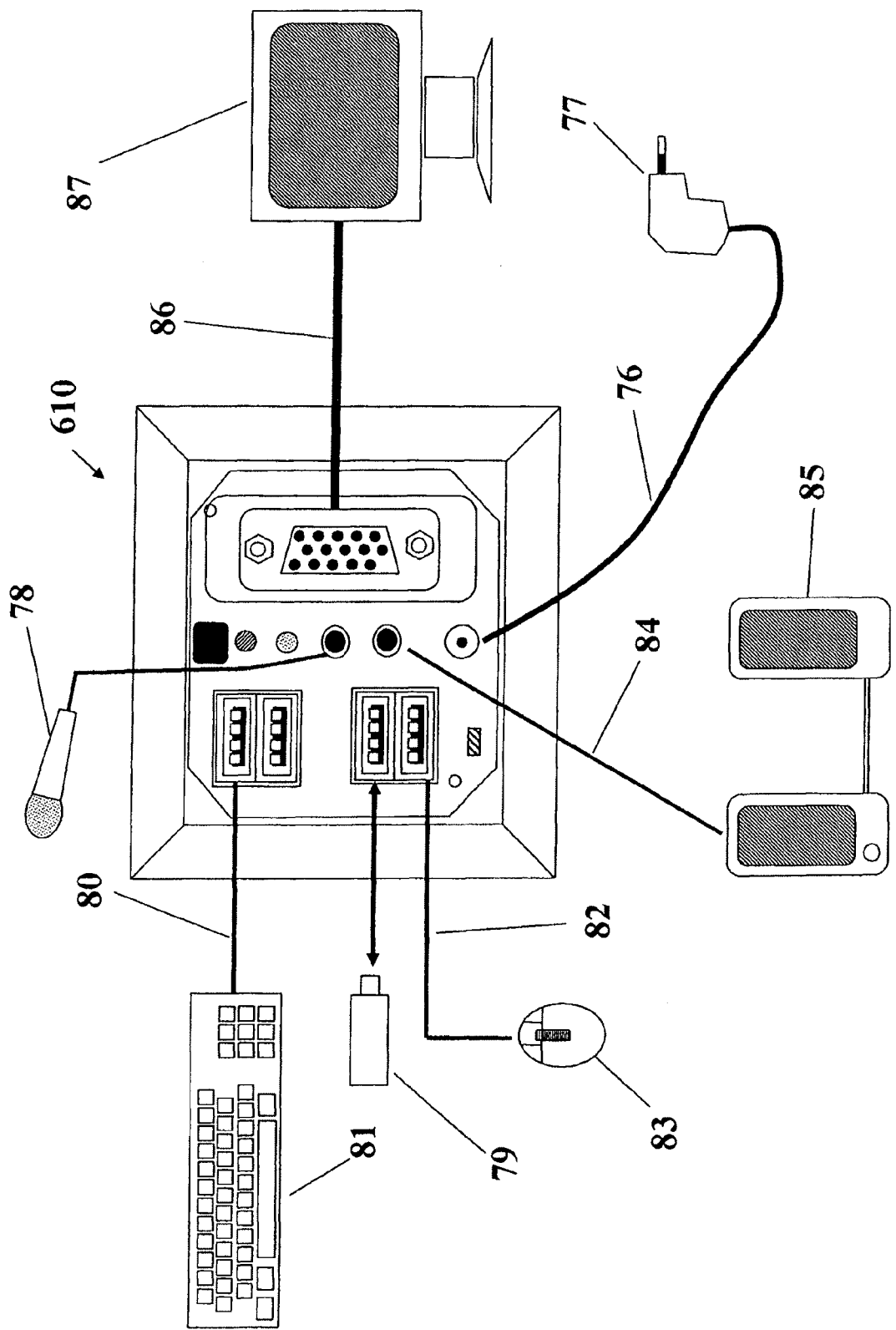
FIG. 7 illustrates a typical use of computing apparatus according to the embodiment of FIG. 6 and its connections to common desktop peripherals such as keyboard, mouse, speakers and monitor.

FIG. 7 illustrates a typical use of computing apparatus 610 according to the embodiment of FIG. 6 and its connections to common desktop peripherals such as keyboard, mouse, speakers and monitor.

For clarity, elements 41, 42, 43, 44, 47, 48, 49, 50, 51, 52 and 53, which are marked in FIGS. 6 and 6a, were not marked in this figure.

In order to use the installed computing apparatus 610 the user or technician connects computer peripherals such monitor, keyboard, mouse, and optionally a printer, external mass storage device, audio equipment etc.

In this exemplary embodiment, computing apparatus insert module 610 is connected to a keyboard 81 using first USB cord 80 connected to the first USB jack. Mouse 83 is connected to computing apparatus via a second USB cord 82. Optionally portable USB mass-storage device 79 is connected to third USB jack. Monitor 87 is connected to computing apparatus via Analog video cable 86. Monitor 87 may be a standard display such as CRT or LCD. Power to the monitor may be supplied separately.

Optionally Audio Out cable 84 is connected to (optionally amplified) stereo speakers 85 home theater or any other external multimedia appliance to enable audio output. Alternatively or additionally, audio equipment may be integrated into the display. Alternatively, USB based audio devices may be used. Equipped with audio in/out devices, the computing apparatus may be used for Voice Over Internet Protocol (VoIP) communication.

Optionally Microphone 78 is connected to the Audio in jack. Keyboard 81 and a mouse 83 are typically connected to the appropriate USB ports in the device panel. Alternatively, the mouse may be integrated to or connected to the keyboard. Optionally, additional USB ports or hub may be integrated into the keyboard or the display and be used to connect additional computer peripherals. Keyboard 81 and Mouse 83 may also be connected to the apparatus through wireless link such as Infrared or Radio Frequency Optionally, other computer peripherals such as: printer, mass storage devices, removable media storage device such as CD or DVD reader or Reader Writer, Disk On Key external memory, external modem, other I/O devices such games I/O, scanner, Fax, Musical Digital Instrument Interface (MIDI), card reader, magnetic card reader (for example for credit card reading), cash register, an industrial monitoring or operational machine such as industrial robot or industrial monitoring device or scientific data acquisition device or public displays such as airport terminal displays may be connected to the computing apparatus.

Optionally an external USB Hub may be connected to increase the number of computer peripherals that may be connected to the computing apparatus.

Optional Auxiliary power supply 77 connected via DC cable 76 may be added to supply power to the device in case that Power Over Ethernet is not available.

Figure 8:
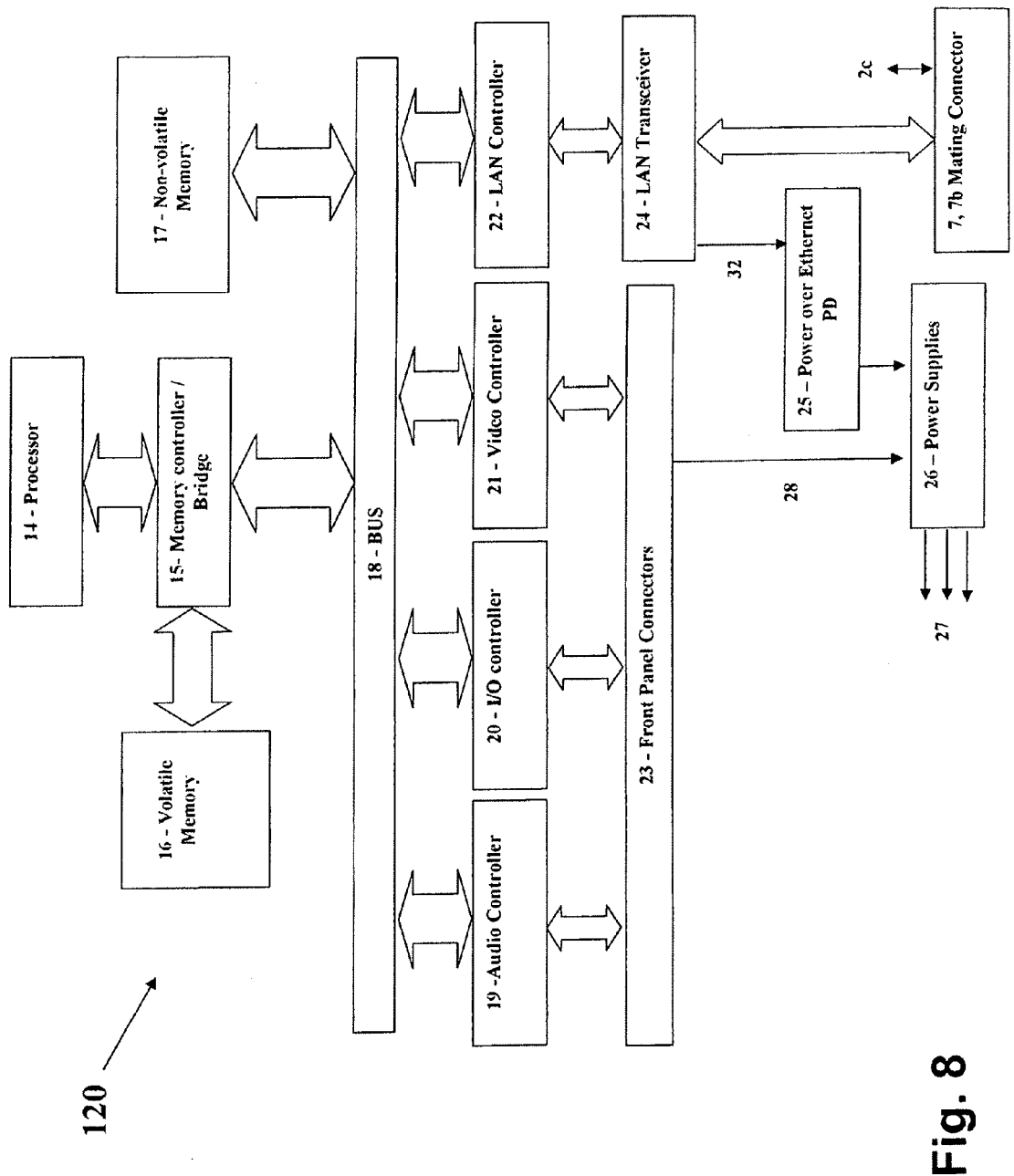
FIG. 8 illustrates a block diagram of an embodiment of the computing apparatus according to the present invention having wired LAN interface and power-over Ethernet options.

FIG. 8 illustrates a block diagram of a computing apparatus having wired LAN interface and power-over Ethernet options 120 according to an embodiment of the invention.

This drawing shows a block diagram of typical computing apparatus such as depicted in FIG. 6.

Computing apparatus 120 is a data processing electronic system capable of performing thin-client or stand-alone computing functions comprising:

Processor 14 process stored programs and data entered by user, peripherals and network. Processor is preferably chosen from available Reduced Instruction Set Computers (RISC) due to their lower power consumption and low heat generation. Alternatively, a Complex Instruction Set Computer (CISC), Security and encryption engine, Digital Signal Processor (DSP) or any other type or combinations of digital processor with sufficient processing power may be used.

A Memory controller/bridge 15 interface the said processor 14, with the volatile memory 16 and Bus 18. This function and others may be integrated with the processor 14 or installed separately.

Volatile memory 16 is used for storage of temporary data as needed by the processor 14. Memory 16 may be RAM type, SDRAM, DDRAM or any other type of volatile memory.

Internal bus 18 connects the various parts of the computing apparatus and may be a single or multiple buses. 16, 32 or 64 bit PCI or any other bus type. If multiple buses are implemented then bus bridges modules may be added to interface and drive the different buses.

Non-volatile memory 17, connected to bus 18, permanently stores data, programs and settings required for the apparatus operation.

Optional Audio controller 19 such as standard AC-97 CODEC is connected to bus 18 and to audio connectors 44 and 51 on front panel 23 is used for conversion of analog audio signal into digital stream and vise versa. Digital streams to and from the audio controller may be available directly on the internal bus 18 or on a dedicated CODEC bus such as AC Link. A dedicated bridge may be implemented to interface between the bus 18 and the said Audio controller 19. In addition this module may contain various analog stages such as mixers, switches, attenuators, filters, amplifiers etc. Also this module may include additional functionality and enhancements to support improved sound output for home theatre and multimedia applications. Audio circuitry may be single channel (Mono), dual channel (stereo) or more to enhance multimedia experience.

I/O controller 20 connected to bus 18 and to I/O connectors on front panel 23 is used for enabling connection of standard peripherals through standard ports such as USB, PS/2, Serial, Parallel, IEEE-1394 etc. This controller may also provide switched power source to power external peripherals.

Video controller 21, connected to bus 18 from one side and to video connector on front panel 23 on the other side. It is used for driving an external analog or digital monitor. Video controller 21 may contain internal video memory, external video memory or it may share the said volatile memory 16 with the said processor 14.

Local Area Network controller or Media Access Controller (MAC) 22, connected to bus 18 is used for interfacing the apparatus with the local network through the LAN transceiver (physical layer module) 24.

Front panel connectors and ports 23 are used for electrical connection of various external peripherals to the apparatus. These connectors connect the various ports such as the Audio controller 19, the I/O Controller 20 and the Video Controller 21. Front panel may also contain an external power jack to connect optional power supply. It may also contain various wireless connectivity means such as IrDA, Blue-tooth and Wireless LAN.

Local Area Network 24 transceiver (physical layer module) interface between the LAN controller (MAC) 22 and the LAN media connected to the apparatus through the mating connector 7, 7*b* or 7*c* depending on its type. LAN Transceiver 24 may be connected to the Local Area Network controller 24 by means of Media Independent Interface (MII) bus or by other interconnection buses. Local Area Network 24 transceiver may support 100BASE-TX, 100BASEFX, 10BASE-T and Giga LAN or other LAN protocols.

Local Area Network controller 24 connected to the main Internal Bus 18. This connection allows data received and transmitted through the wireless LAN and available on the bus 18 to communicate with the wired LAN infrastructure. Data is passed from the building LAN infrastructure 1 through the housing connector 2, Mating connector 7, 7*b* or 7*c*, LAN Transceiver 24, LAN Controller (MAC) 22 to the Internal Bus 18.

Power over Ethernet Powered Device circuitry 25 extracts power from the LAN transceiver 24 to power all apparatus circuits. This circuitry may comply with industry standards such as IEEE 802.3af or pre-standard High Power Over Ethernet to operate in conjunction with standard power switches and hubs. This circuitry contains Powered Device modules such as input filters, rectifiers, detection, classification, isolation switch and isolated down-converter switching power supply to reduce the LAN 48V power to low voltage stable supply needed to power apparatus circuitry. This module may contain the required logic and signaling required by the appropriate standards to be incorporated in such interface.

Line 32 represents the 48 VDC power that is extracted from the LAN transceiver 24 to feed the power over Ethernet Powered Device circuitry 25.

Power supplies 26 uses the Power over Ethernet power 25 or the auxiliary power input from the front panel ports 23 and convert it to the appropriate voltage/s output 27 required by the different apparatus' circuits. This module may also include timing circuitry to provide power up sequencing for other circuits. It also may contain reset signal/s generation to enable proper starting and power interruption detection.

Voltage output/s 27 from Power supplies 26 powers all other apparatus circuitry.

Optional Auxiliary power path 28 from front panel auxiliary power jack, provides alternative power source to power supplies 26. Diodes or logic may be used to avoid a situation when both auxiliary and Power Over Ethernet sources supplying the apparatus at the same time.

Mating connector 7 7*b* or 7*c* connects LAN, Power and various other signals between the apparatus and the housing connections described above. Mating connector may support location programmable memory chip 2*c*, power and data signals.

Optional connection to optional location memory chip 2*c* allows data input output through the mating connector.

The preferred thin-client embodiment described here may run local operating system such as Microsoft Windows CE, Linux or any other compatible embedded OS. If the implemented hardware compatible with standard x86 or limited size x86 then it can also run larger x86 operating system such as, Microsoft® Windows XP or XP embedded. The said operating system can run plurality of local programs to enable connection to remote servers. These programs may include Citrix ICA client to communicate with Citrix server, Microsoft Terminal Services RDP client to support remote Windows servers and various local terminal emulations to communicate directly with legacy systems. Running such clients enables the thin-client computing device to run applications in a session that runs in the remote server.

In addition to that the thin-client computing apparatus may run plurality of independent local applications such as web-browser, multimedia players and dedicated user applications.

Further more the thin-client computing apparatus may also contain remote management agent/s. These agents enables the organization to manage device and user settings remotely. It may also enable centralized software deployment and user authentication and security monitoring.

All together such an implementation can be very beneficial to the user organization in reducing the IT total cost of ownership, providing higher reliability and security and faster reaction to various changes. Combining all these features with the seamless installation and physical footprint offered by the present invention enables even better and faster transition from PCs to thin-clients.

Figure 8A:
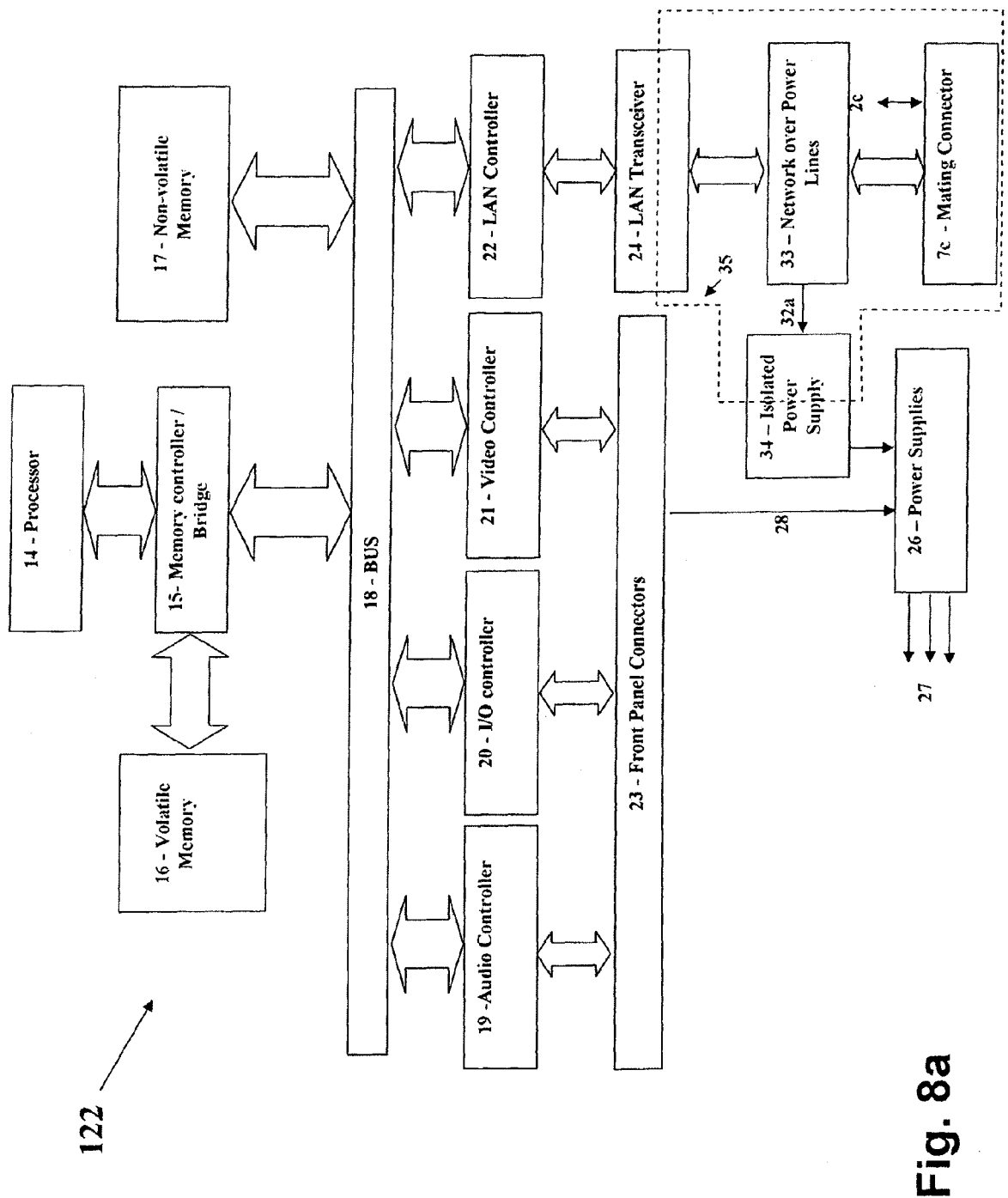
FIG. 8a illustrates similar embodiment of the computing apparatus in FIG. 8 but with network over power lines circuitry instead of LAN cabling interface.

FIG. 8*a* illustrates a block diagram 122 of a computing apparatus having network over power lines interface to enable simple installation of the apparatus of the current invention inside or in conjunction with the mains power jack.

This drawing shows a block diagram of typical computing apparatus such as depicted in FIG. 6.

Computing apparatus 122 is a data processing electronic system capable of performing thin-client or stand-alone computing functions comprising in addition to the components shown in FIG. 8 and instead of the Power over Ethernet PD circuitry:

Mating connector 7c with power lines connectivity to deliver high voltage AC lines for the computing apparatus power and network interfaces.

Network Over Power Lines circuitry 33 to combine network traffic on the standard connected AC power network.

Isolated AC to DC power supply 34 to supply the low voltage DC power required for the computing apparatus operation.

Dashed area 35 represents the isolated area inside the apparatus to ensure that the power lines dangerous high voltage would not leak to the low voltage interfaces. This isolation is critical to ensure user's safety at all conditions.

Line 32a represents the AC power that is extracted from the AC input circuitry of the Network over power lines circuitry 33 to feed through the isolated power supply 34 the rest of the apparatus circuitry.

Figure 8B:
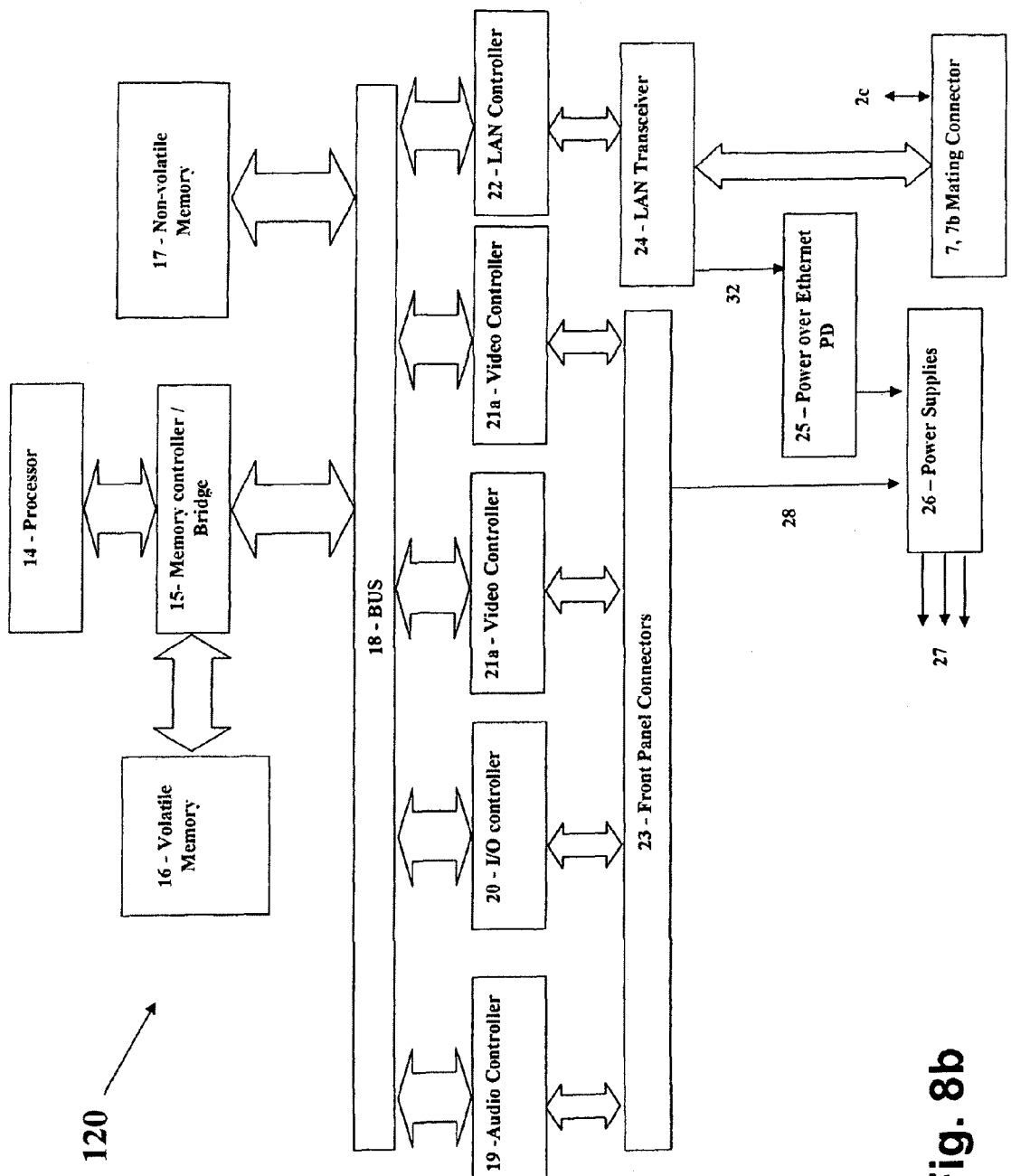
FIG. 8b illustrates a block diagram of an embodiment of the computing apparatus according to the present invention having wired LAN interface and power-over Ethernet options with plurality of video controllers.

FIG. 8b illustrates a block diagram of an embodiment of the computing apparatus according to the present invention having wired LAN interface and power-over Ethernet options with plurality of video controllers. In the exemplary embodiment, two video controllers are connected to bus 18.

Preferably, this embodiment uses Digital Video Interface (DVI) connector on the front panel to support dual display.

Figure 9:
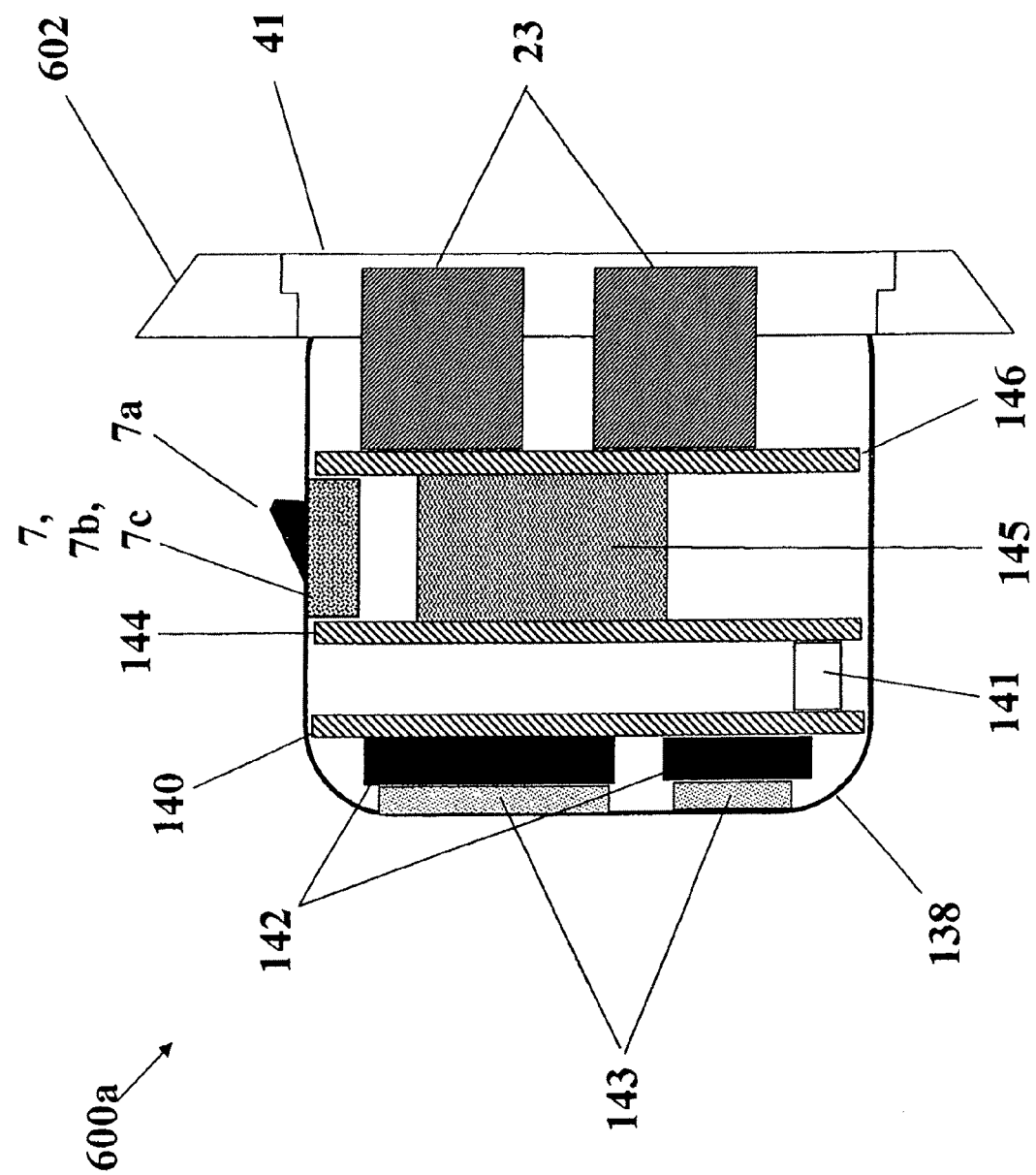
FIG. 9 illustrates a cross-sectional view of a typical embodiment of the present invention showing the various internal Printed Circuit Boards and interconnects.

FIG. 9 illustrates a cross-sectional view of a typical insert 100d according to an exemplary embodiment of the present invention. The implementation shown although is an example, represents a reasonable arrangement to ensure small size, good electrical characteristics, lower costs and assembly flexibility.

Preferably, some or all inserts depicted as 600, 603, 604, 100a, 100b, 100c, 610, 630, 640, 641, 650 and 720 share the same layered construction design.

First Printed Circuit Board layer is Core 140. Core layer preferably contains the Processor, Memory controller/bridge, Bus/Buses, Volatile memory, Non-volatile memory, Video controller, On-Board programming and testing port and LAN controller. Other circuitry may be added to support the core functions as needed. Core busses as well as other I/O and power planes are routed through the inter-board connectors and passed through the modules as necessary.

In addition the core layer typically contains an interconnect component 141 to interface it with the next layer. Hot components 142 such as the processor, bridge and video controller chips may be located at the aft side of the PCB to assist in heat dissipation to the metallic case 138. Heat is better conducted to the cover through silicon greases layer or elastic heat-conducting pads 143. Metallic cover 138 serves both as an EMI shielding and as part of the mechanical structure of the apparatus.

The second layer is the Peripheral and Power layer 144 consisting of Audio controller, I/O controller LAN transceiver, Power Over Ethernet circuitry, various power supplies, USB hub, USB power switching and support circuits. This layer also contains the interconnect means to the core layer 141 and additional interconnect means 145 to the next layer. Some signals are passing through this layer from the core layer to the next layer. The Peripheral & Power layer further consisting of the mating connector 7 or 7b or 7c to provide the electrical interfaces with the housing and the attached LAN cable or fibers. This modular construction enables an easy implementation of the 3 different power/network modes—Power over Ethernet, fibers and network over power lines with just one module change.

In the case of main power option, power supplies in peripheral and power layer 144 are configured to rectify the household main power in the country it is intended to be used. Alternatively, power supplies may be automatically configured by detecting the supplied household voltage or adopted to tolerate wide range of household voltages.

The third layer is the Connector Front panel layer 146. This layer contains all front panel connectors 23, switches, indicators and so forth that penetrating through the apparatus's front panel 41. Front panel 41 may be coated internally with conductive coating to shield EMI radiation. Metallic cover 138 may be pressed into the front panel 41 internal coating to assure proper apparatus shielding.

The Connector Front panel layer further contains the mating interconnect means to interface with the Peripheral & Power layer. This layer may also contain various filters logic and protection circuitry as needed to protect and support the various ports.

Decorative frame 602 may be assembled to enhance the installation esthetics if desired. As shown in FIG. 6a the decorative frame 602 is built around the front panel 41 in such way that it can only be removed backwards when the insert is completely removed from the wall/floor housing. This is an important feature to assure that the decorative frame 602 will not be removed inadvertently or on purpose by unauthorized person.

The said three layers are typically connected mechanically by sets of spacers not shown in this figure to form a rigid structure with in conjunction with the metallic cover 138.

Figure 9A:
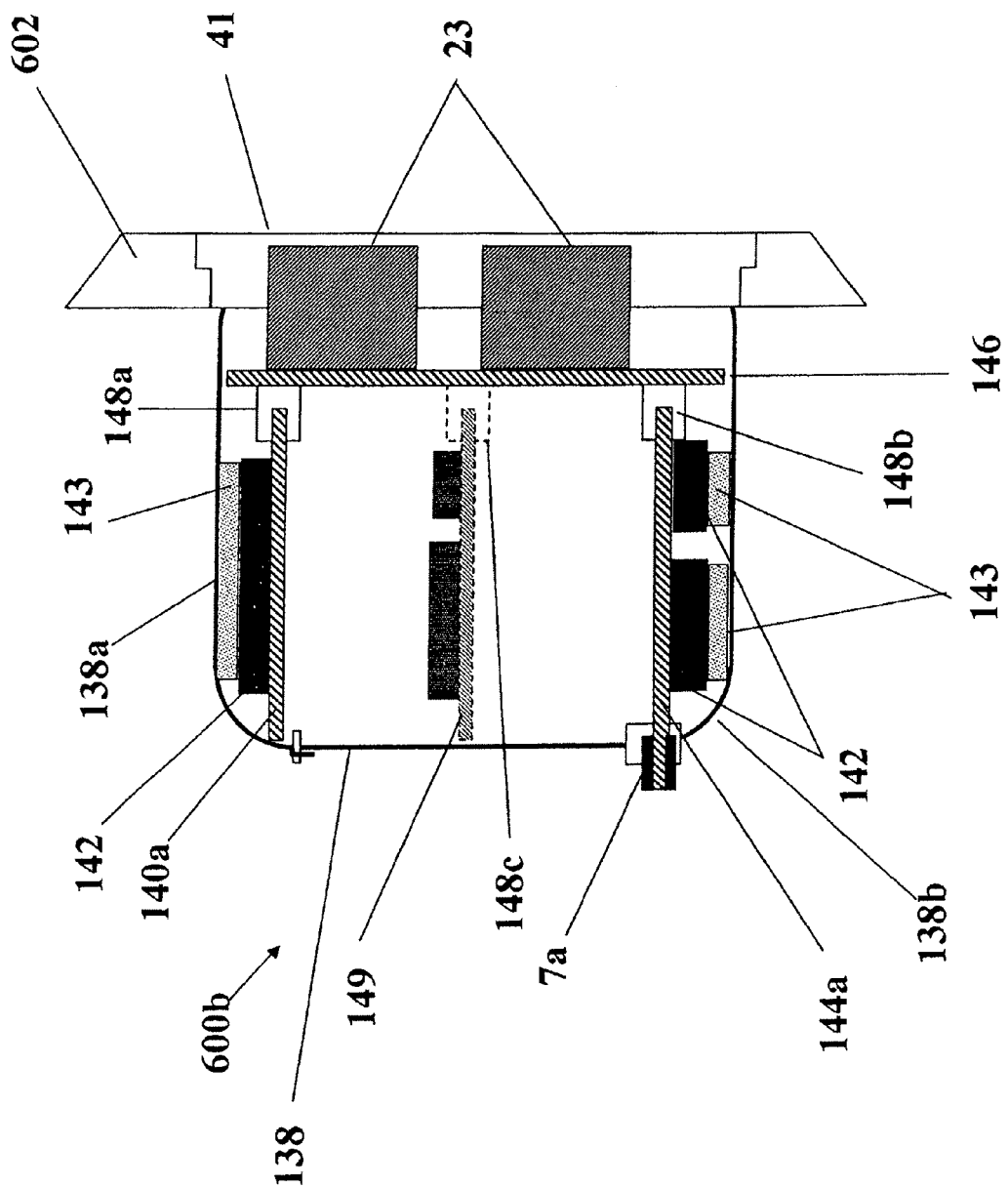
FIG. 9a illustrates a cross-sectional view of an additional embodiment of the present invention showing the various internal Printed Circuit Boards and interconnects.

FIG. 9a illustrates a cross-sectional view of an additional embodiment of an insert 600b according to an exemplary embodiment of the present invention. The implementation shown although is an example, represents a reasonable arrangement to ensure small size, good electrical characteristics, lower costs and assembly flexibility.

Some or all inserts depicted as 600, 603, 604, 100a, 100b, 100c, 610, 630, 640, 641, 650 and 720 may share the same layered construction design.

Core Printed Circuit Board 140a preferably contains the Processor, Memory controller/bridge, Bus/Buses, Volatile memory, Non-volatile memory, Video controller, On-Board programming and testing port and LAN controller. Other circuitry may be added to support the core functions as needed.

The core layer 140a connects to Front panel layer 146 through connector 148a. Hot components 142 such as the processor, bridge and video controller chips may be located at the outer side of the PCB to assist in heat dissipation to the metallic case 138. Heat is better conducted to the cover through silicon greases layer or elastic heat-conducting pads 143. Metallic cover 138 serves both as an EMI shielding and as part of the mechanical structure of the apparatus.

Optionally, metallic case 138 is a modular construction comprised of sections. For example, core layer 140a may be manufactured with a section of the case 138a already mechanically and thermally attached. Inserting core layer 140a into connector 148a provided electrical connection to front panel layer 146 as well as mechanical and thermal integrity of the case. Power and LAN layer 144a preferably consists of interface with house infrastructure. This layer preferably comprises mating connector 7a, LAN transceiver, Power Over Ethernet circuitry, various power supplies. This layer connects to Front panel layer 146 through connector 148b. Hot components 142 may be located at the outer side of the PCB to assist in heat dissipation to the metallic case 138b.

Heat is better conducted to the cover through silicon greases layer or elastic heat-conducting pads 143. Metallic cover 138b serves both as an EMI shielding and as part of the mechanical structure of the apparatus.

Optionally, metallic case 138 is a modular construction comprised of sections. For example, layer 144a may be manufactured with a section of the case 138b already mechanically and thermally attached. Inserting core layer 144a into connector 148b provided electrical connection to front panel layer 146 as well as mechanical and thermal integrity of the case.

Modular construction of allows replacement of only power and LAN layer 144a to change the configuration of the insert from one configured to fit into insert-housing installation with Ethernet LAN 100a to a configuration that fits into Fiber based LAN housing 100b or main power insert-housing 100c.

Optionally, less power-consuming devices such as Audio controller, I/O controller, etc, are located on central layer 149 which optionally connects to Connector Front panel layer 146 via optional connector 148c.

Decorative frame 602 may be assembled to enhance the installation esthetics if desired. As shown in FIG. 6a the decorative frame 602 is built around the front panel 41 in such way that it can only be removed backwards when the insert is completely removed from the wall/floor housing. This is an important feature to assure that the decorative frame 602 will not be removed inadvertently or on purpose by unauthorized person.

The said three layers are typically connected mechanically by sets of spacers not shown in this figure to form a rigid structure with in conjunction with the metallic cover 138.

It should be clear that modular construction of 600a and 600b allows flexible reconfiguration of the inserts and using common modules in design and construction of large number of inserts.

For example, replacing Connector Front panel layer 146 with "headless" front panel, with optionally removal of central layer 149, would tern computing insert with power pass-through and LAN port to a headless computing device 641.

Similarly, insert with larger or lesser computing power may be achieved by exchanging core layer 140a

Figure 10:
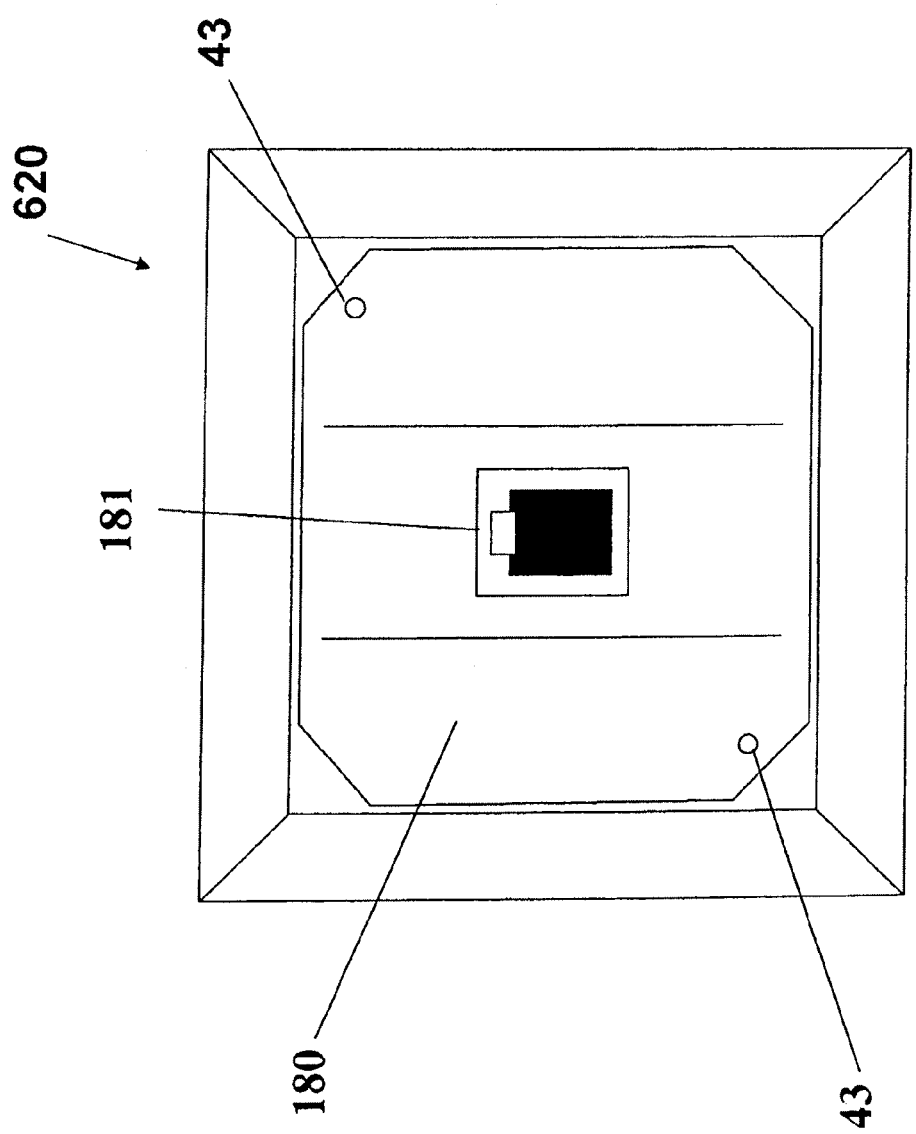
FIG. 10 illustrates another modular insert according to an embodiment of current invention with a LAN port to enable connection of other devices directly to the LAN infrastructure.

FIG. 10 illustrates another modular insert with a standard network jack 620 according to the current invention.

Modular insert with a standard network jack 620 which fits inside box 3 comprises a front panel 180 fitted with optional decorative frame 602 and equipped with 2 access holes for special removal tool 43 and an RJ-45 LAN jack 181. This LAN jack 181 receives and transmits signals to and from the mating connector at the top or bottom side of the modular insert, thus provides a simple pass-through RJ-45 LAN port to connect network-enabled devices. This exemplary embodiment of the invention is intended to be used as a standard LAN jack to connect standard network connected devices such as VoIP phone, PC, laptop, printer etc.

Figure 11:
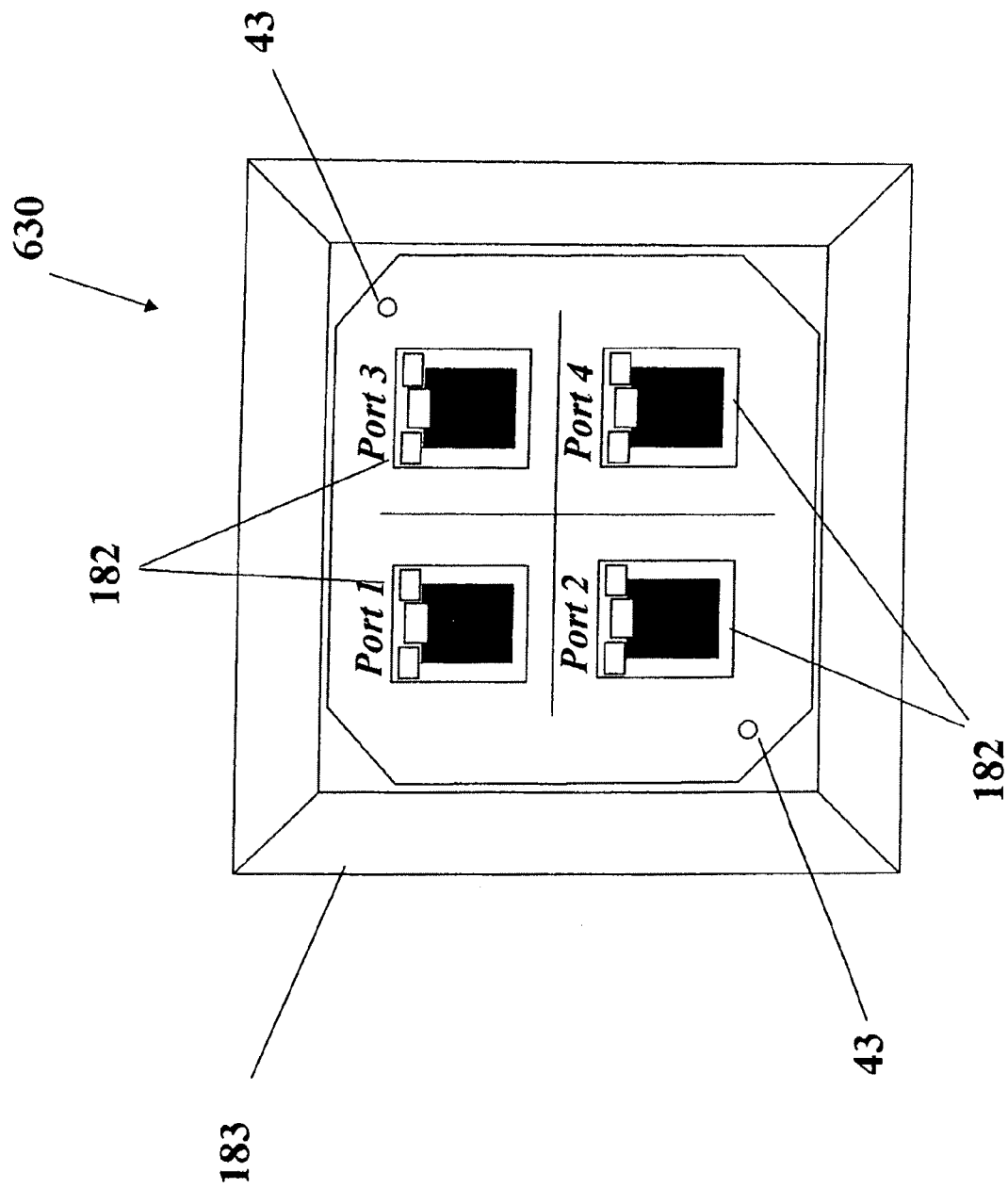
FIG. 11 illustrates yet another modular insert option comprising of four LAN ports network switch.

FIG. 11 illustrates yet another modular insert with four LAN ports 630.

Modular insert with four LAN ports 630 is a 4-way LAN hub or switch that can fit inside box 3 to enable connection of multiple standard LAN enabled devices such as computers, printers, laptop computers etc. Modular insert with four LAN ports 630 comprises a front panel 183 equipped holes for special removal tool access 43 and four RJ-45 LAN jacks 182. Modular insert with four LAN ports 630 receives and transmits signals to and from the mating connector at the top or bottom side of the modular insert, and comprises an electronic switch configured to support the four LAN ports 182, thus providing four RJ-45 LAN ports to connect network-enabled devices. This exemplary embodiment of the invention, is intended to be used as a standard LAN jack for VoIP phone, PC laptop etc. Power to the hub and to the downstream ports may be provided by Power Over Ethernet method (such as IEEE 802.3af) from the connected LAN infrastructure. It should be clear to a person skilled in the art of electronics that the modular insert may be constructed with other number of LAN ports such as two, three or six, etc or with other enhancements such as remote management and security functions.

Figure 11A:
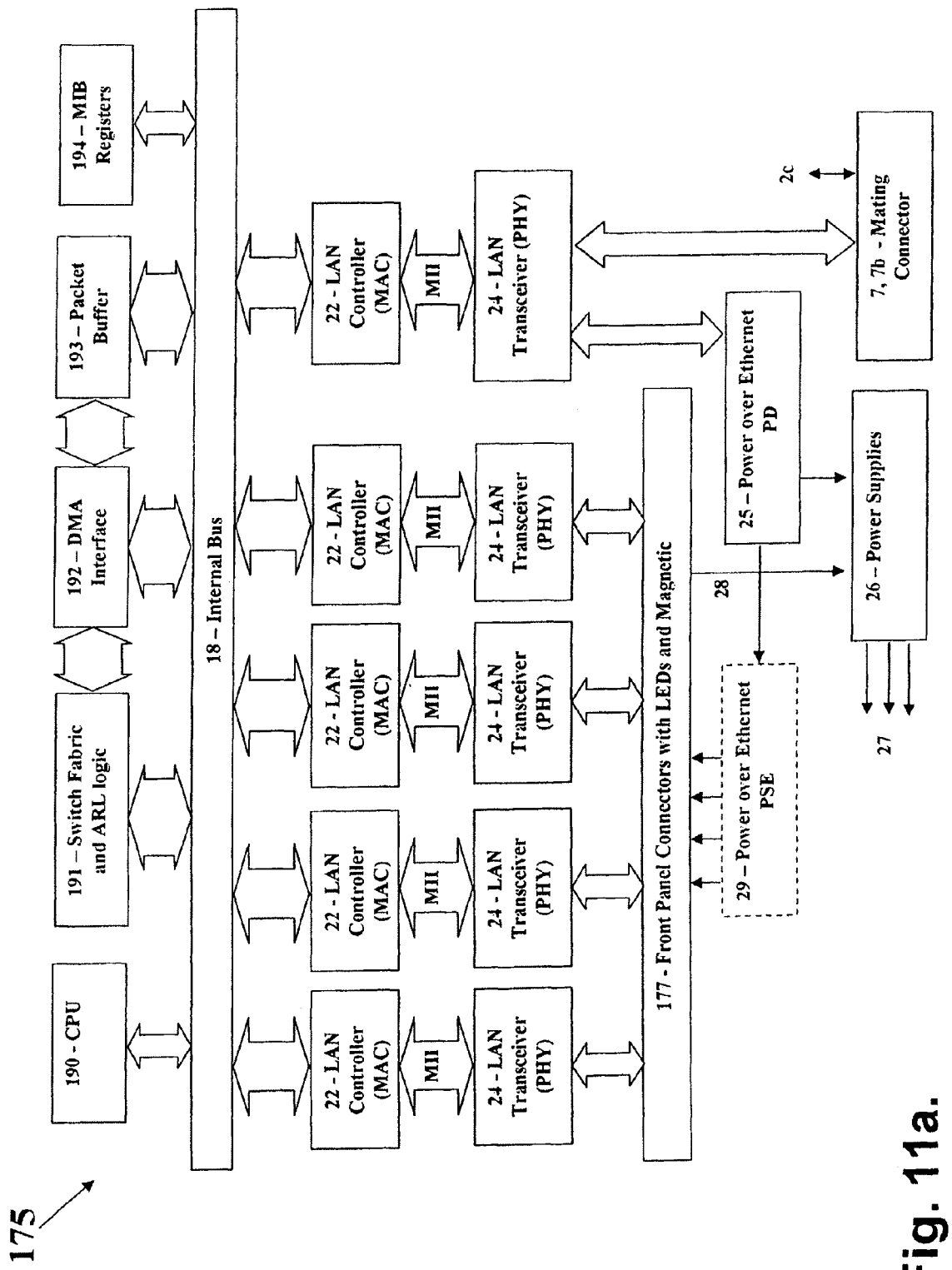
FIG. 11a illustrates a block diagram of a typical LAN switch insert according to an embodiment of the present invention.

FIG. 11a illustrates a block diagram describing LAN Switch Function.

The network switch passes data frames received from a transmitting station (either from the building infrastructure network or from the externally connected clients) to a destination station based on the header information and the received data frame.

The switch may comply with the IEEE 802.3, IEEE 802.3u, IEEE 802.3x, IEEE 802.3af industry standards or any other standard or functional design. The switch may also comply with pre-standard High Power Over Ethernet to provide power forwarding to the 4 ports. Switch may be managed on non-managed type as needed.

LAN Switch insert module 175 has a mating connector 7, 7b or 7c depending on its interface type and is configured to fit in box 3 of insert-housing 100a 100b or 100c such that its mating connector is engaged with corresponding housing connector 2 or 2a respectively. Mating connector 7, 7b or 7c connected to Local Area Network 24 transceiver (physical layer module) interface between the LAN controller (MAC) 22 and the LAN media connected to the apparatus through the mating connector 7, 7b or 7c depending on its type. LAN Transceiver 24 may be connected to the Local Area Network controller 24 by means of Media Independent Interface (MII) bus or by other interconnection buses. Local Area Network 24 transceiver may support 100BASE-TX, 100BASE-FX, 10BASE-T and Giga LAN or other LAN protocols.

Power over Ethernet Powered Device circuitry 25 extracts power from the LAN transceiver 24 to power all apparatus circuits. This circuitry may comply with industry standards such as IEEE 802.3af or pre-standard High Power Over Ethernet to operate in conjunction with standard power switches and hubs or midspan power injectors. This circuitry contains Powered Device (PD) modules such as input filters, rectifiers, detection, classification, isolation switch and isolated down-converter switching power supply to reduce the LAN 48V power to low voltage stable supply needed to power apparatus circuitry. This module may contain the required logic and signaling required by the appropriate standards to be incorporated in such interface.

Optional Power Over Ethernet Power Sourcing Equipment (PSE) controller 29 may be added to provide downstream ports with Power Over Ethernet. This may be useful to support connected IP Phones or other Powered Devices. To enable full power downstream, the Power Over Ethernet Powered Device module 25 need to be powerful enough. This can be implemented with High Power Over Ethernet circuitry.

Power supplies 26 uses the Power over Ethernet power and convert it to the appropriate voltage/s output required by the different apparatus' circuits. This module may also include timing circuitry to provide power up sequencing for other circuits. It also may contain reset signal/s generation to enable proper starting and power interruption detection.

Local Area Network controller 24 connected to the main Internal Bus 18. This connection allows data received and transmitted through the LAN switch to be available on the internal bus 18 to communicate with the fixed infrastructure building LAN. Data is passed from the building LAN infrastructure 1 through the housing connector 2, Mating connector 7, 7b or 7c, LAN Transceiver 24, LAN Controller (MAC) 22 to the Internal Bus 18 and vice versa.

Typical network switch embodiment uses volatile memory as packet buffer 193 to temporarily store the packets of data which it receives from the units (end node or network switch) connected to it while the switch logic determines how, when and through which port to retransmit the packets. Each packet can be transmitted to only one destination address (a "Unicast" packet) or to more than one unit (a "multicast" or "broadcast" packet). For multicast and broadcast packets, the switch typically stores the packet only once and transmits multiple copies of the packet to some (multicast) or all (broadcast) of its ports. Once the packet has been transmitted to all of its destinations, it can be removed from the packet buffer memory 193 or written over.

In the LAN switch insert embodiment shown here 4 ports are provided to connect external clients to the LAN. To interface with these 4 ports, 4 sets of LAN connectors are built in the front panel 177. Panel may further include the LAN magnetics, EMI filtering and indicator LEDs. Each port is connected to its respected LAN transceiver (PHY) 24. Each PHY is connected- to its respective LAN Controller (MAC) 22 through an MII bus. All LAN controllers are then connected to the internal bus 18.

Packets received at each of the ports in the front panel 177 are temporarily stored in receive packet buffers 193 by either the DMA controller 192 or directly from the internal bus 18. From the packet buffer 193 received packets may be distributed to their destination ports by any convenient means through the switch fabric 191. The switch fabric 191 and the attached logic physically connect specific input port to specific output port for direct packet streaming.

Optional CPU 190 can be used as necessary to program and monitor the exact rules which are appropriate to control packet processing. However, typically once the switch logic registers are appropriately programmed or configured, the switch may operates, as much as possible, in a free running manner without communicating with CPU 190.

Optional Management Information Base (MIB) Registers 194, connected to bus are registers implemented in the switch system to enable remote monitoring and configuration of that switch from remote sites using standard SNMP (Simple Network Management Protocol). In addition the MIB registers enables collection and transmitting of ports statistics. MIBs are a collection of definitions, which define the properties of the managed object within the device to be managed. Every managed device keeps a database of values for each of the definitions written in the MIB. It is not the actual database itself—it is implementation dependant. Definition of the MIB conforms to the SMI given in RFC 1155. Latest Internet MIB is given in RFC 1213 sometimes called the MIB-II.

Figure 12:
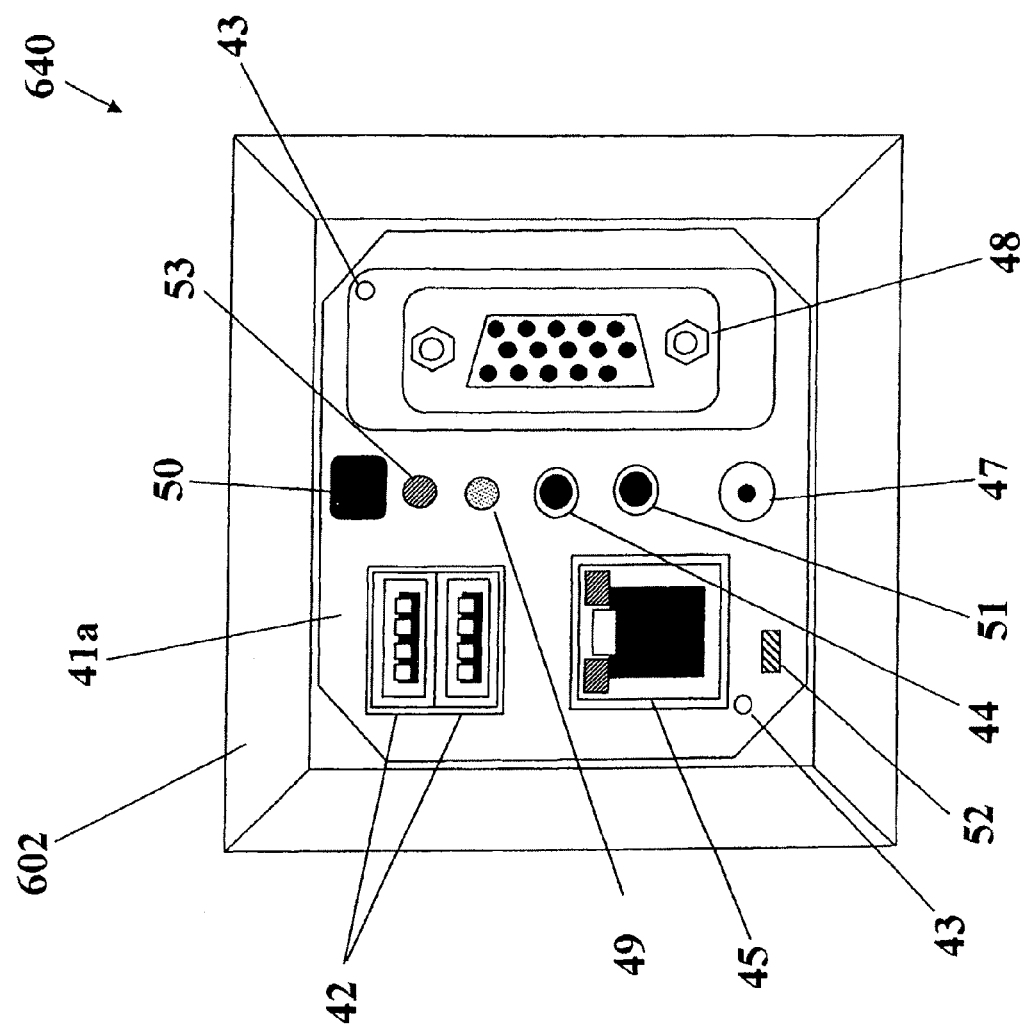
FIG. 12 illustrates another embodiment of the present invention of a computing apparatus with an additional second LAN port accessible from the front panel.

FIG. 12 illustrates a computing apparatus insert module with an additional LAN port 640 according to the preferred embodiment of the present invention. This insert module with pass-through LAN port 640 is similar to computing apparatus insert module 610 as depicted in FIG. 6.

Computing apparatus insert module 640 has a mating connector 7, 7b or 7c depending on its interface type and is configured to fit in box 3 of insert-housing 100a, 100b or 100c such that its mating connector is engaged with corresponding housing connector 2 or 2a respectively. An optional decorative frame 602 may be fitted if installation space permitting. Connector 2 (2a, 2d) provides power for operation of the various electronic circuitry inside the computing module 640 as well as data link to the remote server 8. Computing apparatus insert module 640 comprises a front panel 41a with optional holes 43 for special removal tool. Insert module 640 is built so it could be easily inserted into box 3 and locked. In the exemplary embodiment depicted in FIG. 12, insert module 640 is a thin-client apparatus connected to a server through its mating connector and comprises at least few interface connections on its front panel 41a.

In the exemplary embodiment, two Universal Serial (USB) ports 42 enable connection of insert module 640 to plurality of external USB peripherals such as keyboard, mouse, printer etc.

Audio Out jack 44 enables connecting external speakers or headphones. Optional Audio In/microphone jack 51 enables connecting an external microphone or other audio signal sources to the apparatus.

Analog video out connector 48 enables connection of standard monitor.

Optional Infra Red Data Association (IrDA) Transceiver 50 enables wireless interface with variety of external devices such as mobile phones, Personal Digital Assistants (PDA) laptop computers etc.

Reset switch 49 enables manual reset of the apparatus.

A LAN port 45 is provided on front panel 41a. This LAN port may be used for connection network enabled external devices such as Laptop computer, Voice Over IP phone or other LAN based device. Optional power forwarding option may be installed to enable downstream powering of the connected device. In that case the LAN jack 45 may be fitted with power indicator to indicate that the connected powered device is receiving power.

This optionally RJ-45 LAN port may be used as a "Pass-through" or it may be controlled by the processor within insert module 640. For example, insert module 640 may be used to provide Virtual Privet Network (VPN) over existing LAN, increasing data security for example by encryption of the data exchanged between the end user and host 8. Additionally or alternatively, insert module 640 may be used as "firewall" protecting the LAN against intentional or unintentional attempts to perform unauthorized communication. For example, inserted module 640 may be configured to assess the identity of any device or user connecting to LAN port 45, blocking any unauthorized use of the said port.

Optionally inserted module 640 is equipped with an auxiliary power input jack 47 for connection of external DC power-supply.

Optional Link/Activity indicator 52 may be fitted on the front panel 41 to provide a visible indication of the connected infrastructure (upstream) LAN status.

It should be noted that the exemplary configuration of FIG. 12 describes a typical embodiment of a thin-client computing apparatus insert module with an additional LAN port. For example, number of USB ports may vary or omitted. Alternatively or additionally, keyboard and mouse connectors may be used instead of USB connector. For example; IrDA Transceiver may be omitted, Audio In or Audio Out or both audio connectors or reset switch may be omitted and other connectors may be added. Monitor connection may be replaced with other standard visual signal connections such as RGB, video connection, S-video connection etc.

In some embodiments of inserted module 640 some of the elements: 602, 42, 44, 47, 48, 49, 50, 5, 152 and 53 may be omitted.

Specifically, in an embodiment of the invention, inserted module 640 is used as firewall or to provide Virtual Privet Network (VPN). In this embodiment, some or all the elements: 42, 44, 47, 48, 49, 50, 51 and 52 may be omitted.

An optional use of LAN port 45 is to enable standard or proprietary data encryption between the connected device and remote network resources.

Such implementation may be useful to high-security applications where tunneling or additional encryption required for externally connected devices.

Figure 12A:
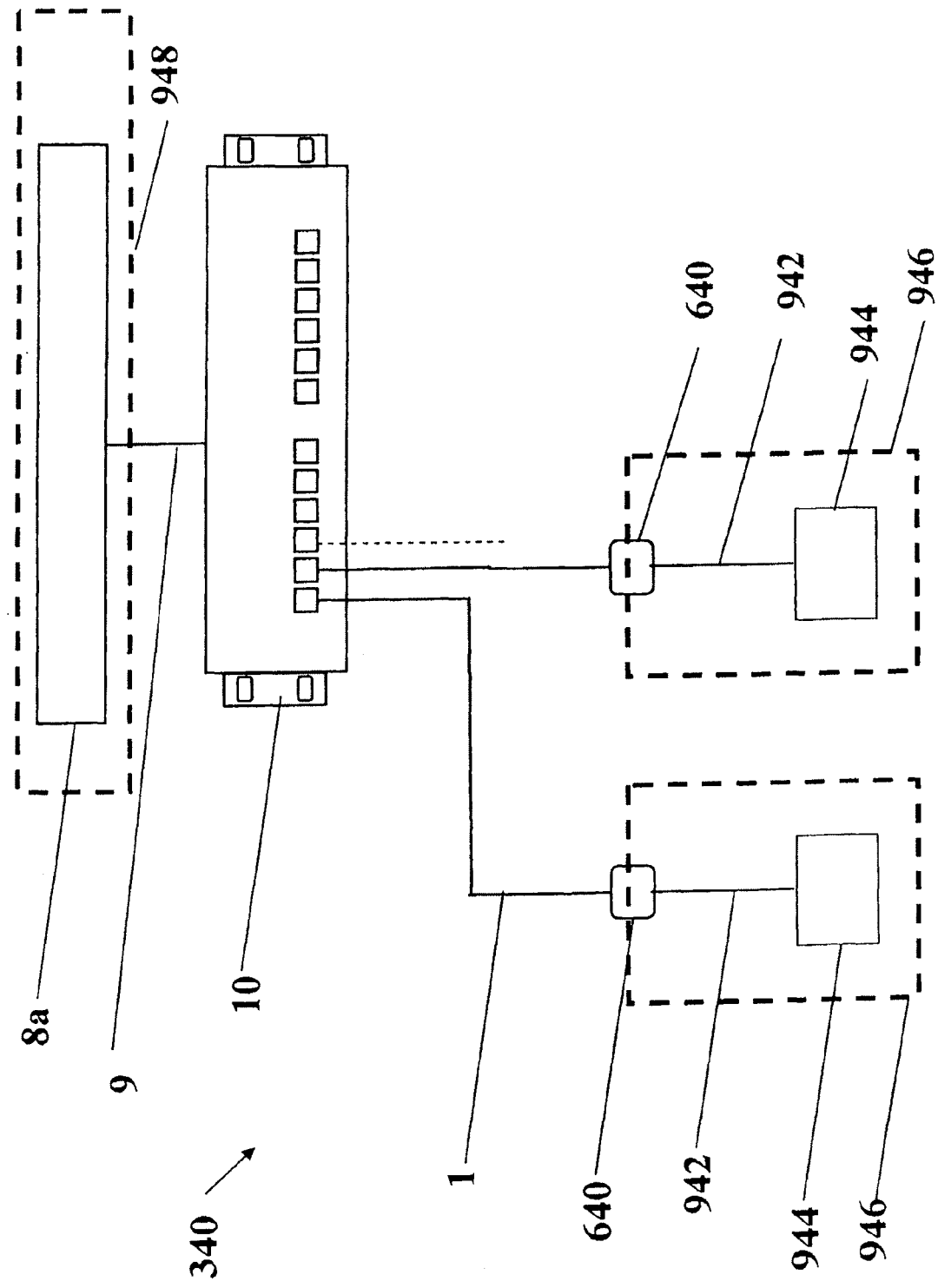
FIG. 12a illustrates the use of computing apparatus with additional LAN port for secured data system according to an embodiment of the present invention.

FIG. 12*a* illustrates the use of computing apparatus with pass-through LAN port for secured data system 340 according to an embodiment of the present invention.

In this embodiment, secured data system 340 is built similarly to system 300 of FIG. 4. Preferably, computing apparatus insert modules with pass-through LAN port 640 are inserted in plurality of boxes 3. Modules 640 are programmed to provide one or more preprogrammed security functions such as encryption-decryption, Virtual Private Network, Firewall etc. Therefore external computing device 944 can operate securely connecting to server 8 or 8*a* on different (lower or higher) security network 1, network switch, hub or router 10 and Backbone network 9.

Preferably, external devices 944 are located in a user secured area 946, accessible only to trusted personnel. Data exchanged between module 640 and external device 944 is in unsecured form.

External computing devices 944 may be desktop PC, Laptop PC, thin-client, Terminal, network printer, scanner or any other computing device having a network port. Cable 942 is optionally connected between the external computing devices 944 LAN port and the LAN ports 45 on modules 640. Downstream Power option enables the computing apparatus 640 to power the connected external device 944.

Figure 12B:
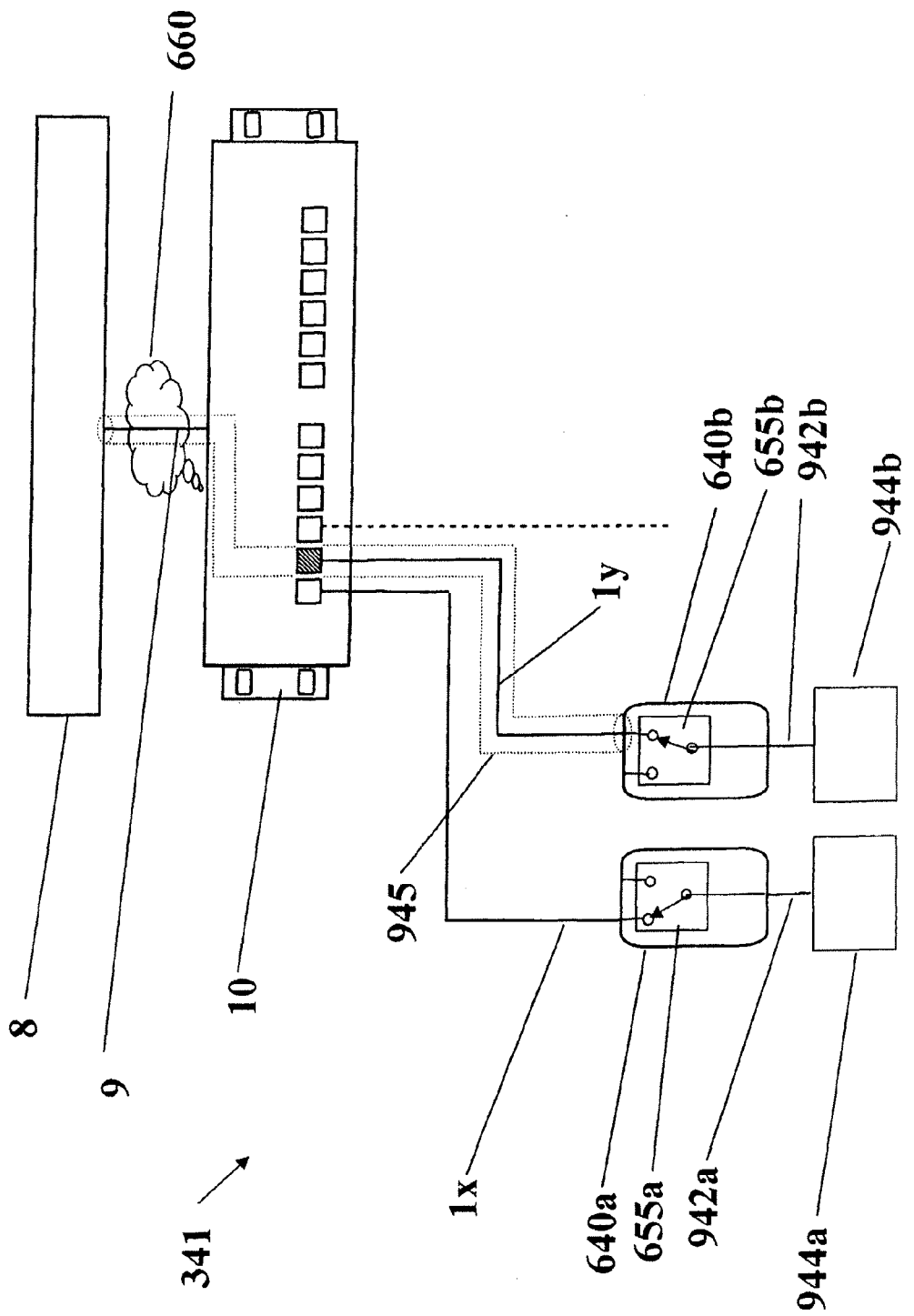
FIG. 12b illustrates exemplary data flow in a system of FIG. 11a according to an embodiment of the present invention.

Further enhancement of the embodiment described in FIG. 12*b*. This embodiment 341 include a network switching function 655*a* and 655*b* (physical or logical—through software) that under certain conditions may bridge between the LAN cable 942*a* and 942*b* connected to the external computing device 944*a* and 944*b* and LAN 1x and 1y on the other side.

In FIG. 12*b* the two different options are shown through two external computing devices 944*a* and 944*b*. External computing device 944*a* connected to the secured computing insert 640*a* by LAN cable 942*a*. Secured computing device 944*a* is shown configured in such way that its LAN switch function 655*a* connected the external computing device 944*a* directly to the LAN 1*a*.

The other external computing device shown 944*b* is accessing higher classification data and therefore it is connected through LAN cable 942*b* to the second secured computing device 640*b*. This device internal LAN switch function 655*b* was configured locally or remotely by a management function to connect the external computing device 944*b* securely through a VPN tunneling 945, to a local or remote server 8. In this state the data passed between secured computing device 640*b* and the secured server 8 is encrypted and isolated from the standard network connected to other clients such as 944*a*.

This implementation enables the secured computing insert 640*a* and 640*b* to serve as a secured switching device according to remote or local management and security commands. The system may sense the type of external computing device 944*a* or 944*b* and it user using them and then decide locally or remotely if that user will be able to access the network 1 directly or open a VPN and access special server/s 8.

This system implementation is specifically useful to enable an end-to-end high security data exchange inside a lower security network with much lower risk of data leakage between the two networks. With both network co-exist on the same infrastructure, a single network may be used instead of two physically isolated networks.

A reverse implementation of the above system enables the device 944 to connect to low security server 8 (such as a web server on the internet) without any risks to a higher security network 1 (intranet), network switch, hub or router 10 and backbone network 9.

Figure 12C:
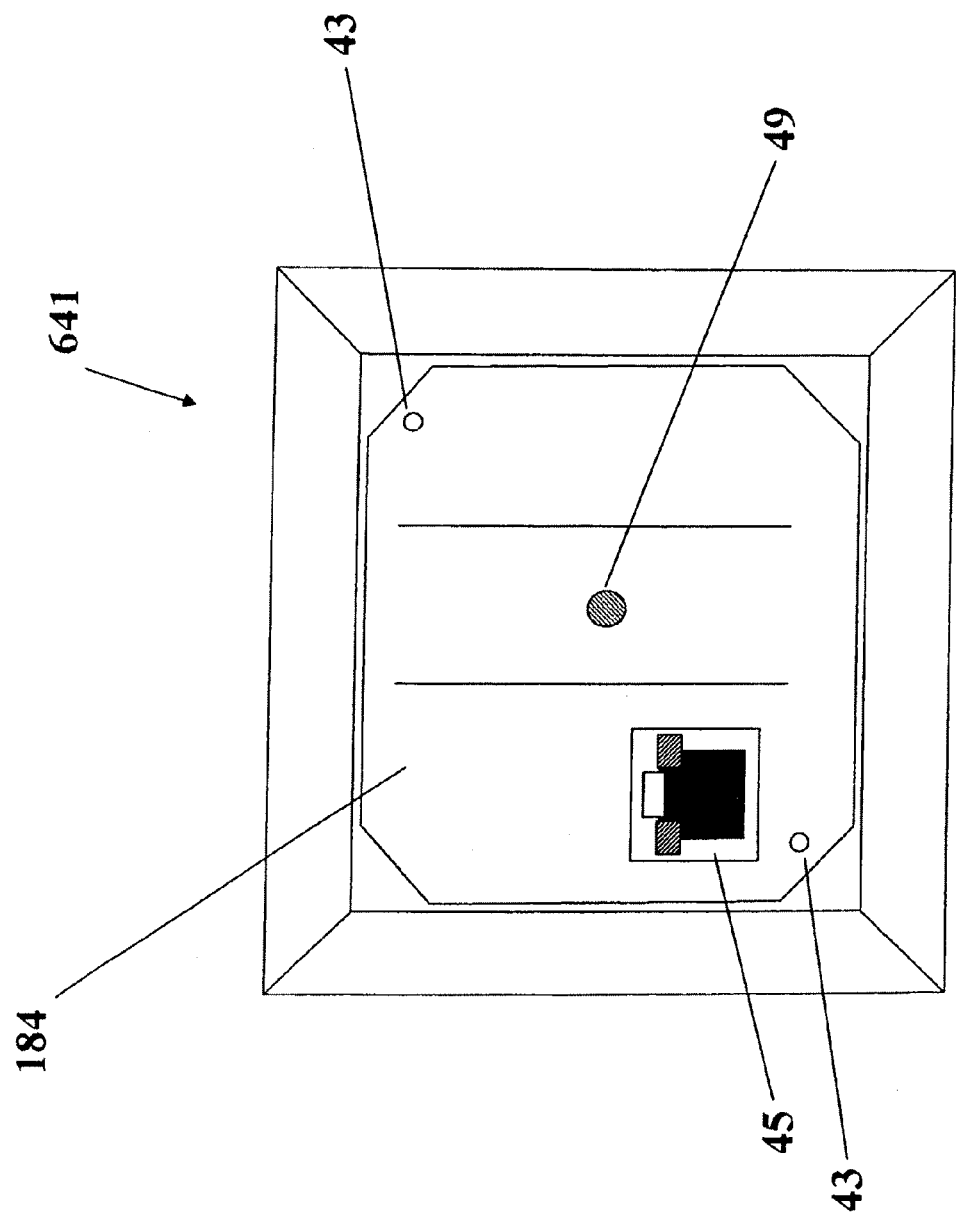
FIG. 12c illustrates yet another embodiment of a computing apparatus according to the present invention having only a LAN jack and indicator light at its front panel.

Preferably, computing device used for secured data application is "headless" type. FIG. 12*c* shows the front panel of headless computing device 641 having only few of the features and connections of computing device inserts 610 or 640. In this example only LAN connector 45 and reset button 49 are present on front panel 184. Internal block diagram of the headless computing device is optionally missing the block of unused option. Optionally, the front panel of headless computing device 641 is similar to or indistinguishable from Pass through LAN jack modular insert 620 seen in FIG. 7.

Having no keyboard or video connections reduces the cost of headless computing device 641 and increases data security by making it difficult to access or reprogram the device externally, thus providing added security and immunity against unauthorized intrusion. Optionally headless computing device 641 comprises of specific hardware for encryption/decryption of information and may be specifically designed for that purpose.

Figure 12D:
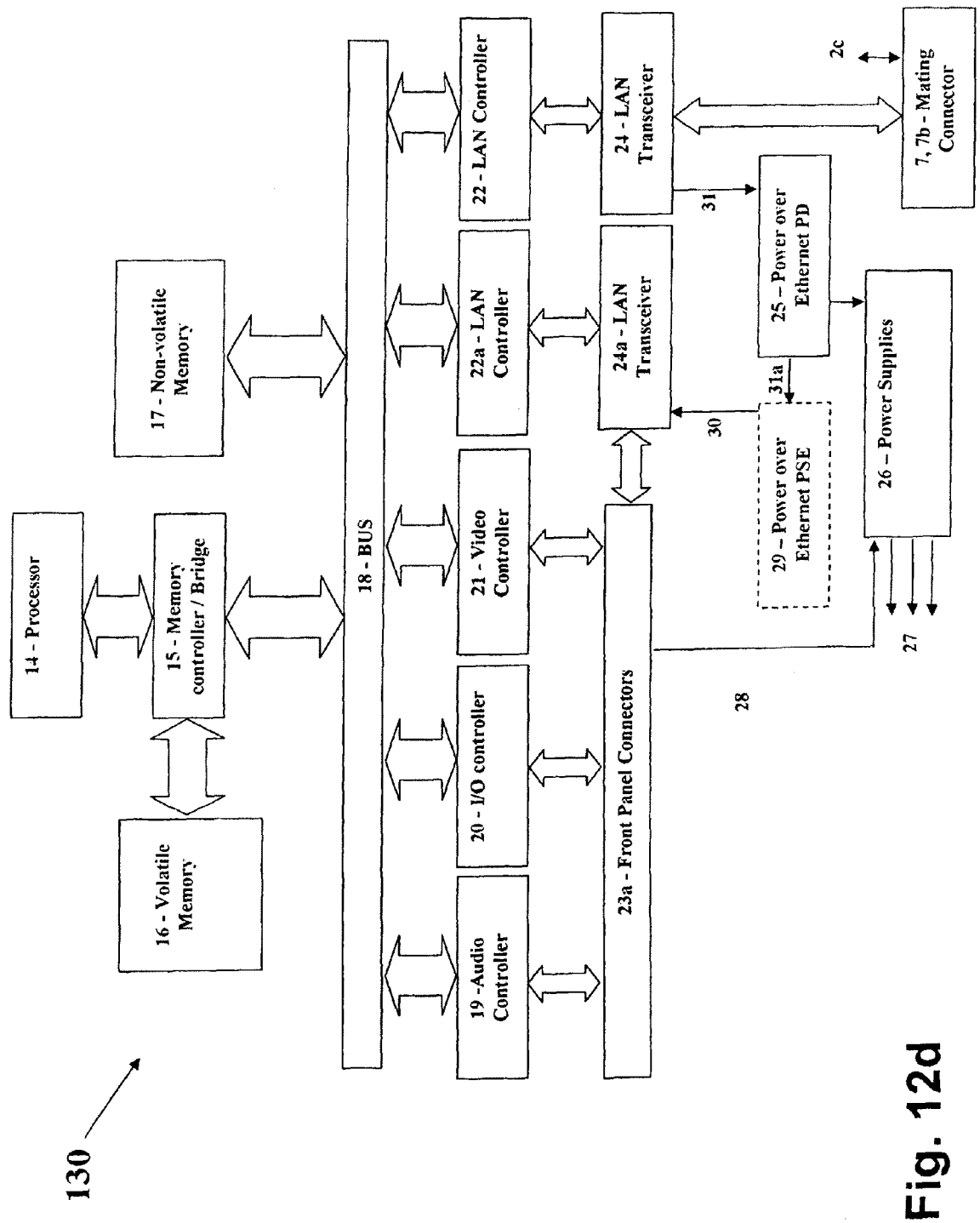
FIG. 12d illustrates a block diagram of a typical computing apparatus insert according to an embodiment of the present invention having additional LAN port connected to the computer as a second LAN port and power over Ethernet PO circuitry.

FIG. 12*d* illustrates a block diagram of a computing apparatus with pass-through LAN option 130 according to a preferred embodiment of the current invention.

This drawing shows a block diagram of computing apparatus such as depicted in FIG. 9.

Computing apparatus 130 is a data processing electronic system capable of performing thin-client or stand-alone computer functions comprising the same elements as computing apparatus 120 and in addition it comprises of:

A second LAN Controller 22*a* connected to bus 18.

A second LAN Transceiver 24*a* connected to second LAN controller 22*a* and to front panel connectors 23*a*. As can be seen in FIG. 9, second LAN transceiver 24*a* is connected to LAN connector 45 on front panel 184.

Power over Ethernet Powered Device (PD) circuitry 25 is optionally supplied by the first LAN transceiver 24 by connection port 31. The Powered Device circuitry 25 provides among other functions Power Over Ethernet signature, classification, rectification, protection and isolation according to the appropriate standard such as IEEE802.3af.

Optional Power Over Ethernet Power Sourcing Equipment (PSE) controller 29 may be added to provide downstream port or ports in 23*a* front panel with downstream Power Over Ethernet. This may be useful to support connected IP Phones or other Powered Devices that may draw power from the Computing apparatus 130. To enable full power downstream, the Power Over Ethernet Powered Device module 25 need to be powerful enough. This can be implemented with standard Power Over Ethernet or with High Power Over Ethernet or similar circuitry. The Power Sourcing Equipment (PSE) controller 29 typically takes the higher voltage DC power directly from the Powered Device circuitry 25 through port 31*a*. In the PSE the power is switched, filtered and controlled to match the requirements of the appropriate standard. The output power of this circuitry connected through connection port 30 to the second LAN transceiver 24*a* that connected to the LAN jack in the front panel 23*a*.

Figure 12E:
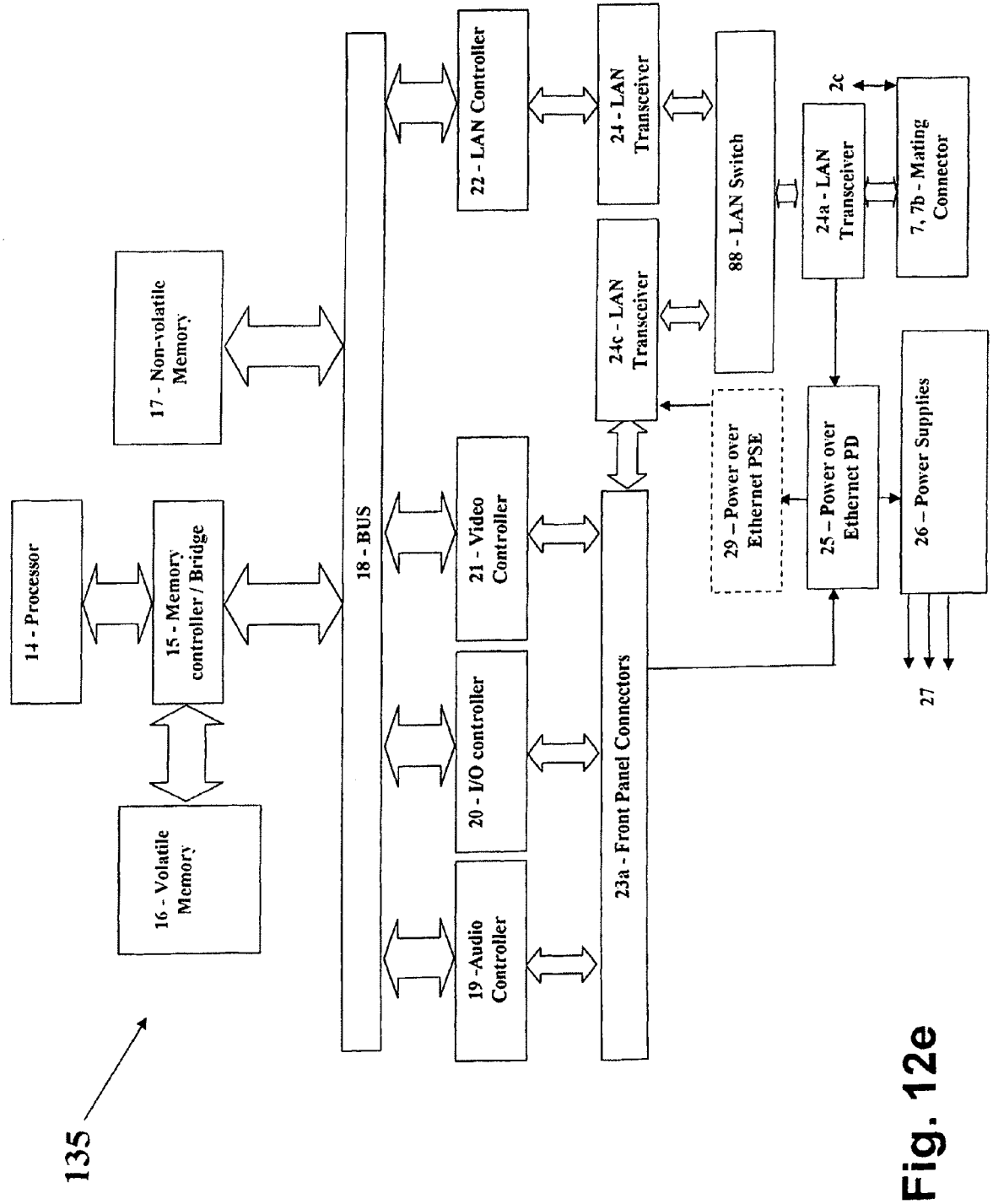
FIG. 12e illustrates a block diagram of yet another typical computing apparatus insert according to an embodiment of the present invention having additional LAN port with internal LAN switch and power over Ethernet PD circuitry.

FIG. 12*e* illustrates another block diagram of a computing apparatus with internal LAN switch option 135 according to a preferred embodiment of the current invention.

This drawing shows a block diagram of computing apparatus such as depicted in FIG. 9 but with internal LAN switch to connect one or more external LAN enabled devices.

Computing apparatus 135 is a data processing electronic system capable of performing thin-client or stand-alone functions comprising the same elements as computing apparatus 120 and in addition it comprises of:

LAN Switch 88 connected through the LAN transceiver 24*a* to the Mating connector 7 or 7*b* in such way that the switch upstream port connected to the building LAN infrastructure. The two downstream ports of the LAN switch are connected as following:

First downstream port connected through the first LAN transceiver 24 and LAN controller 22 to the computing apparatus bus 18.

Second downstream port connected through the second LAN transceiver 24*c* to the LAN jack located on the front panel 23*a*. This LAN jack may be used to connected external LAN enabled devices such as IP telephones, video conferencing equipment and computers.

Power over Ethernet Powered Device circuitry 25 is optionally supplied by the first LAN transceiver 24 by connection port 31.

Optional Power Over Ethernet (POE) Power Sourcing Equipment (PSE) controller 29 may be added to provide downstream port in 23*a* front panel with downstream Power Over Ethernet. This may be useful to support connected IP Phones or other Powered Devices. To enable full power downstream, the Power Over Ethernet Powered Device module 25 need to be powerful enough. This can be implemented with High Power Over Ethernet circuitry.

This type of implementation is specifically useful in case that the particular installation infrastructure provides only a single LAN port per user. The internal hub allows both the computing apparatus 135 of the present invention and IP telephone to share the same port and optionally share the same remote power source.

Figure 13:
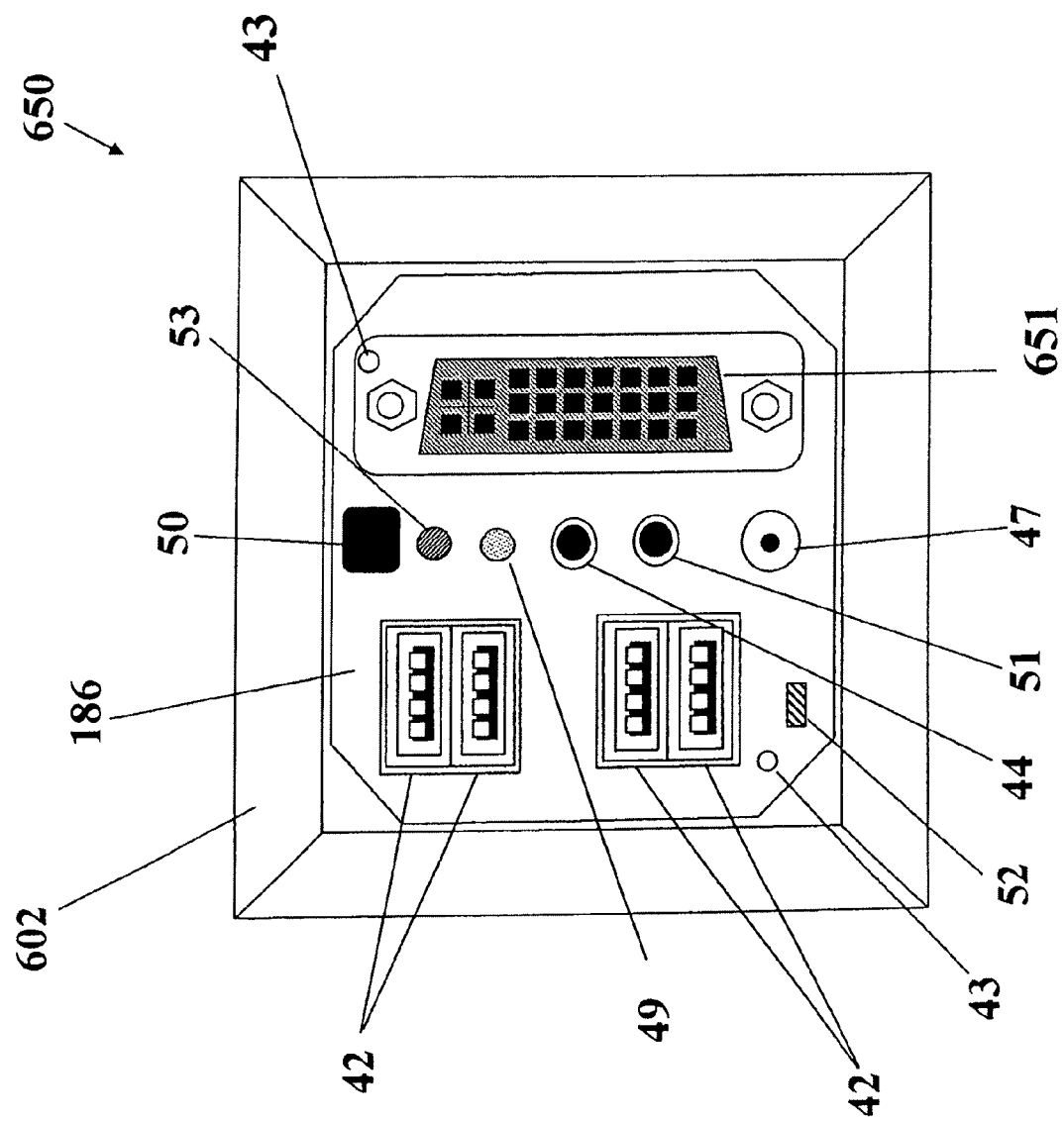
FIG. 13 illustrates yet another embodiment of a computing apparatus with Digital Video Interactive (DVI) port to attach an external digital video display.

FIG. 13 illustrates a computing apparatus insert module 650 with a Digital Video Interactive (DVI) port according to another embodiment of the present invention.

This insert module with DVI port 650 is similar to computing apparatus insert module 610 as depicted in FIG. 6. The DVI port 651 enables higher quality, resolution and color depth video output compared to older analog interfaces. This interface may be useful to connect the said computing apparatus with large format high resolution color displays as analog interface may be incompatible or provide unacceptable performance with such display.

Computing apparatus insert module 650 has a mating connector 7 or 7*b* depending on its interface type and is configured to fit in box 3 of insert-housing 100*a* or 100*b* such that its mating connector is engaged with corresponding housing connector 2 or 2*a* respectively. Connector 2 (2*a*) provides power for operation of digital processing unit inside computing module 640 as well as data link to the remote server 8. Computing apparatus insert module 640 comprises a front panel 186 with optional access holes 43 for special removal tool. Insert module 650 is built so it could be easily inserted into box 3. In the exemplary embodiment depicted in FIG. 10, insert module 650 is a thin-client apparatus connected to a server 8 through its mating connector and comprises at least few interface connections on its front panel 186. Front panel 186 may be fitted with matching decorative frame 602 if installation space permitting.

In the exemplary embodiment, four Universal Serial (USB) ports 42 enable connection of insert module 650 to plurality of external USB peripherals such as keyboard, mouse, printer etc. Audio Out jack 44 enables connecting external speakers or headphones. Audio In jack 51 enables connecting an external microphone or other audio signal sources to the apparatus.

Infra Red Data Association (IrDA) Transceiver 50 enables wireless interface with mobile phones, Personal Digital Assistants (PDA) laptop computers etc. Reset switch 49 enables manual reset of the apparatus.

Digital Video Interactive (DVI) 651 enables connection of standard DVI equipped monitor. Optional Auxiliary DC power jack 47 may be installed on front panel 186 to enable device powering by a wall-mounted DC power supply when Power Over Ethernet is not available.

It should be noted that the exemplary configuration of FIG. 13 describes a typical embodiment of a thin-client computing apparatus insert module with a DVI port. For example, number of USB ports may vary or omitted. Alternatively or additionally, keyboard and mouse connectors may be used instead of USB connector. For example; IrDA Transceiver may be omitted, Audio In or Audio Out or both audio connectors or reset switch may be omitted and other connectors may be added.

Figure 14:
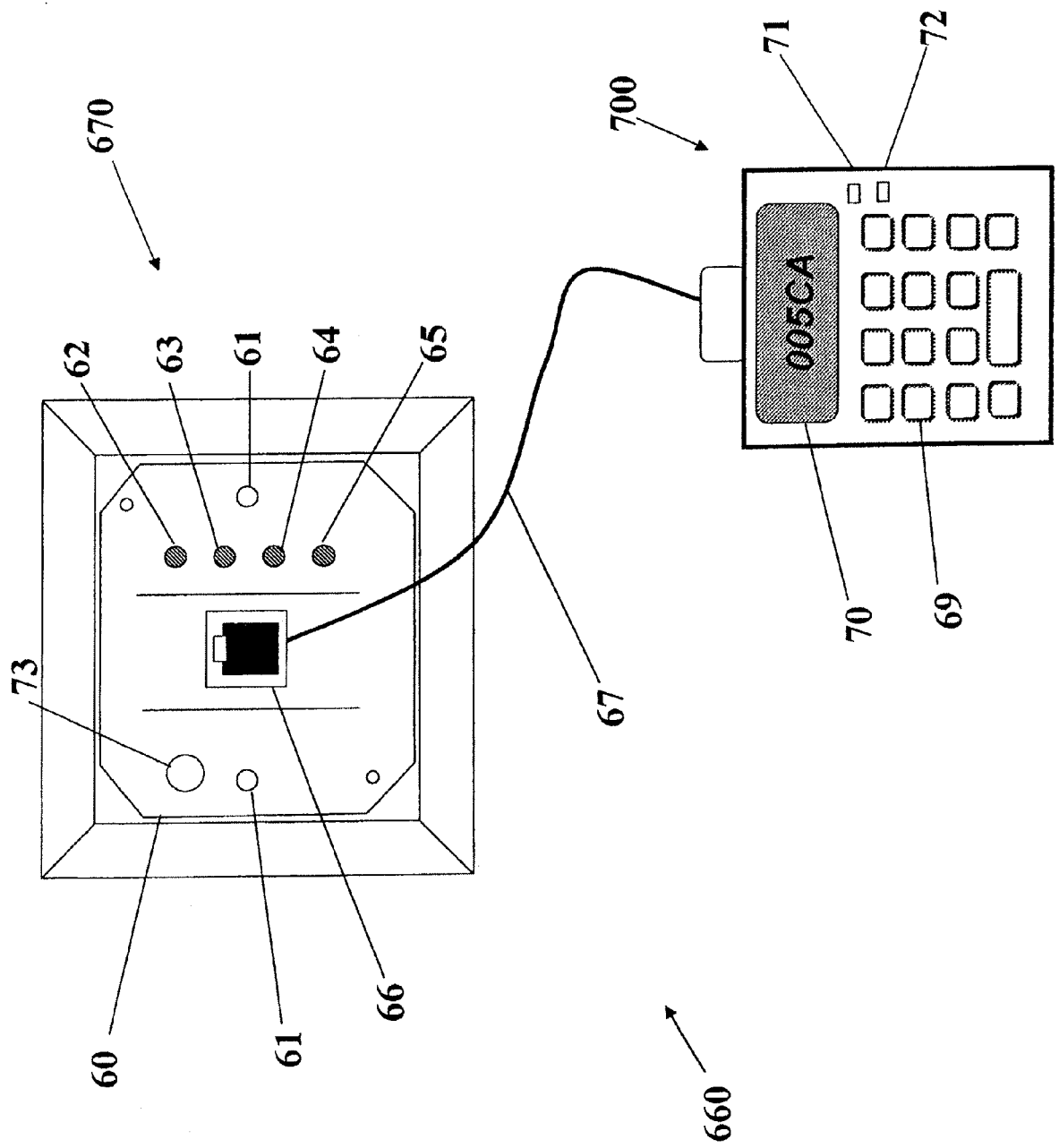
FIG. 14 illustrates typical embodiment of an Installation Tester and Programmer system, used to test the jack and LAN installation and to program various data into the location memory chip.

FIG. 14 illustrates an embodiment of an Installation Tester and Programmer system 660. This system may be used to test the jack and LAN installation wiring and to program various data into the location memory chip 2*c* and other desired parameters into the enhanced jack.

FIG. 14 shows a pictorial view of the installation testing system 660, which comprises of tester modular insert 670, which is connected to tester controller 700 with flexible cord 67.

Tester modular insert 670 has a mating connector 7, 7*b* or 7*c* depending on its interface type and is configured to fit in box 3 of insert-housing 100*a* or 100*b* such that its mating connector is engaged with corresponding housing connector 2 or 2*a* respectively.

Insert 670 comprises a front pane 60, optionally equipped with quick-release buttons 61 (instead of access holes 43 for special removal tool) to release the mechanical lock function after testing and programming completed. Preferably, the two buttons 61 are pushed in order to release the tester insert from box 3.

Optionally front panel 60 equipped with few indicators. For example:

A LAN cable indicator 62 may be in a form of color-coded light, for example a green/red LED configured to illuminate when LAN cable tested to function correctly (no open and no shorts). In the preferred embodiment, red light will be illuminated in case of LAN wiring fault exists. In this case the fault details will appear on the device's display 70.

A Power over Ethernet indicator 63 may be in a form of a green/red LED configured to illuminate green when Power over Ethernet signals available and functioning correctly for the tested port. Optionally several properties of the Power over Ethernet are tested such as voltage, current capacity and noise level and detailed results will appear at the device's display 70.

Communication speed indicator 64 may be in a form of multicolor LED configured to illuminate in amber color when 10 Mbps link is available; in green when 100 Mbps link is available; in blue when 1 Gbps link is available and not illuminated when non of the above is available.

Location indication LED 65, illuminating wham activated remotely by the management system. This function may be useful to confirm from remote help-desk or maintenance console that the tester programmer device connected to the proper port.

Additionally, front pane 60, optionally equipped with an RF wiring trace push button 73. Upon pushing this push-button, the device generates strong RF signal on the LAN port. This enables technicians to trace connected LAN wiring using special RF detector. Signal strength provides guidance to the LAN wiring Tester modular insert 670 may be configured to perform some testing functions and report the results using its indicators independently of tester controller 700. Tester also can report test and programming results to the management server if LAN port is functioning properly. Tester can also PING to remote servers as additional testing for that port.

More testing and programming function are available when tester controller 700 is connected using flexible cord 67 to the controller cable connector 66 on front panel 60.

Alternatively, tester modular 670 may have to be connected to tester controller 700 in order to perform any of the tests. Tester controller 700 comprises a keypad 69 with alphanumeric and function keys, a display 70 such as Alphanumeric LCD display and optionally indicators such as:

Battery Low indicator 71 which may be in the form of a red color LED, Illuminating when internal (optionally rechargeable) batteries have reached a critical condition.

Power On indicator 72 which may be in the form of a green LED, Illuminating when the tester controller is turned on.

Alternatively, all indicators may be located on tester controller 700.

To test a housing 100a (100b or 100c), tester insert module 60 is inserted into the installed box 3. When fully inserted the tester insert module locks mechanically into position and make electrical (and optical) connection to housing connector 2 (2a).

Upon turning the tester controller on, several illuminated LEDs indicates the status of the installed jack under test and its cabling.

If jack's location memory chip 2c is already programmed, the location string can be read on the controller display 70.

The user can program a desired location string by entering the string through the keypad 69 and press a specific function key to reprogram the jack location memory chip.

User may program unique location parameters into the location memory chip to enable automatic location detection and mapping. Data in location memory chip 2c may be used to enable or disable specific functionality of the housing or the inserted module which is inserted to the housing. For example; in order or prevent unauthorized access to the LAN, a housing may be disabled unless a valid data is entered into location memory chip 2c, additionally or alternatively, the types of inserted module which may be functioning within a specific housing may be limited by data is entered into location memory chip.

Location mapping allows the server to continuously monitor the status and existence of inserted module in each housing and to issue an alarm notice if any of the modules is tempered with or removed. Alarm notice may include information on the physical location of the module in question.

Alternatively, data in location memory chip may be factory set, and tester and programmer system may be used to read said information in order to create the location mapping.

Another function of the tester and programmer system is to enable TCP/IP ping to a remote host for testing.

Yet another option is to enable blinking of location indication LED 65 by remote management system to verify that the tester/programmer is actually connected to the right jack.

After the jack was tested and its location memory chip programmed successfully it is ready for installation of any modular insert from the plurality of matching options.

Yet in another embodiment is to enable the jack by programming the memory chip with a valid ID number. Without such number any computing device inserted to the housing would not work properly.

Yet in another embodiment the programming the memory chip is done with a valid ID number specific to the insert to be inserted into the jack. Any other combination of computing and housing would not work properly.

In some embodiment the testing and programming device comprises of specific hardware necessary for programming the location memory chip, thus preventing unauthorized reprogramming of said memory chip.

In some embodiments location memory chip define the class of the housing. For example, a class may restrict access to some data or function. For example, a housing may be define to belong to a class restricted to have "read only" operation without authorization to write or delete data on the server, restricted to exchange only VoIP data, etc. In this embodiment, some location within the organization may have different restrictions or authorization. For example, classified information may be accessed only by users reside in specified locations regardless of the computing devices used.

It is clear to a person skilled in the art that testing and programming functions may be achieved using other tools and system implementations. For example, functionality of the housing may be tested by inserting a computing apparatus insert module 610, 640 or 650.

is clear to a person skilled in the art that security measures disclosed in the current invention are preferably augment security measures known in the art such as the use of a password or a hardware key.

Figure 15:
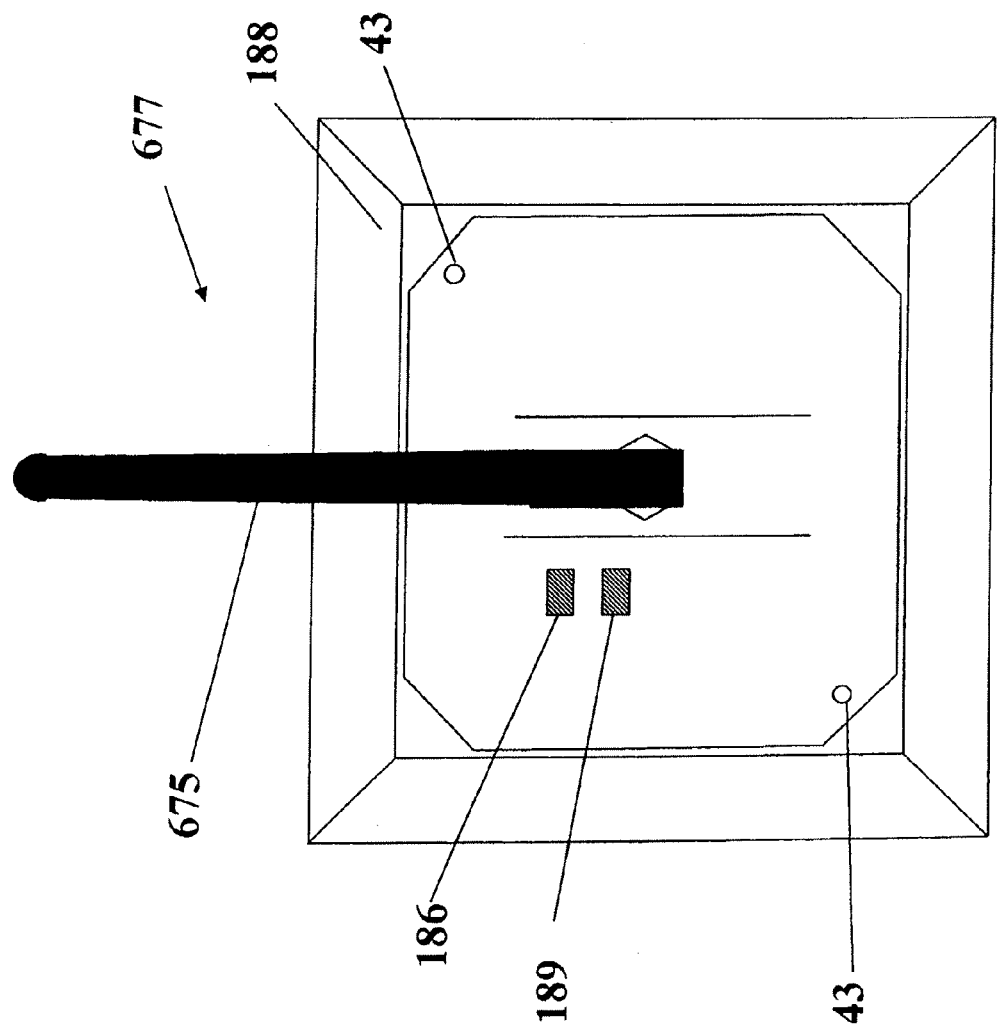
FIG. 15—illustrates yet another modular insert option comprising a Wireless LAN Access Point.

FIG. 15 illustrates yet another modular insert option of a Wireless LAN Access Point 677.

Wireless LAN Access Point insert module 677 has a mating connector 7, 7b or 7c depending on its interface type and is configured to fit in box 3 of insert-housing 100a, 100b or 100c such that its mating connector is engaged with corresponding housing connector 2 or 2a respectively.

Connector 2 (2a, 2b, 2d) provides power for operation of insert module 677 as well as data link to the remote server 8.

Insert module 677 comprises a front panel 188 with optional holes 43 for special removal tool.

Insert module 677 is built so it could be easily inserted into box 3, preferably by pushing it into place without the need of tools.

Insert module 677 is preferably equipped with an external antenna 675 for transmitting and receiving RF signals to and from similarly equipped devices such as laptop computers, cellular phones, PDAs, pagers, and RF interfaced computer peripherals. Optionally the antenna may be concealed within the module or mounted remotely. This wireless insert module may support IEEE 802.11b/g/a, Blue-tooth or any other wireless protocol.

Optionally, front panel 188 is equipped with indicators such as:

Optional Power indicator 186 which may be in the form of a LED, Illuminating when power is available to the inserted module.

Optional Link indicator 189 which may be in the form of a LED, Illuminating when the inserted module is able to communicate with the network switch or hub 10.

Optional Traffic indicator (not shown in this figure) which may be in the form of an LED, Illuminating when the inserted module is communicating with an external device/s.

Figure 15A:
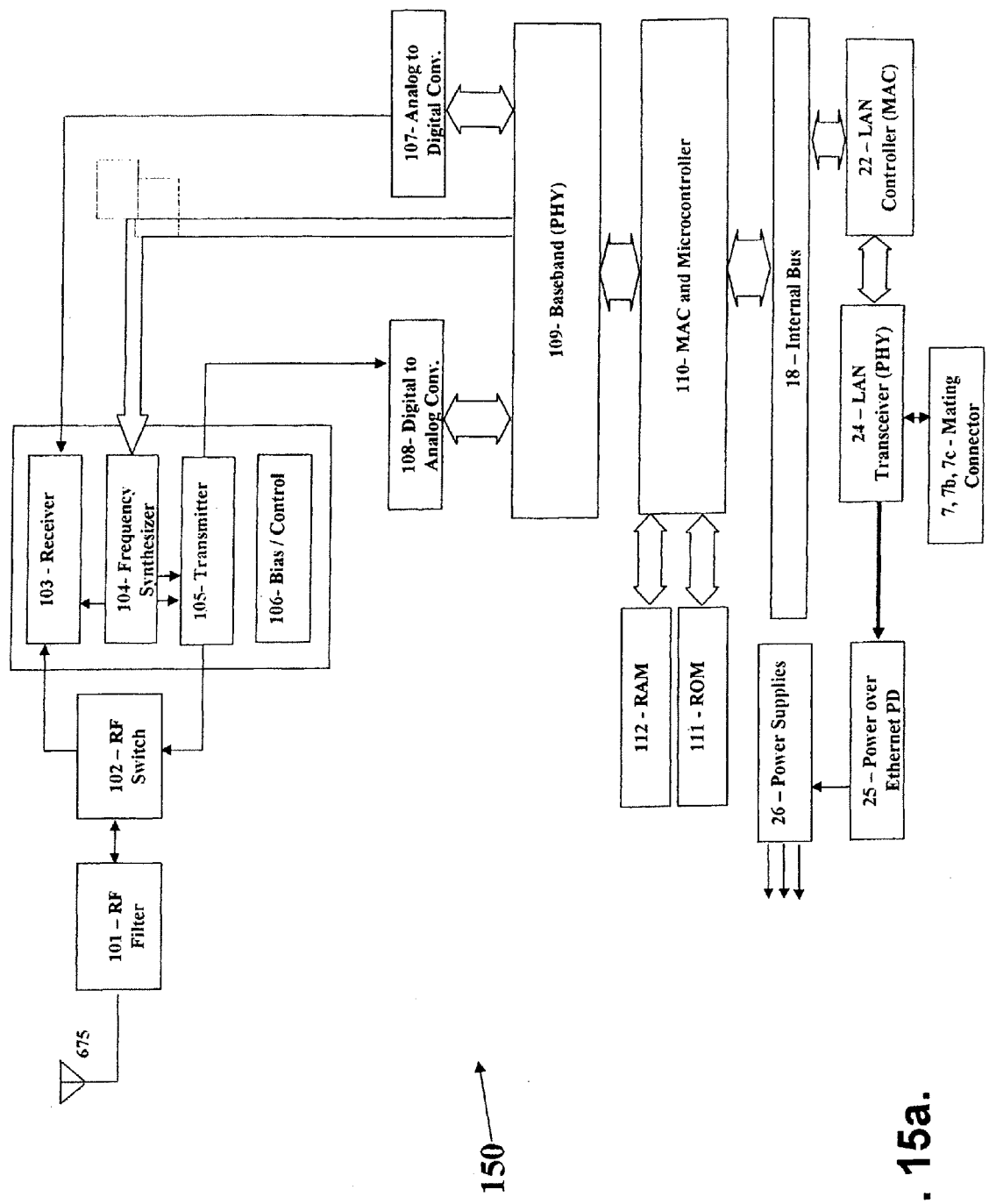
FIG. 15a illustrates a block diagram of a modular insert option comprising a Wireless LAN Access Point.

FIG. 15a illustrates the block diagram 150 of modular insert option of a Wireless LAN Access Point 677.

Wireless LAN Access Point insert module 677 has a mating connector 7, 7b or 7c depending on its interface type and is configured to fit in box 3 of insert-housing 100a 100b or 100c b such that its mating connector is engaged with corresponding housing connector 2 or 2a respectively. Mating connector 7, 7b or 7c connected to Local Area Network transceiver 24 (physical layer module) interface between the LAN controller (MAC) 22 and the LAN media connected to the apparatus through the mating connector 7 or 7b depending on its type.

LAN Transceiver 24 may be connected to the Local Area Network controller 22 by means of Media Independent Interface (MII) bus or by other interconnection buses.

Local Area Network 24 transceiver may support 100BASE-TX, 100BASE-FX, 10BASE-T and Giga LAN or other LAN protocols.

Power over Ethernet circuitry 25 extracts power from the LAN transceiver 24 to power all apparatus circuits. This circuitry may comply with industry standards such as IEEE 802.3af to operate in conjunction with standard power switches and hubs. This circuitry contains Powered Device (PD) modules such as input filters, rectifiers, detection, classification, isolation switch and isolated down-converter switching power supply to reduce the LAN 48V power to low voltage stable supply needed to power apparatus circuitry. This module may contain the required logic and signaling required by the appropriate standards to be incorporated in such interface.

Power supplies 26 uses the Power over Ethernet power 25 and convert it to the appropriate voltage/s output required by the different apparatus' circuits. This module may also include timing circuitry to provide power up sequencing for other circuits. It also may contain reset signal/s generation to enable proper starting and power interruption detection.

Local Area Network controller 22 connected to the main Internal Bus 18. This connection allows data received and transmitted through the wireless LAN and available on the bus 18 to communicate with the wired LAN infrastructure. Data is passed from the building LAN infrastructure 1 through the housing connector 2, Mating connector 7 7b or 7c, LAN Transceiver 24, LAN Controller (MAC) 22 to the Internal Bus 18.

MAC and Microcontroller 110 programmed to carry out the various control and operational functions needed for the implementation of the selected wireless protocol (for example IEEE 802.11g). It is connected to its RAM 112 to store programs and packets and to a ROM 111 to permanently store programs and settings.

MAC and Microcontroller 110 connected to the base band module (PHY) 109 that responsible to the frequency generation and signal and modulation monitoring. This module drives the Digital to Analog Converter (DAC) 107 that generates the radio modulation signal. It also connected to the Analog to Digital Converter (ADC) 107 to capture radio received signal and convert it to a digital stream. Base band module also control the Frequency Synthesizer 104 that generates the radio carrier frequency according to the MAC Microcontroller 110 instruction.

The radio section contains an Antenna/s 675 that matches the used frequency range, an RF switch 102 that connects the antenna to the receiver or to the transmitter circuitry as needed. An optional RF filter 101 may be inserted before the RF antenna 675 to filter unwanted RF noise to the sensitive RF receiver 103 and optionally to perform impedance matching. A receiver module 103 typically operates at a lower Intermediate Frequency (IF). A transmitter 105 that modulate the generated carrier signal with the transmitted data and then amplifies it to the required RF output level. A Bias and control module 106 in the radio section 113 monitors controls the transmitter output power and various other parameters to enable tuned operation and to comply with various protocols and regulatory rules.

Layer construction similar to FIGS. 9 and 9a may apply to other modular inserts. For example, to construct an RF LAN insert 667 as depicted in the block diagram 150 of FIGS. 15 and 15a respectively. Three layers according FIG. 9 according to an exemplary embodiment of the invention may comprise:

Core layer: Baseband processor 109, MAC and Microcontroller 110, RAM 112, ROM, 111, LAN controller 22, ADC 107 and DAC 108.

Peripheral & Power layer: Power supplies 26, POE 25, LAN transceiver 24, mating connector 7 (7b or 7c)

Front panel layer: antenna 675, RF filter 101, RF switch 102, Receiver 103, Frequency synthesizer 104, Transmitter 105 and Bias/Control 106

(There may be other good combinations . . . )

It should be clear to a man skilled in the art that other arrangements of the components are possible while maintaining the general layer configuration according to the current invention.

Figure 16:
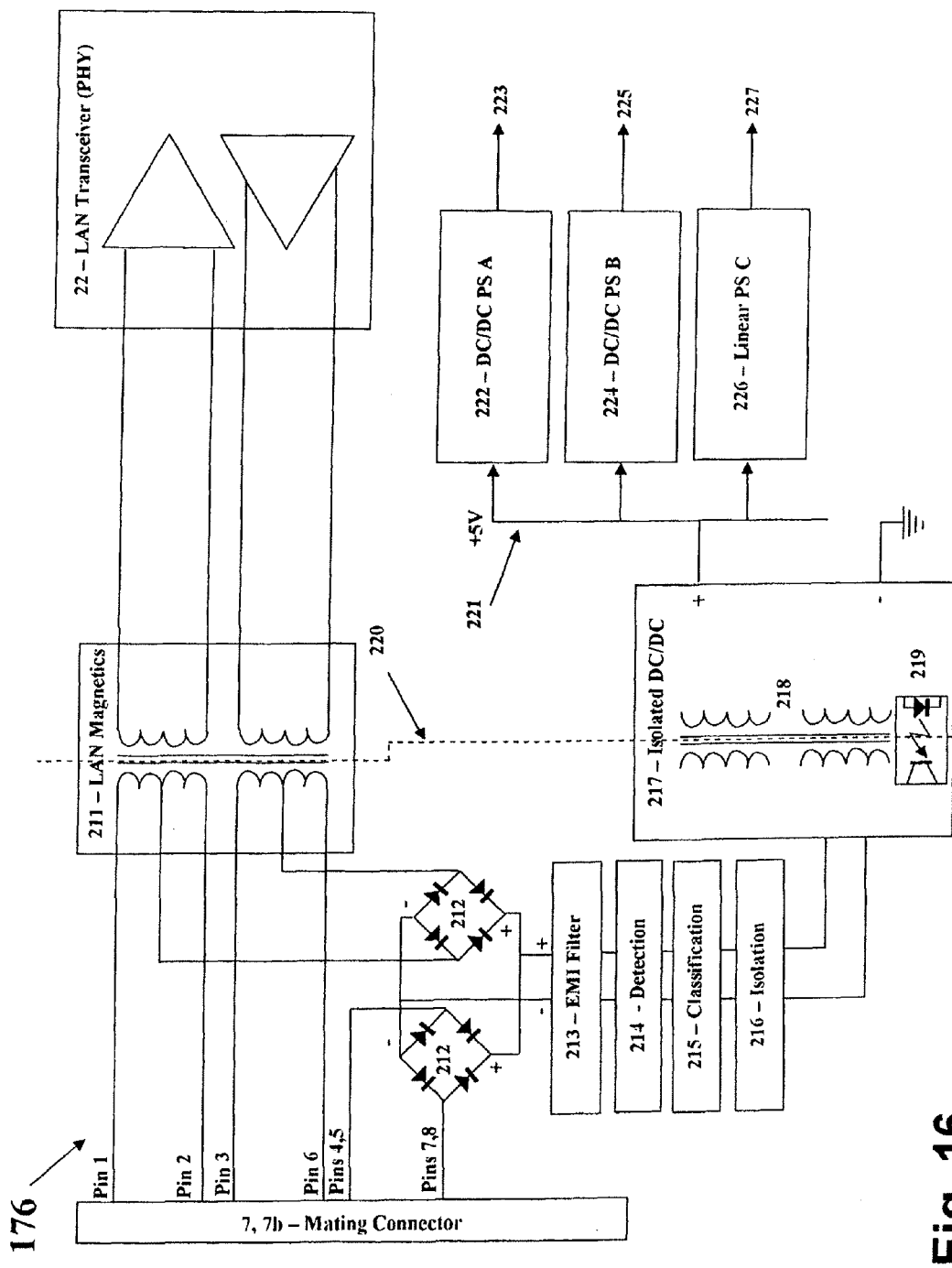
FIG. 16 illustrates a typical insert module Power Over Ethernet Powered Device implementation according to an embodiment of the present invention.

FIG. 16 presents a more detailed possible implementation of the power input blocks with power over Ethernet Powered Device (PD) option that presented in the previous figures.

Power over Ethernet PD implementation block diagram 176 gives more details as to the inner construction of blocks 25 and 26 seen in FIGS. 8, 11a, 12d, 12e and 15a.

Future active inserts, designed to fit into wall housing 3 may use the same or similar method of extracting power. Mating connector 7 or 7b connects to housing connector 2 or 2a respectively.

Mating connector 7 or 7b couples the insert circuitry to the LAN infrastructure and to various other external functions. With IEEE 802.11 af attached network DC voltage between 36 and 57V will be present between the TX (pins 3-6) and the RX (pins 1-2) sides or between spare cable pairs pins 4-5 and pins 7-8. The TX and the RX signal pairs are connected to LAN transformer 211. This transformer provides voltage isolation and impedance matching with the connected LAN transceiver (PHY) 22. The LAN transceiver 22 sends and receives packets through the TX and the RX pairs respectively. With little effect on the LAN functioning, Diode full rectifiers 212 takes the input DC voltage and rectify it to ensure proper polarity. The resulted DC voltage—nominally 48V is then passed through an EMI filter 213 to reduce the incoming and outgoing electromagnetic interference level. From there it is passed through a detection circuitry 214 that intended to signal the connected switch or power injector Power Sourcing Equipment circuitry that this particular device matches the Power Over Ethernet standard. Proper signature typically achieved using a 25 K Ohm resistor. From the detection circuitry DC voltage typically connected to the classification circuitry 215. This circuit signals the switch or power injector about the power consumption class of the Powered Device (the specific insert). This classification typically performed prior to providing the PD with full power for proper power management. The isolation circuitry 216 required in order to isolate the device load during the initial detection and classification phases. From the isolation circuitry 216 the DC power typically connected to an isolated DC to DC converter 217. The isolation required by certain standards to avoid certain safety hazards. Typically 1500 VAC isolation required between the media side (wall LAN infrastructure) and the device circuitry. This isolation barrier is shown in the figure as dashed line 220. Isolation on the data side achieved using LAN transformer 211 while in the DC to DC it is typically achieved by a fly-back transformer 218 and an opto-coupler feedback device 219. Negative DC output of the isolated DC to DC converter 217 is connected to the main device ground while positive side (typically 5V or 3.3V) 221 connected to the various internal power supplies and to the various electronics circuitry. An array of DC to DC and or linear power supplies is used to further generate additional low voltages needed for the device operation. In this embodiment DC to DC power supply A 222 generates voltage A through its output 223. DC to DC power supply B 224 generates a different voltage B through its output 225. Linear power supply C 226 generates yet a different voltage C through its output 227.

It should be noted that the choice of the number and types of power supplies s (Linear vs. DC to DC power supply) is made according to the circuit requirement. For example, if the required output is close to the input voltage then it is better to implement a linear power supply instead of DC to DC converter.

As an alternative, 5V DC power may be connected to the 5V power plane 221 with certain logic from a panel mounted DC jack. This enables proper device operation in cases that Power Over Ethernet infrastructure is not available.

Figure 17:
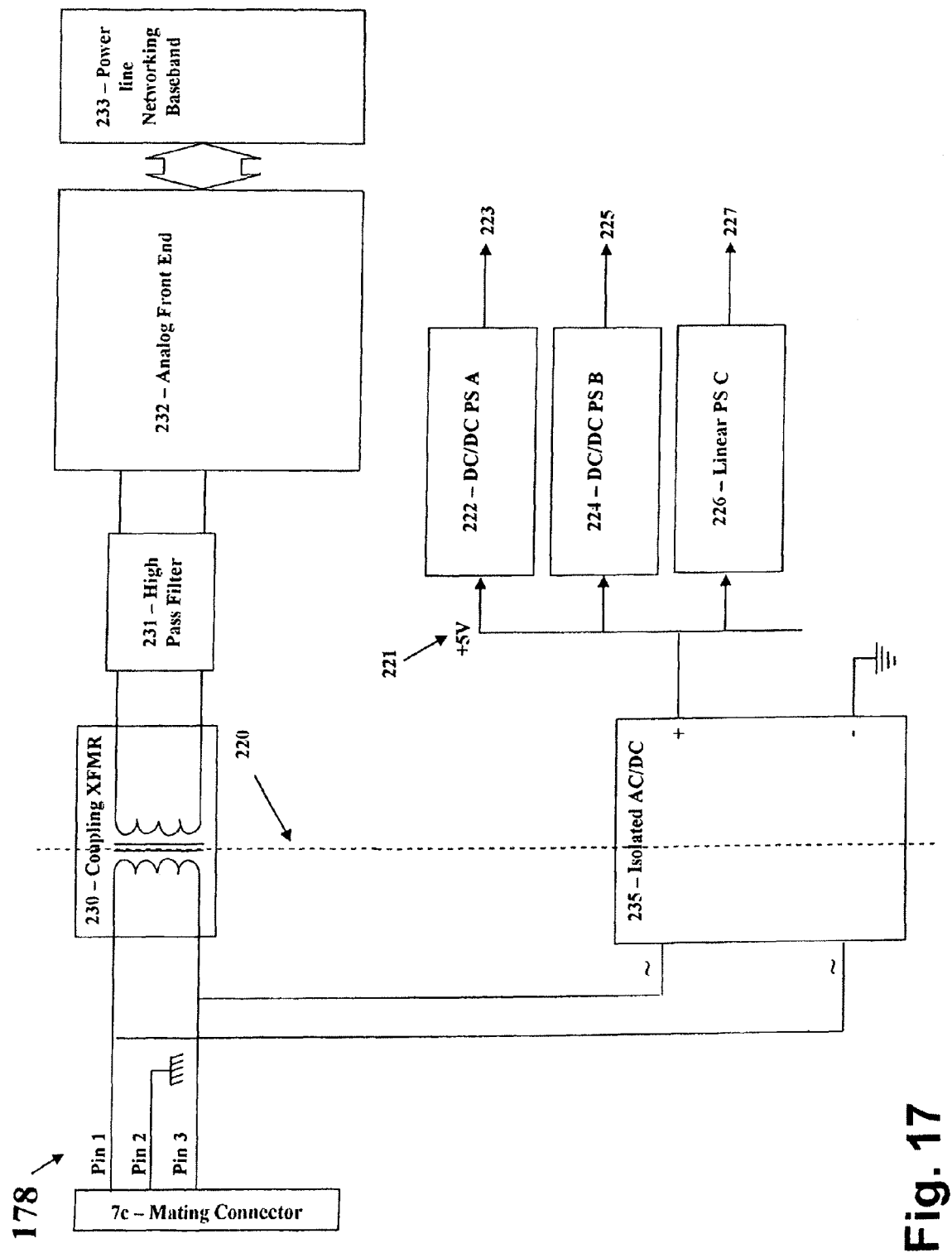
FIG. 17 illustrates a typical insert module network over power lines implementation according to an embodiment of the present invention.

FIG. 17 presents a more detailed possible implementation of the network over power lines input blocks according to the current invention.

Network over power lines implementation block diagram 178 gives more details as to the inner construction of blocks 26, 33 and 34 seen in FIG. 8a.

7c is the mating connector adapted to withstand the high voltage (110 to 230 VAC) connected to the housing connector. Pin 1 of the connector is the phase, pin 2 is the ground and pin 3 is the Neutral. When the insert is installed in the housing box power from the building mains lines connected to these 3 pins. Input power connected to the coupling transformer 230 and to the AC to DC power supply 235 that powers the apparatus. The AC to DC power supply circuitry reduced the input voltage to 5V DC 221 to power the internal DC to DC down converters 222, 224 and 226. These DC to DC power supplies generates the internal DC voltages 223, 225 and 227 needed to power the apparatus internal circuitry.
Coupling transformer 230 and internal transformer inside the AC to DC power supply 235 isolate the rest of the apparatus from the high voltages available in the power lines. Isolation barrier 220 serves as a safety measure with isolation of at least 1500 V between the two sides.
Anything other than useful network data carried over the power lines is filtered by the High Pass Filter 231 that connected to the coupling transformer 230. The filtered signal is then connected to the Analog Front End (AFE) 232. The AFE contains additional adaptive filtering, multiplexer, receiver, driver, analog to digital, digital to analog and AGC circuitry to interface between the digital side of the baseband module 233 and the analog signals of the coupling transformer 230. Baseband module 233 contains the processor, MAC, PHY, DSP and additional circuitry to handle all networking layers and activities. It is then connected to the other insert circuitry using direct bus interface, USB, MII or any other common interface.

Figure 18:
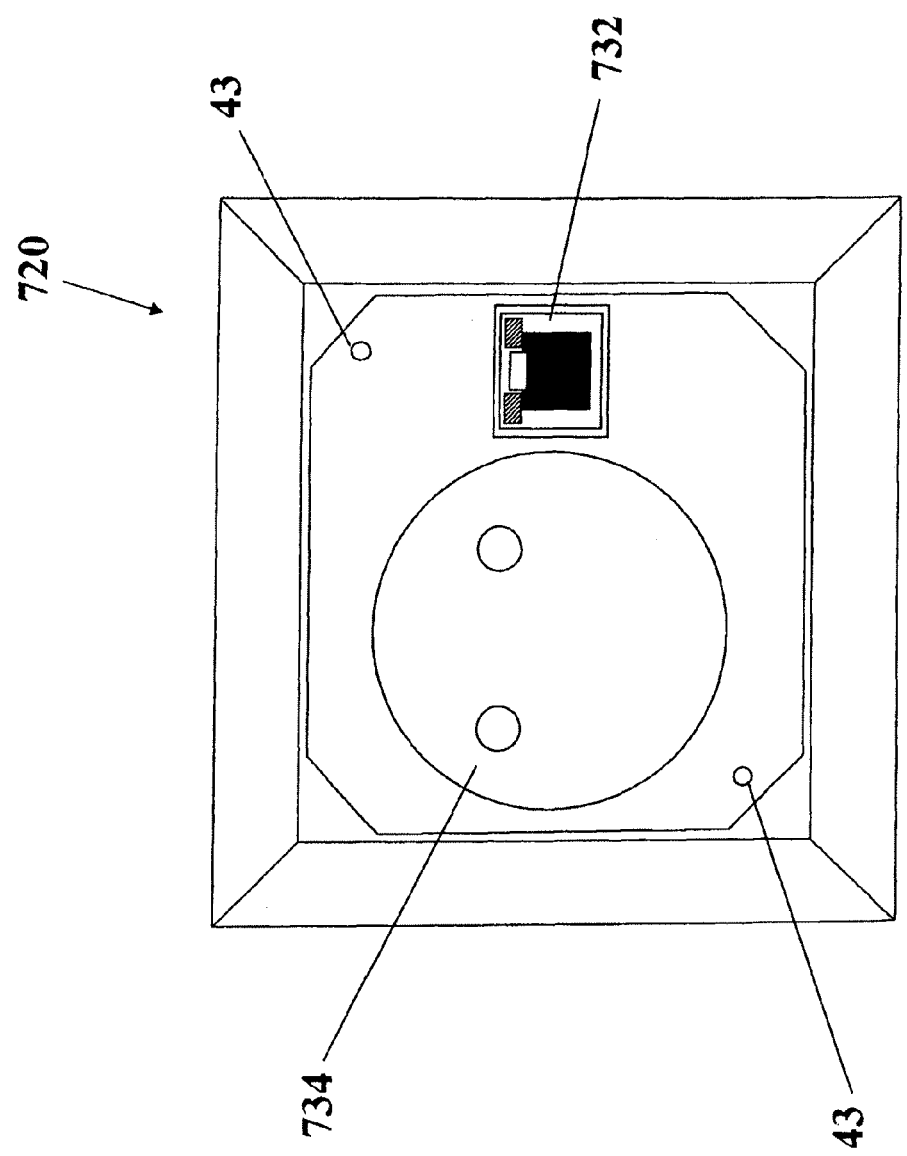
FIG. 18—illustrates yet another modular insert option comprising of mains jack and LAN jack that provides Ethernet connectivity over connected power lines.

FIG. 18 illustrates yet another modular insert option of a network over power lines LAN jack 720.
This inserts contains an optional pass-through mains jack 734 to enable connection of various electrical appliances and LAN jack 732 to enable connection of various network enabled devices such as computer, laptop, PDA, network printer etc.
Front panel is also fitted with optional access holes 43 for insert lock-unlock special removal tool.

By replacing a standard household power outlet with main power insert-housing 100c and inserting a network over power lines LAN jack 720 into it, both data are conveniently available. For example, a work station or LAN printer may be connected anywhere in the house without having to re-route power or data line and with minimal modification to existing infrastructure. Skill level required for the installation is minimal.

This exemplary embodiment serves as bridge between the building power lines and networked equipment that share the electrical system media to create a Local Area Network. To further enhance its security and usability, this apparatus may contain encryption/decryption capabilities, web based management portal and management agents.

Figure 19:
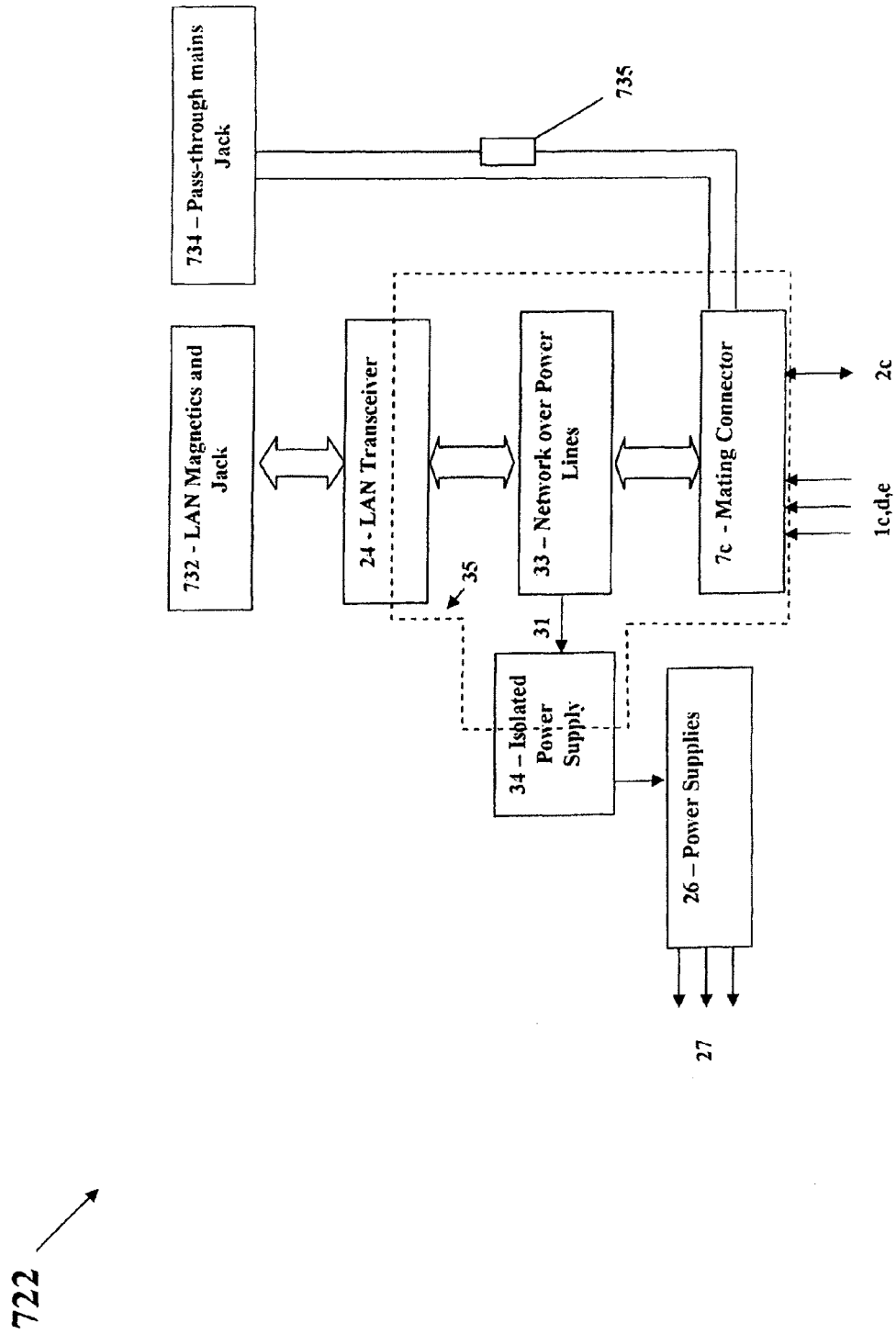
FIG. 19 illustrates a block diagram of the modular insert shown in FIG. 18.

FIG. 19 illustrates the block diagram 722 of modular insert option of the present invention having a LAN port and a pass-through power jack.

Mating connector 7c couples the insert circuitry to the building power lines (1c, 1d, 1e) infrastructure connected to the housing and to optional location memory chip 2c.

Pass-through mains jack 734 installed in the insert front panel provide power to connected appliances through optional protection device 735. Protection device may be over current, over voltage, inrush current or any other type of protection device.

Mating connector 7c also provides power to the Network over power lines circuitry 33. This circuitry extracts the data super-imposed on the mains lines and provide standard network stack to interface with the LAN transceiver 24. LAN transceiver 24 connected to the magnetics and LAN jack 732 installed in the insert's front panel.

Small internal optionally isolated power supply 34 extracts the power needed for the internal circuitry and convert it into low DC voltage. This voltage is further converted in Power supplies 26 into all needed DC voltages 27 to power the device circuits. The area enclosed in line 35 represents the High Voltage circuitry that is electrically isolated from the other areas in the device due to safety reasons.

FIG. 19 illustrates the block diagram 722 of modular insert option of the present invention having a LAN port and a pass-through power jack.

Mating connector 7c couples the insert circuitry to the building power lines infrastructure connected to the housing.

Mains jack 734 installed in the insert front panel provide power to connected appliances through optional protection device 735. Protection device may be over current, over voltage, inrush current or any other type of protection device.

Mating connector 7c also provides power to the Network over power lines circuitry 33. This circuitry extracts the data super-imposed on the mains lines and provide standard network stack to interface with the LAN transceiver 24. LAN transceiver 24 connected to the magnetics and LAN jack 732 installed in the insert's front panel.
Small internal optionally isolated power supply 34 extracts the power needed for the internal circuitry and convert it into low DC voltage. This voltage is further converted in Power supplies 26 into all needed DC voltages 27 to power the device circuits. The area enclosed in line 35 represents the High Voltage circuitry that is electrically isolated from the other areas in the device due to safety reasons.

Figure 20:
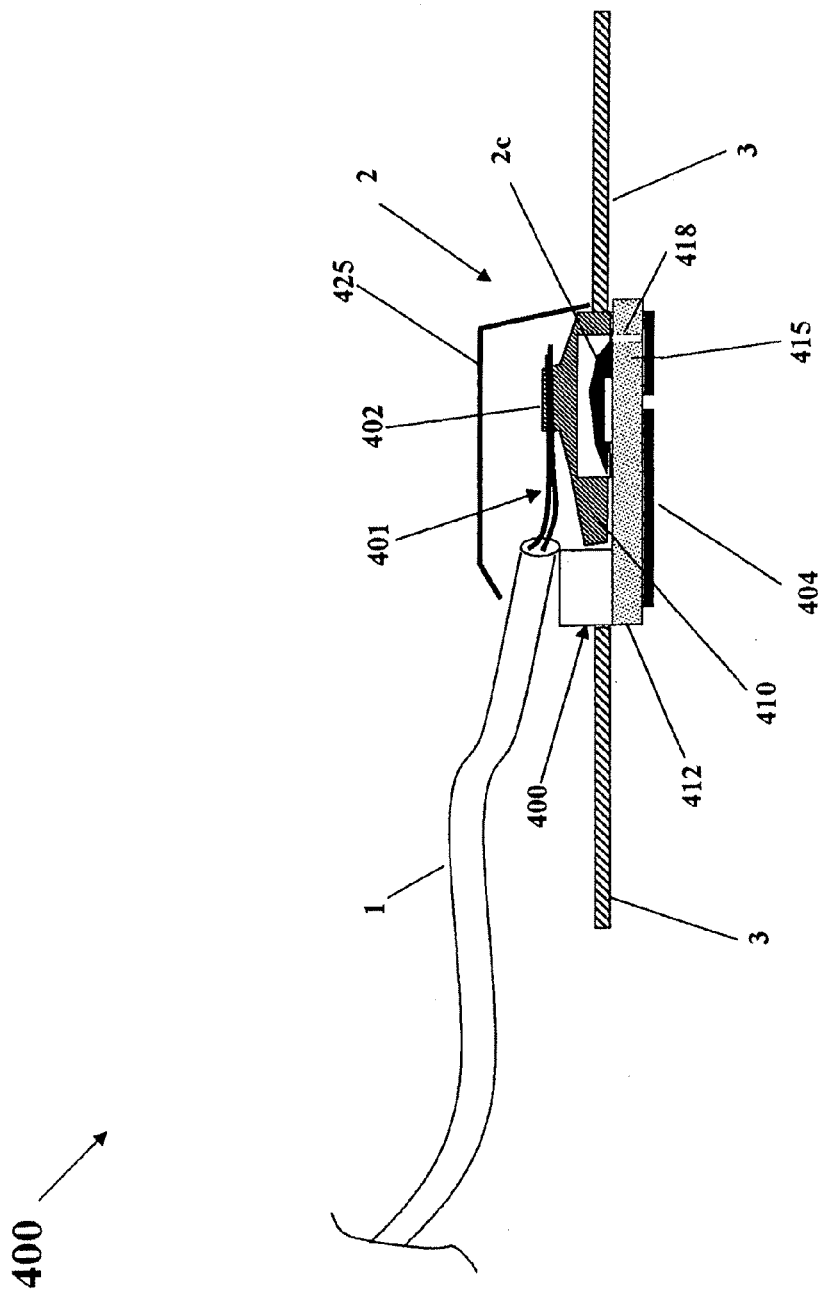
FIG. 20 illustrates a cross-sectional view of the housing connector block that electrically interfaces between the building wiring and the modular insert of the present invention.

FIG. 20 illustrate in further details the cross sectional view of the housing connector block 2 presented in FIG. 1. The primary function of the housing connector is to electrically interface between the building LAN cable 1 and the removable insert housing contacts 7 (not shown here for clarity—showed at FIG. 1).

LAN Cable 1 is fixed mechanically to the connector module by block 400 preferably made of metal that serves both as a friction pad to secure the cable 1 to the module 2 and also as a shielding component to connect the cable shield to the housing shield 3 properly. The said block 400 may conduct high currents in case of lightning strike and therefore it may be built of solid metal. The top cover 425 secured the cable to the block 400 by providing positive down-word pressure on the cable.

Metal blades 410 are fitted to enable cable crimping to each of the eight conductors 401 contained in the shielded LAN cable 1. A special hand tool may be used to push each conductor to its metal blade 410 to provide good electrical contact through the conductor isolation layer. Each of the eight blades is color marked 402 to show the proper conductor that should be connected to that blade. Various other electromechanical methods may be used to secure and connect the LAN cable 1 conductors 401 to the housing connector 2.

The eight blades 410 are soldered into the small contacts PCB 412. This two-sided PCB serves as a component carrier and conductor for the housing connector 2. On the top side the eight blades connected and on the bottom sides there are eight to twelve gold plated connector strips 404 positioned in such way to be in full contact with the insert mating contacts 7 (not shown here for clarity). Also on the bottom side of this PCB 412 there are optional lighting spark gaps 415 to protect the insert circuitry from high voltage spikes induced by lighting strikes. Lighting spark gaps 415 may be implemented simple printed patterns on the PCB or by attached Through Hole or SMT components. Electrical signals connection from the PCB 412 top side to the bottom side is achieved by means of via holes such as 418.

Optional location memory chip 2c may be fitted inside the connector block to further improve the housing functionality. To reduce cost the said chip 2c may be assembled directly on the top side of the PCB 412 using Chip On Board technology. The chip 2c may be covered by an encapsulation layer to protect it from mechanical and humidity damages.

Cover 425 provides mechanical protection for the assembly and further secure each of the eight crimped conductors 401 to the appropriate blade 410. The cover may also serve as a shield and to secure the LAN cable 1 to the metal block 400.

To facilitate for easy installation and support, the connector block 2 is secured to the housing part 3 by a removable means.

It should be clear to a man skilled in the art that similar construction can be made for other types of LAN or power standards. For example, number of conductors may vary without departing from the general configuration according to the current invention.

Specifically, main household lines 1c, 1d and 1e may take the place of the eight Ethernet lines of 1. In this case, proper high voltage insulation and higher current-carrying capacity connectors should be used.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention has been described with reference to certain exemplary embodiments; various modifications will be readily apparent to and may be readily accomplished by persons skilled in the art without departing from the spirit and scope of the above teachings.

It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore include structure, acts or details of structures and acts that may not be essential to the invention and which are described as examples. Structure and acts described herein are replaceable by equivalents that perform the same function, even if the structure or acts are different, as known in the art.

Therefore, the scope of the invention is limited only by the elements and limitations as used in the claims. The terms "comprise", "include" and their conjugates as used herein mean "include but are not necessarily limited to".

The invention claimed is:

1. A modular computing system comprising:
   a plurality of housings, the housings being capable of receiving an insertable interchangeable computing device insert, the housings comprising:
   a box secured to a structure such as a wall, floor, or furniture, said box being sized to fit inside a standard wall cutout such as used for a main outlet or a LAN outlet; and
   a connector affixed to said box wherein said connector is connected to a LAN system, said connector being capable of mating with said insertable computing device insert to provide LAN and power connectivity to said computing device insert; and
   at least two types of interchangeable computing devices inserts, the inserts being capable of being removably inserted into, and to be removed from said box, wherein said interchangeable computing devices inserts comprise:
   a body, wherein said body is sized to fit into, and substantially fill and be substantially contained within the cavity of said box, said body having at least one face exposed when said computing device is inserted into said box; and
   a mating connector affixed to said body, said mating connector being capable of mating with said connector affixed to said box.

2. The modular computing system of claim 1, wherein one type of said insertable interchangeable computing device is a LAN hub insert comprising:
   a LAN switch connected to said mating connector; and
   at least two LAN ports exposed when said LAN hub is inserted into said box.

3. The modular computing system of claim 1, wherein one type of said insertable interchangeable computing device is a wireless LAN Access Point insert comprising:
   a LAN controller exchanging data with said mating connector;
   a radio section capable of modulating said data as RF radiation; and
   an antenna for transmitting said RF radiation.

4. The modular computing system of claim 1, wherein one type of said insertable interchangeable computing device is a computing apparatus insert comprising:
   a processor adapted to process programs;

non-Volatile memory adapted to store programs and data to be processed by said processor;

volatile memory adapted to temporarily store data required by said processor;

a video display controller adapted to generate a video image on a video display from data directed from said processor, said non-volatile memory, or said volatile memory;

a network interface receiving data from said mating connector;

at least one external peripheral connector, located on said exposed face, capable of interfacing with peripheral devices such as a keyboard or mouse; and at least one video output connector, located on said exposed face, connected to said video display controller.

5. The modular computing system of claim 1, wherein one type of said insertable interchangeable computing device is a headless computing apparatus insert comprising:

a processor;
a memory controller;
volatile memory;
non-volatile memory; and
a LAN transceiver,
wherein said exposed face of said headless computing apparatus comprises a front panel LAN jack, and
wherein said exposed face does not comprise any of: peripheral connector and video connector.

6. The modular computing system of claim 1, wherein said mating connector comprises a fiber-optic connector capable of providing a LAN interface for said computing apparatus.

7. The modular computing system of claim 1, wherein said connector is connected to main electricity lines, providing both AC power and digital data over power-lines networking.

8. The modular computing system of claim 1, wherein said housing comprises a heat conducting box.

9. The modular computing system of claim 1, wherein said connector is connected to a LAN system which is an Ethernet over copper system providing both data and power.

10. The modular computing system of claim 1, wherein one type of said insertable interchangeable computing device is a blank device insert capable of triggering an alert when said blank device is removed from said housing.

11. The modular computing system of claim 1, wherein said housing is equipped with a locking mechanism for securing said insertable computing device insert to said housing, wherein said locking mechanism is capable of preventing the removal of said insertable computing device without use of a special tool.

12. The modular computing system of claim 11, wherein said locking mechanism is coupled to a switch capable of detecting and reporting unlocking of said insertable computing device insert.

13. The modular computing system of claim 1, wherein said computing device is a thin client computing device insert.

14. The modular computing system of claim 1, wherein said housing is fitted with a non-volatile location memory connected to the said connector and providing identity information of the housing and the location to the insertable computing device insert.

15. The modular computing system of claim 14, wherein one type of said insertable interchangeable computing device is a programming and testing insert, capable of testing the LAN connection of said connector and programming said non-volatile location memory.

16. The modular computing system of claim 15, wherein configuring non-volatile location memory within housing for the insertable computing device insert comprises the steps of:

inserting a programming and testing insert into said housing; and
programming non-volatile location memory.

17. The modular computing system of claim 15, wherein configuring non-volatile location memory within housing for the insertable computing device insert further comprises the steps of:

testing the non-volatile memory and related cabling;
entering information indicative of housing location; and
verifying that proper data was programmed into the non-volatile memory.

* * * * *